THERMOELECTRIC GENERATORS

Filed Dec. 15, 1954 25 Sheets-Sheet 1

INVENTORS.
Robert W. Fritts,
Sebastian Karrer,
BY
Brown, Jackson, Boettcher & Dienner
Atty's.

Oct. 29, 1957 R. W. FRITTS ET AL 2,811,571

THERMOELECTRIC GENERATORS

Filed Dec. 15, 1954 25 Sheets-Sheet 2

INVENTORS.
Robert W. Fritts,
BY Sebastian Karrer,
Brown, Jackson, Boettcher & Dienner
Attys.

INVENTORS.
Robert W. Fritts,
BY Sebastian Karrer,
Attys.

INVENTORS.
Robert W. Fritts,
BY Sebastian Karrer,
Brown, Jackson, Boettcher & Dienner
Att'ys.

THERMOELECTRIC GENERATORS

Filed Dec. 15, 1954 25 Sheets-Sheet 5

INVENTORS.
Robert W. Fritts,
BY Sebastian Karrer,
[signature] Attys.

INVENTORS.
Robert W. Fritts,
BY Sebastian Karrer,
Brown, Jackson, Boettcher & Dienner
Attys.

INVENTORS.
Robert W. Fritts
BY Sebastian Karrer,
Brown, Jackson, Boettcher & Dienner
Attys.

INVENTORS.
Robert W. Fritts,
BY Sebastian Karrer,
Brown, Jackson, Boettcher & Dienner
Attys.

INVENTORS.
Robert W. Fritts,
BY Sebastian Karrer,
Brown, Jackson, Boettcher & Dienner
Attys.

14

Oct. 29, 1957 R. W. FRITTS ET AL 2,811,571

THERMOELECTRIC GENERATORS

Filed Dec. 15, 1954 25 Sheets-Sheet 10

INVENTORS.
Robert W. Fritts,
BY Sebastian Karrer,
Brown, Jackson, Boettcher & Dienner
Attys.

Oct. 29, 1957 R. W. FRITTS ET AL 2,811,571

THERMOELECTRIC GENERATORS

Filed Dec. 15, 1954 25 Sheets-Sheet 11

INVENTORS.
Robert W. Fritts,
BY Sebastian Karrer,
Brown, Jackson, Boettcher & Dienner
Attys.

14

INVENTORS.
Robert W. Fritts,
BY Sebastian Karrer,
Brown, Jackson, Boettcher & Dienner
Attys Oct. 29, 1957 R. W. FRITTS ET AL 2,811,571

THERMOELECTRIC GENERATORS

Filed Dec. 15, 1954 25 Sheets-Sheet 13

INVENTORS.
Robert W. Fritts,
BY Sebastian Karrer,
Brown, Jackson, Boettcher & Dienner
Attys.

INVENTORS.
Robert W. Fritts,
BY Sebastian Karrer,
Brown, Jackson, Boettcher & Dienner
Attys.

INVENTORS.
Robert W. Fritts,
BY Sebastian Karrer,
Brown, Jackson, Boettcher & Dienner
Attys.

THERMOELECTRIC GENERATORS

Filed Dec. 15, 1954 25 Sheets-Sheet 16

INVENTORS.
Robert W. Fritts,
BY Sebastian Karrer,
Brown, Jackson, Boettcher & Dienner
Attys.

INVENTORS.
Robert W. Fritts,
BY Sebastian Karrer,
Brown, Jackson, Boettcher & Dienner
Attys.

INVENTORS.
Robert W. Fritts
BY Sebastian Karrer,
Brown, Jackson, Boettcher & Dienner
Atty's.

14

INVENTORS.
Robert W. Fritts,
BY Sebastian Karrer,
Brown, Jackson, Boettcher & Dienner
Att'ys.

14.

INVENTORS.
Robert W. Fritts,
BY Sebastian Karrer,
Mason, Kolehmainen, Rathburn & Wyss
Attys

14.

INVENTORS.
Robert W. Fritts,
BY Sebastian Karrer,
Brown, Jackson, Boettcher & Dienner
Attys.

INVENTORS.
Robert W. Fritts,
BY Sebastian Karrer,
Brown, Jackson, Boettcher & Dienner
Attys.

INVENTORS.
Robert W. Fritts,
BY Sebastian Karrer,
Brown, Jackson, Boettcher & Dienner
Att'ys.

INVENTORS.
Robert W. Fritts,
BY Sebastian Karrer,
Brown, Jackson, Boettcher & Dienner
Attys.

INVENTORS.
Robert W. Fritts.
BY Sebastian Karrer,
Brown, Jackson, Boettcher & Dienner. Atty's.

United States Patent Office 2,811,571

Patented Oct. 29, 1957

2,811,571

THERMOELECTRIC GENERATORS

Robert W. Fritts, Elm Grove, Wis., and Sebastian Karrer, Port Republic, Md., assignors to Baso Inc., Milwaukee, Wis., a corporation of Wisconsin Application December 15, 1954, Serial No. 475,488

79 Claims. (Cl. 136—5)

This application is a continuation-in-part of our application Serial No. 442,845, filed July 12, 1954, now abandoned. The invention relates to thermoelectric generators, and more particularly to thermocouples comprising electrical conductors at least one of which is a semi-metallic alloy.

Known thermoelectric generators, in the main, have been constructed of metallic alloys which afford only low voltages and low thermal efficiencies and hence have but limited utility. For example, common presently used thermocouples comprising metallic elements, such as, for example, Chromel-Alumel or iron-constantan, at best will develop about fifty millivolts even at extreme temperature differences between the hot and cold junctions of the order of 1394° C. and 982° C., respectively. Such extreme temperature differences are not practical for prolonged usage, and further the thermal efficiencies of such thermocouples are but a fraction of one percent.

It is an object of the invention to provide thermoelectric generators comprising electrical conductors at least one of which is a semi-metallic alloy, which generators afford markedly higher thermal conversion efficiency.

Another object is to provide thermoelectric generators of the aforementioned character the internal resistance of which may be arbitrarily altered to match that of the external circuit and load which it supplies thereby affording maximum output to such load.

Another object is to provide thermoelectric generators of the character aforementioned affording a markedly higher Seebeck E. M. F. and lower thermal conductivity than known thermoelectric generators.

Another object is to provide thermoelectric generators, and more particularly thermocouples comprising dissimilar electrical conductors both of which are semi-metallic alloys having the aforementioned electrical characteristics, thereby affording the generator thermoelectric voltage and power output which is the sum of that of the individual conductors.

Another object is to provide thermoelectric generators, and more particularly thermocouples comprising dissimilar electrical conductors of semi-metallic compositions, and more particularly of certain binary and ternary compositions having semi-conductor-like conductivity or conductance.

Another object is to provide thermoelectric generators of the character aforedescribed comprising thermoelectric elements of semi-metallic compositions, and more particularly binary and ternary compositions of lead and at least one of the group tellurium, selenium, sulphur, the electrical characteristics of which have been promoted by the addition of beneficial impurities.

Other objects of the invention will appear hereinafter or become apparent.

Now, in order to acquaint those skilled in the art with the manner of constructing and utilizing thermoelectric generators in accordance with the invention, there are hereinafter described certain preferred embodiments of the invention.

Figures 4, 4A:
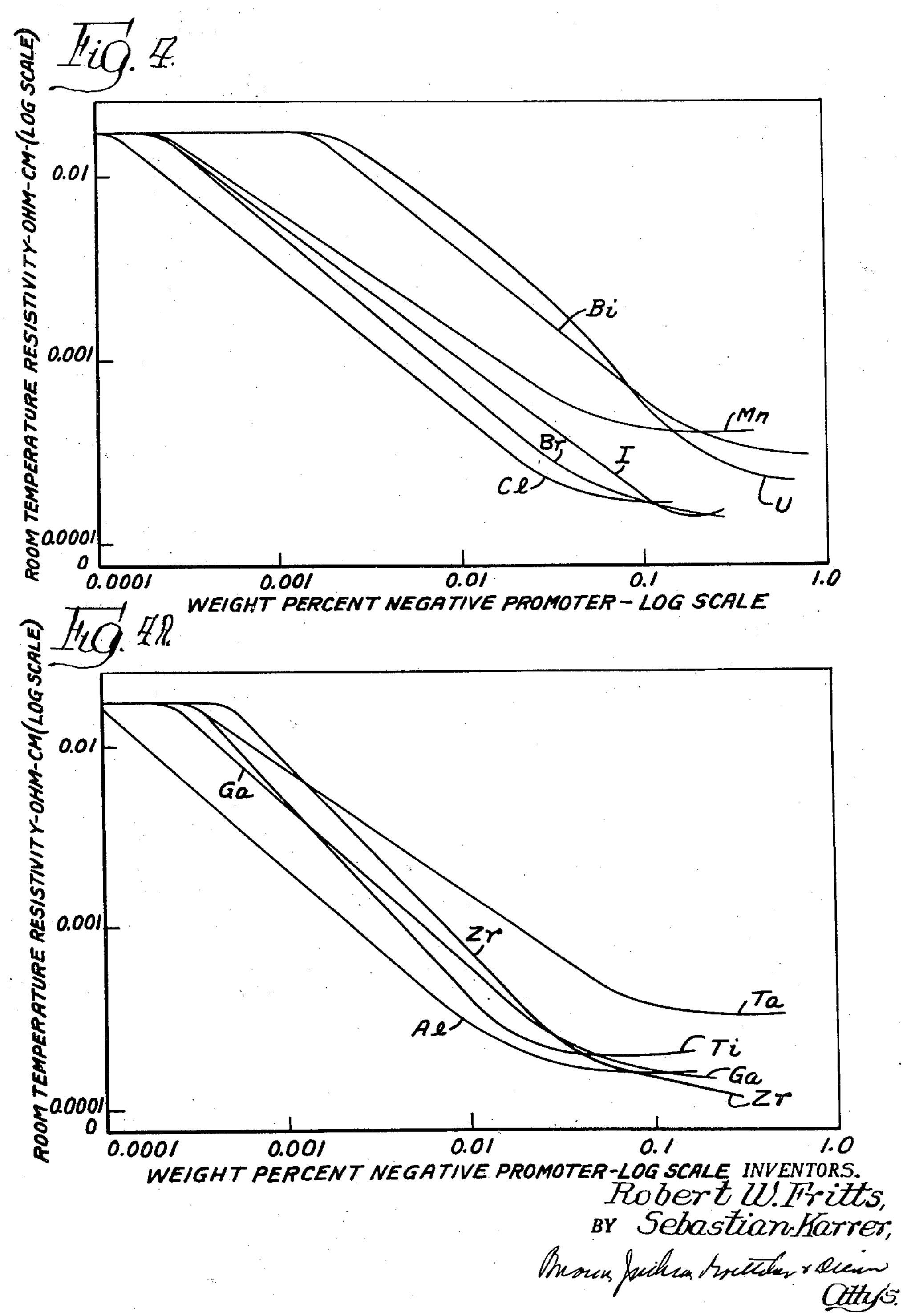
Figures 4 and 4A are graphic illustrations of the resistivity characteristics of certain of the lead-tellurium semi-metallic alloys or compositions of which the thermoelectric elements of the invention are made within certain ranges of additions of negative promoters therein.
Figure 5:
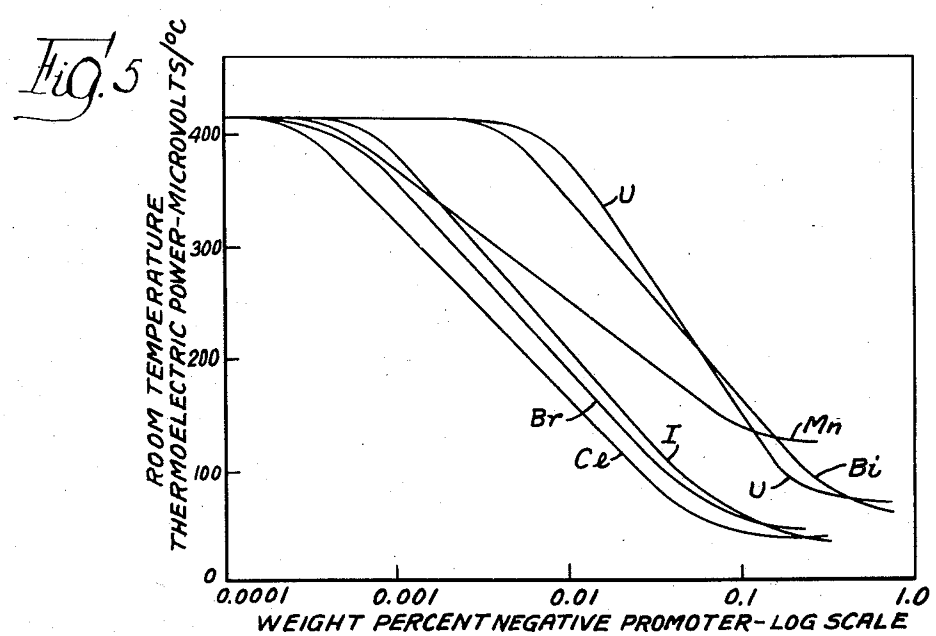
Figures 5 and 5A are graphic illustrations of the thermoelectric power characteristics of the lead-tellurium semi-metallic alloys or compositions depicted in Figures 4 and 4A, respectively.
Figure 5A:
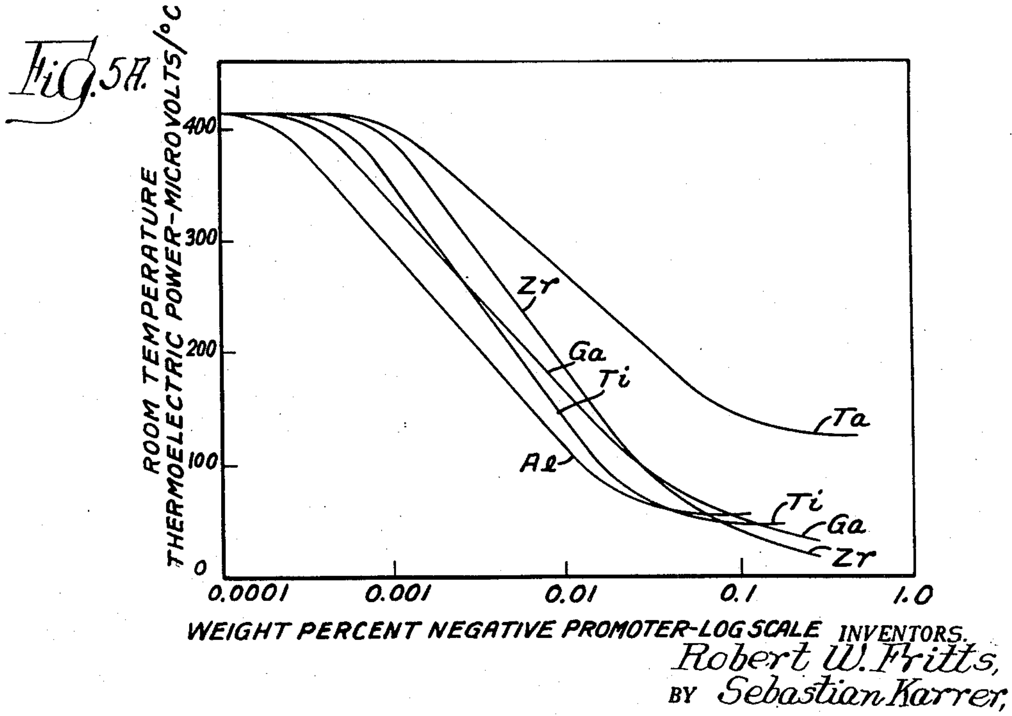
Figure 6:
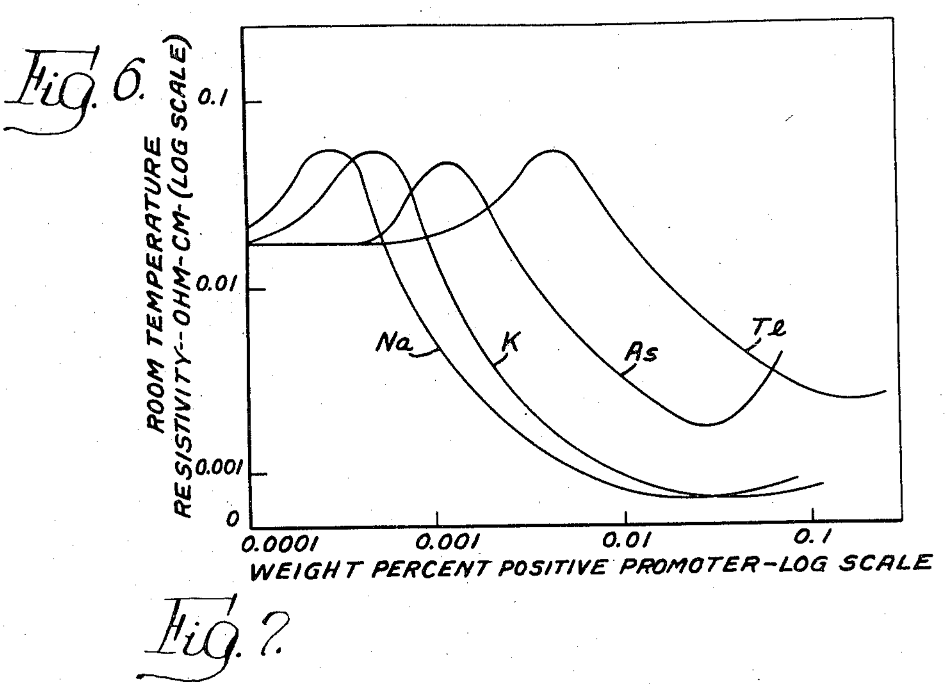
Figure 6 is a graphic illustration of the resistivity characteristics of certain lead-tellurium semi-metallic alloys or compositions of which the thermoelectric elements of the invention are made within certain ranges of additions of positive promoters to such alloys or compositions.
Figure 8:
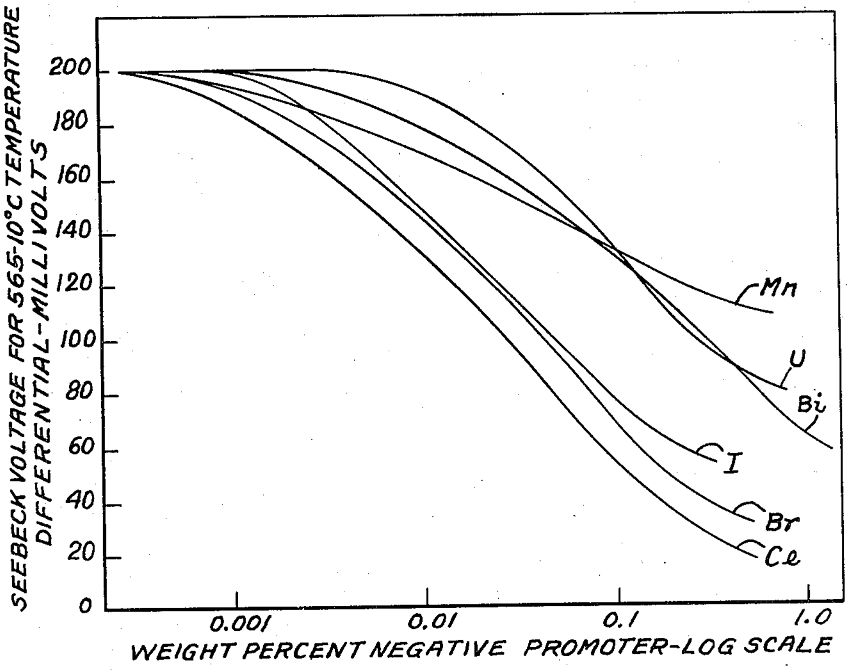
Figure 8A:
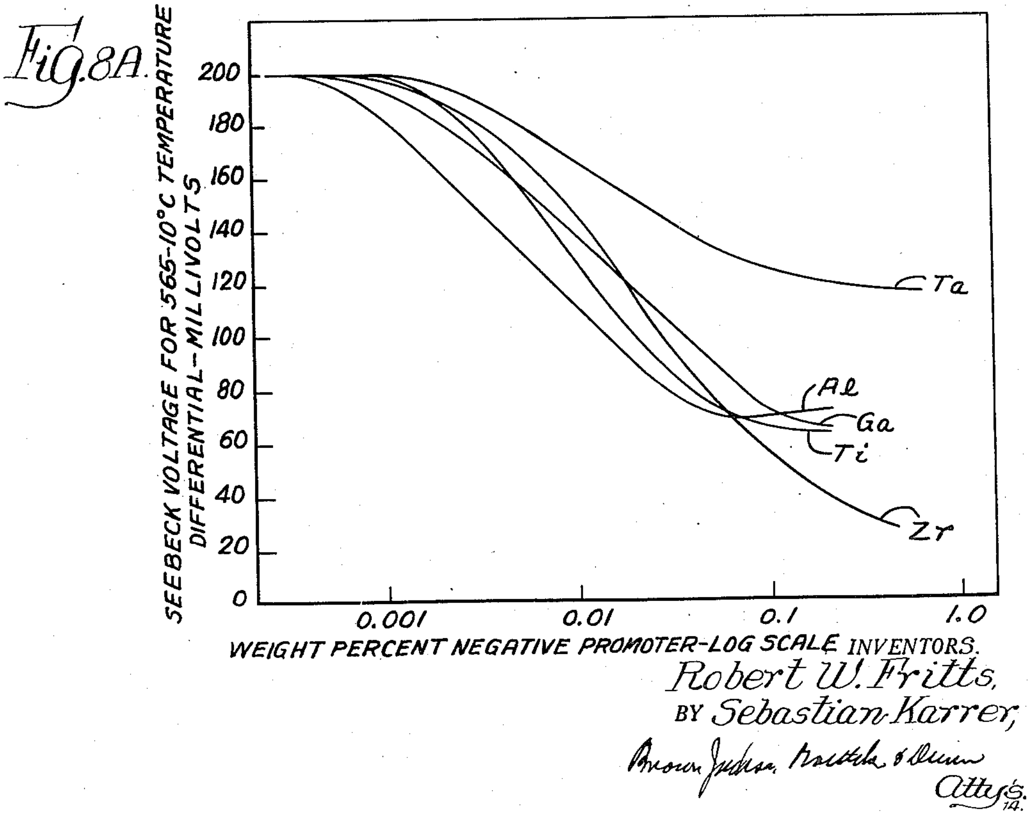
Figures 9, 11:
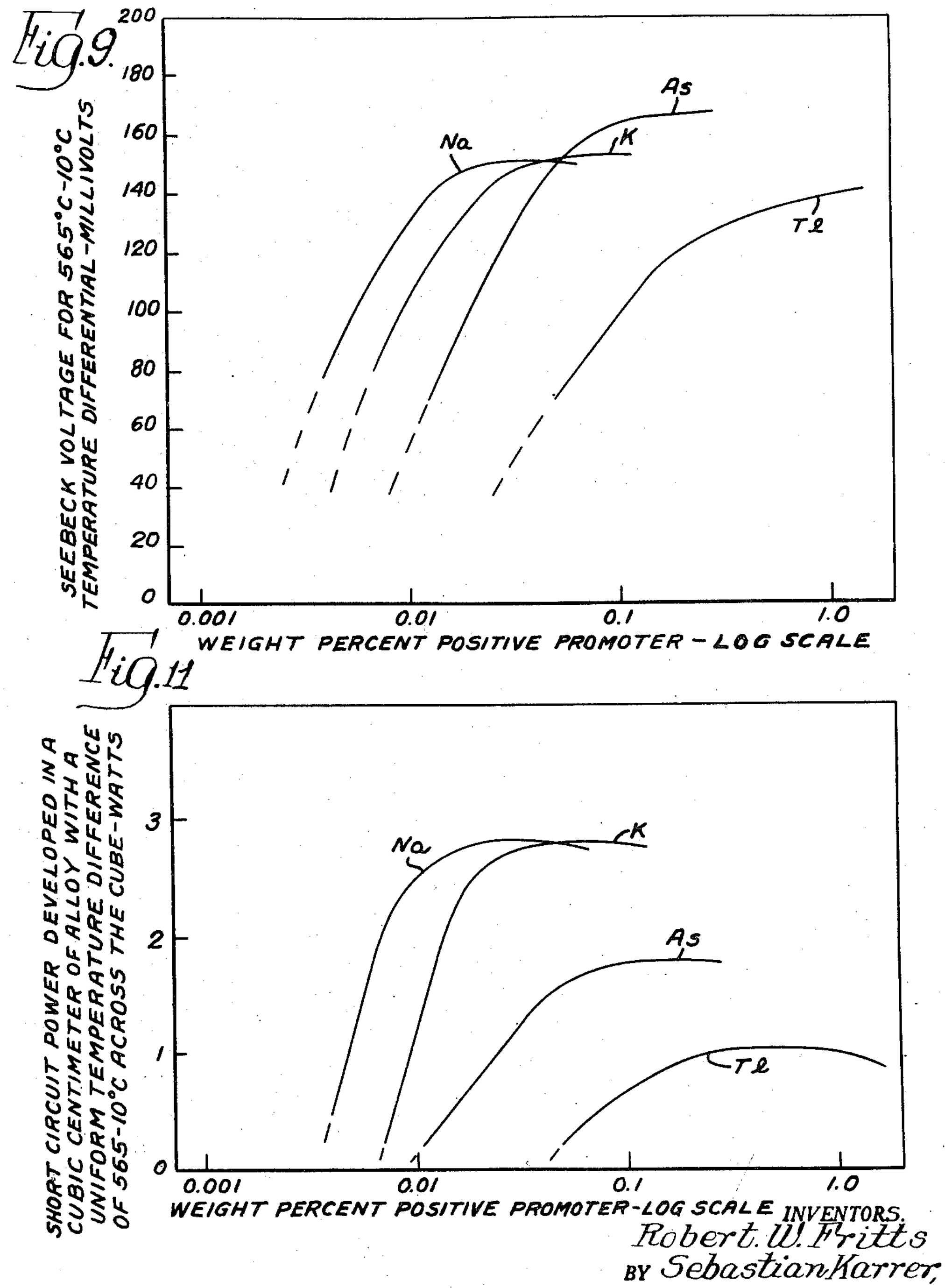
Figure 10:
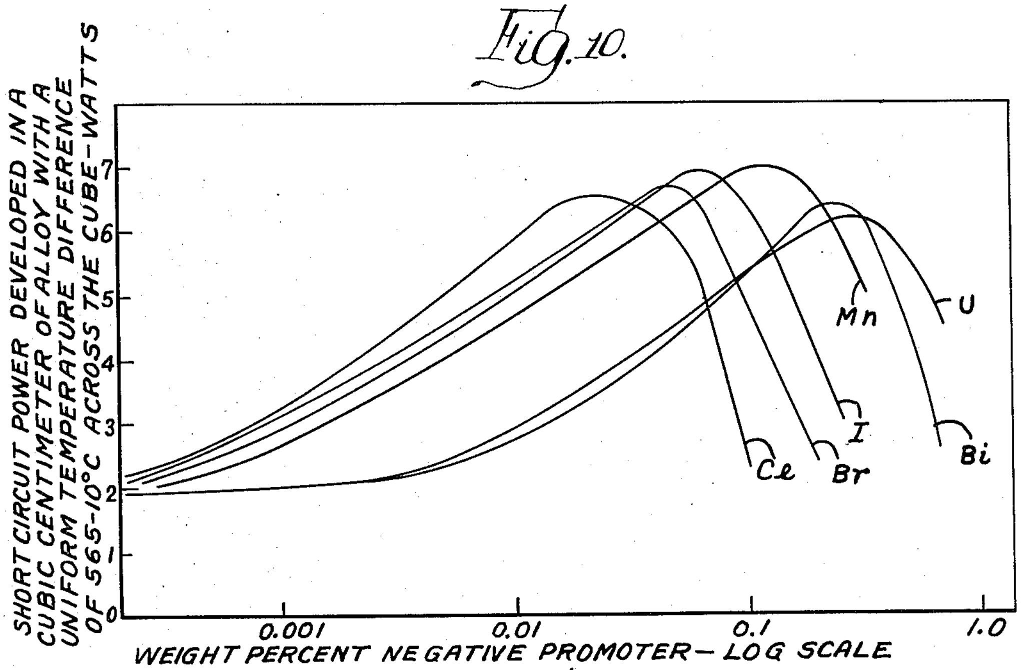
Figure 10A:
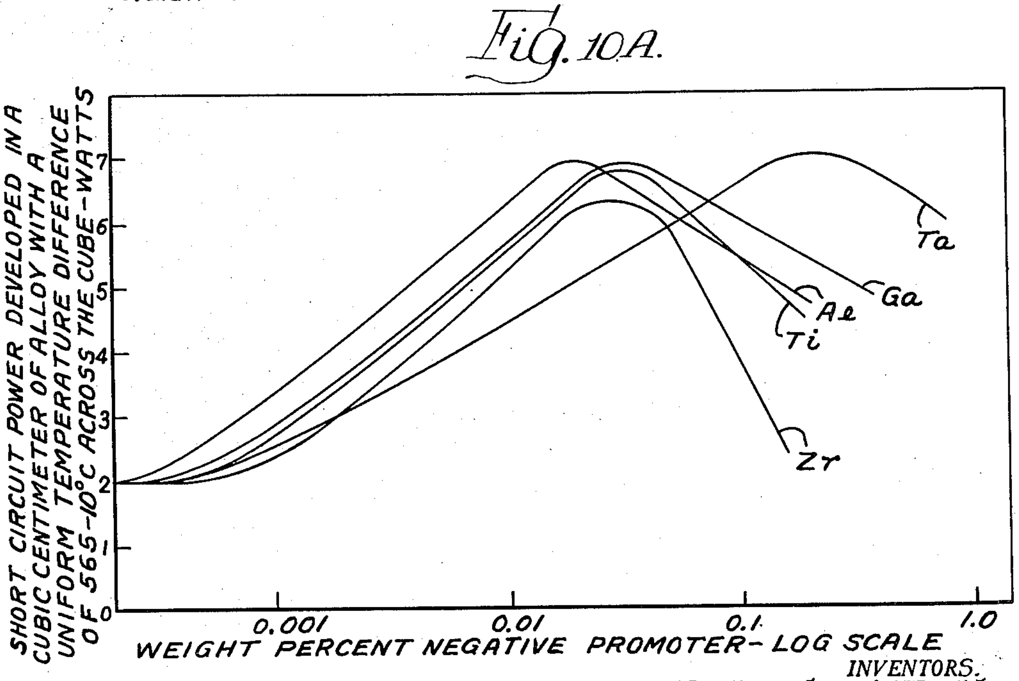
Figure 12:
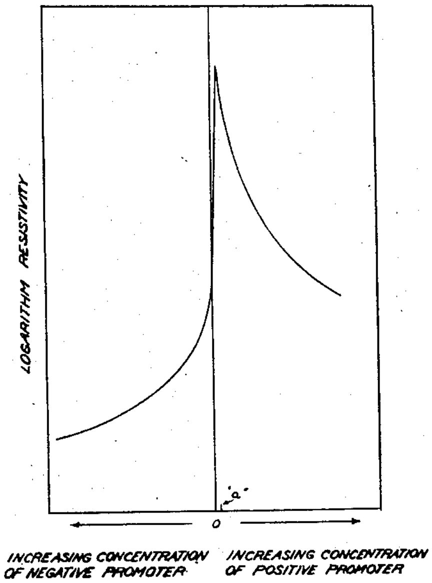
Figure 12A:
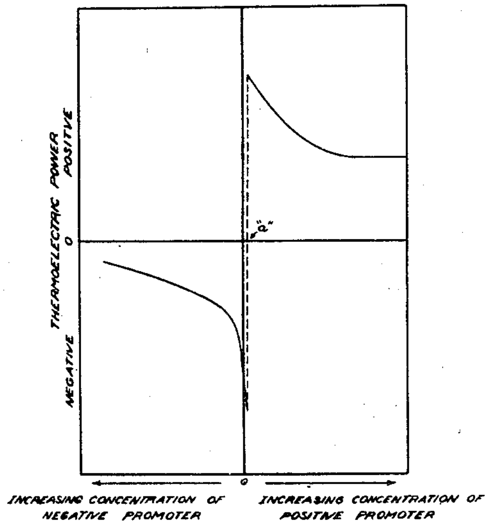
Figure 13:
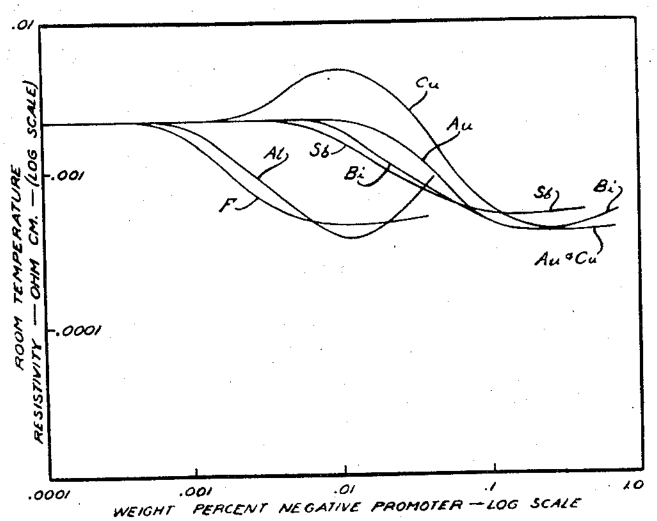
Figure 13A:
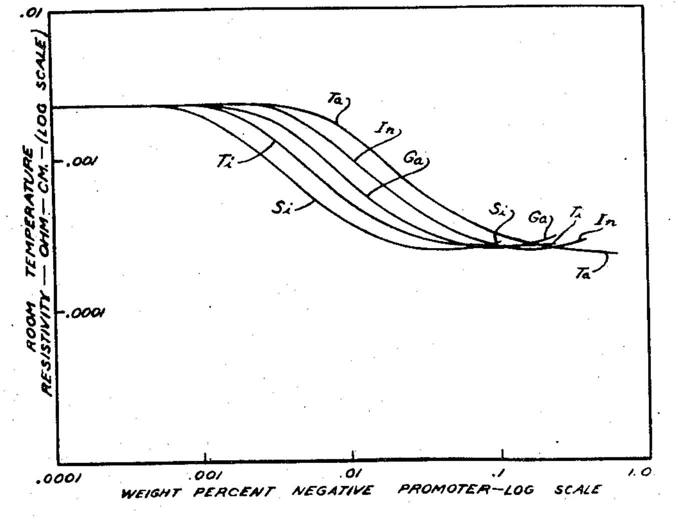
Figure 13B:
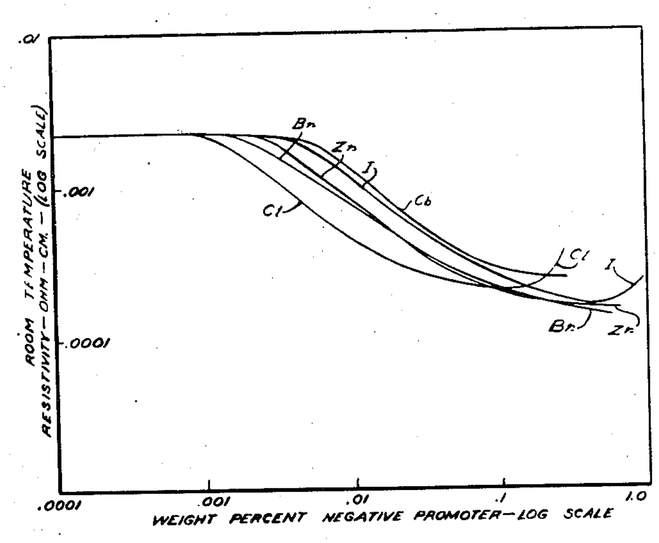
Figure 14:
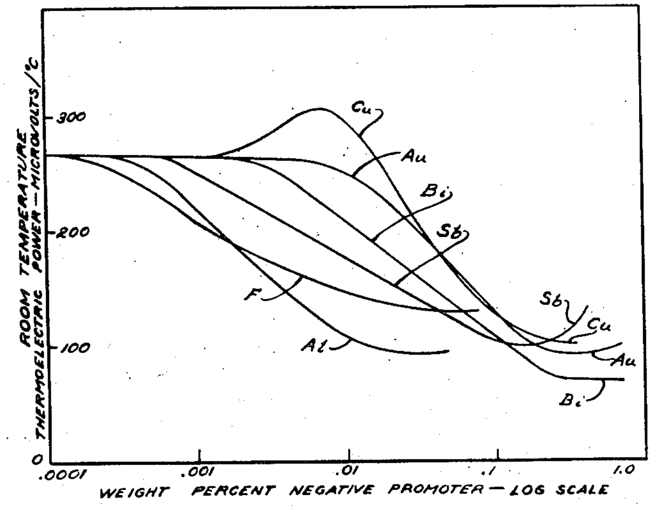
Figure 14A:
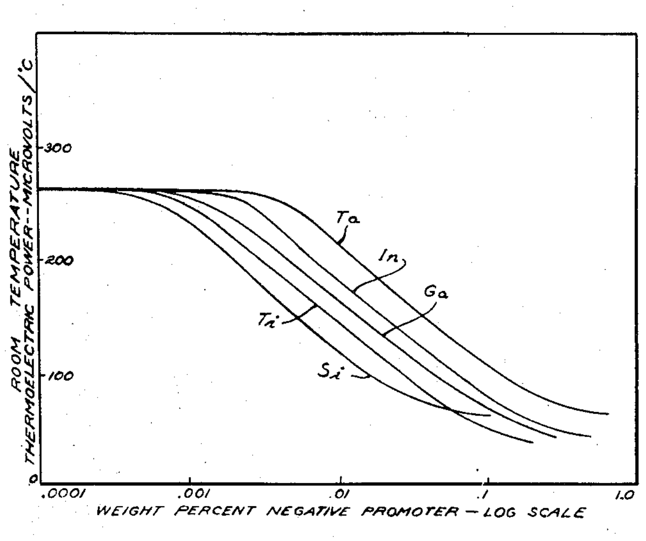
Figure 14B:
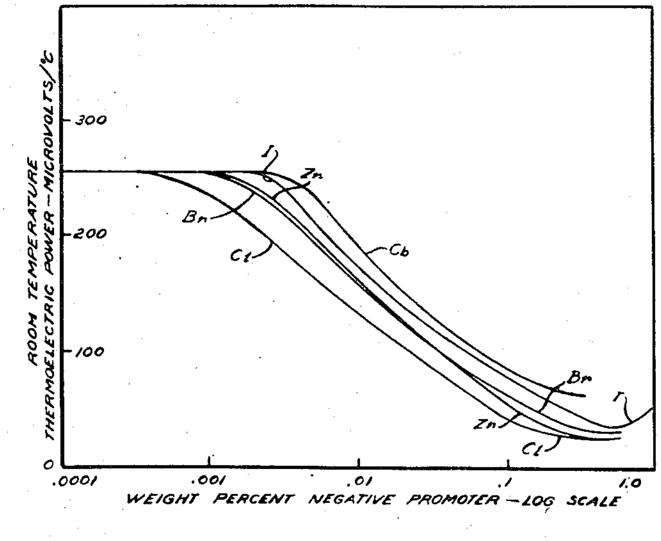
Figure 15:
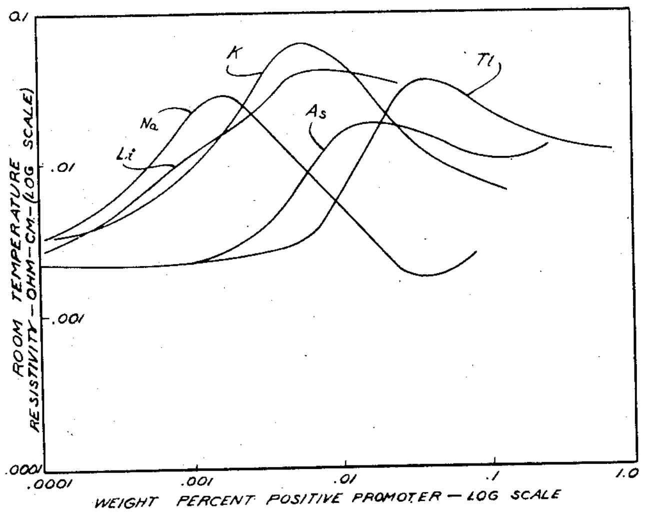
Figure 16:
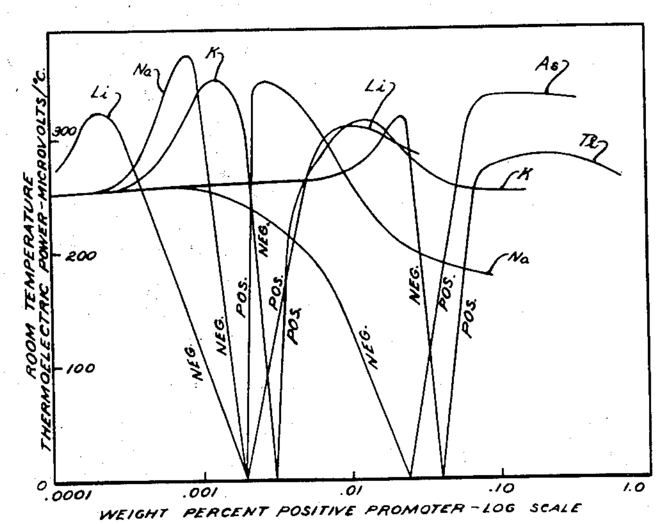
Figure 17:
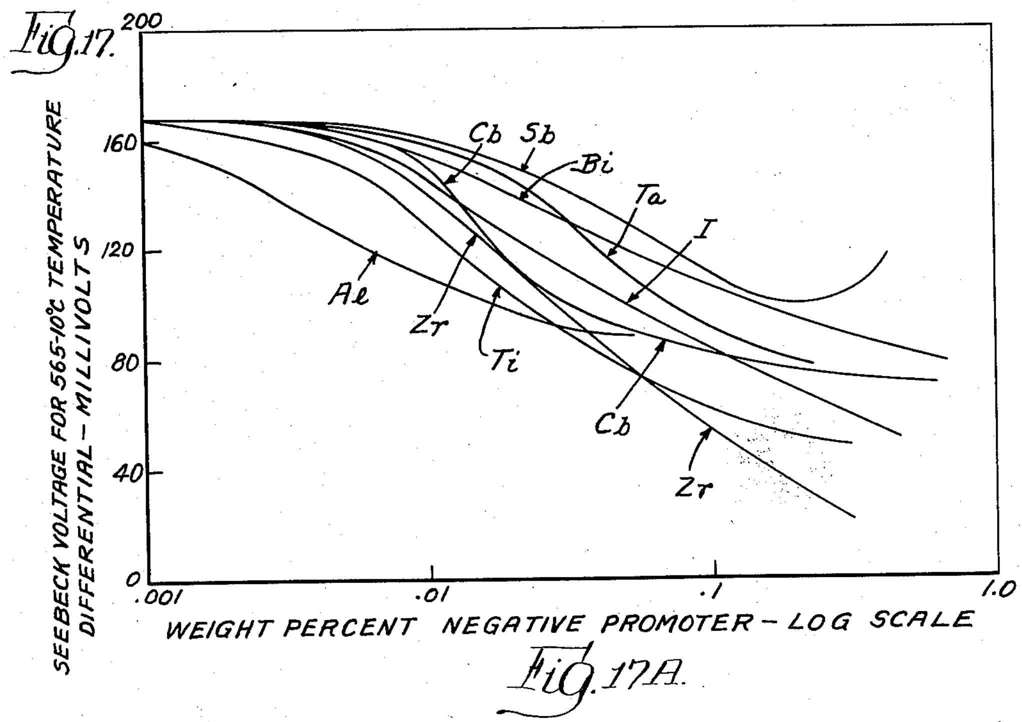
Figure 17A:
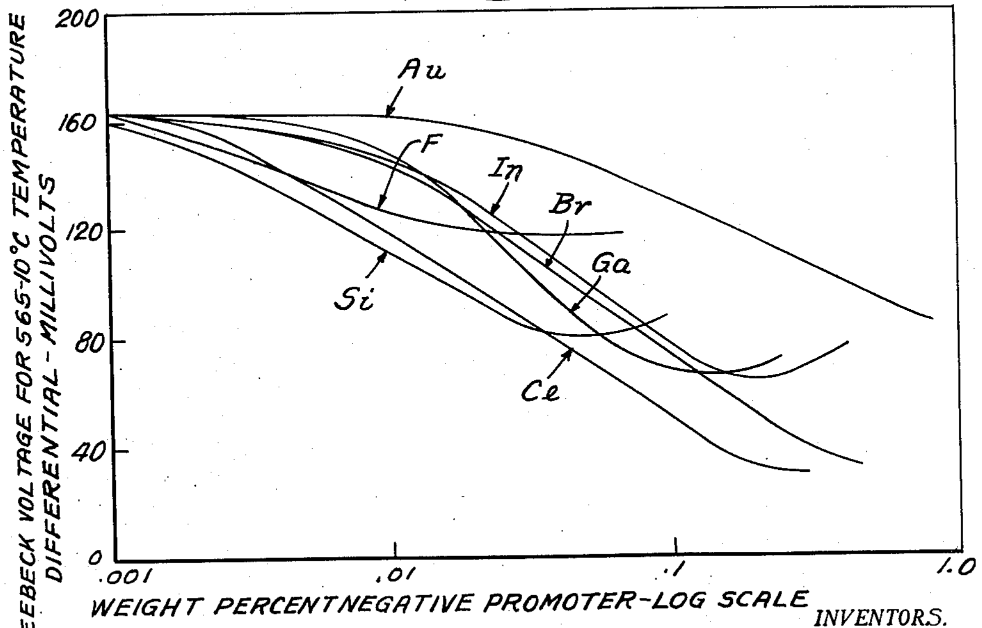
Figure 18:
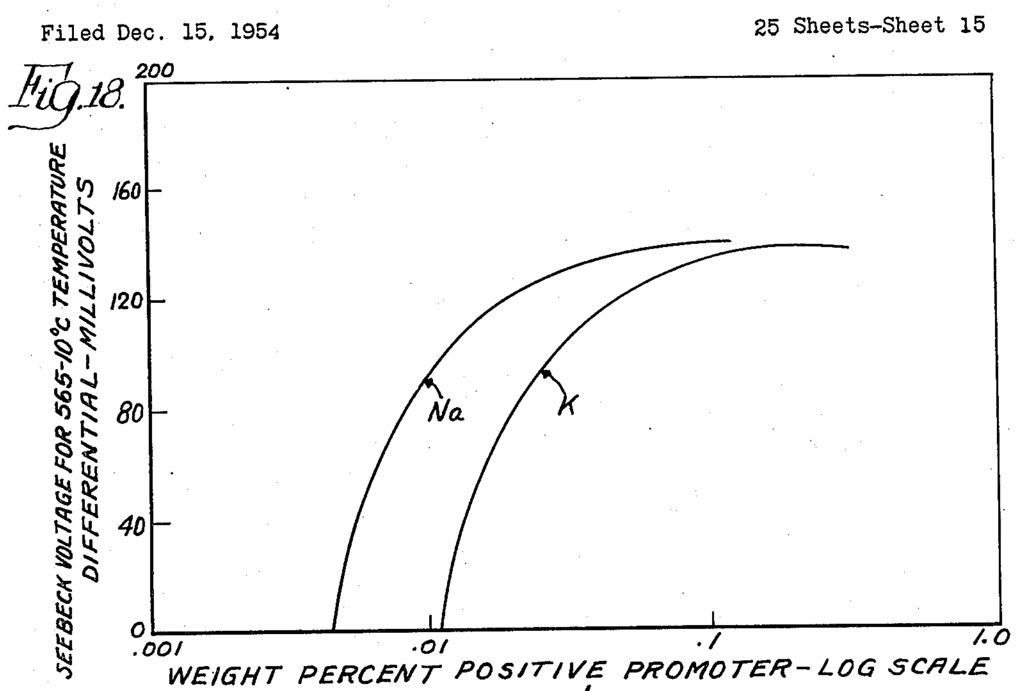

Figures 8 and 8A are graphic illustrations of the Seebeck E. M. F.'s for a temperature difference of 555° C. obtainable with thermoelectric conductor elements made of lead-tellurium semi-metallic alloys or compositions depicted in Figures 4 and 4A, respectively;

Figure 9 is a graphic illustration of the Seebeck E. M. F.'s for a temperature difference of 555° C. obtainable with thermoelectric elements made within certain ranges of third element additions of the lead-tellurium semi-metallic alloys or compositions depicted in Figure 6;

Figures 10 and 10A are graphic illustrations of the short circuit power developed in a cubic centimeter of the lead-tellurium alloys or compositions depicted in Figures 8 and 8A, respectively, with a uniform temperature difference of 555° C. across the cube;

Figure 11 is a graphic illustration of the short circuit power developed in a cubic centimeter of the lead-tellurium alloys or compositions depicted in Figure 6 with a uniform temperature difference of 555° C. across the cube;

Figure 12 is a graphic illustration generally indicating the effect of various concentrations of negative and positive promoters with respect to the resistivity characteristics of certain lead-selenium semi-metallic alloys or compositions with which the thermoelectric elements of the invention are concerned;

Figure 12A is a graphic illustration generally indicating the effect of various concentrations of negative and positive promoters with respect to the thermoelectric power characteristics of the lead-selenium semi-metallic alloys or compositions of which the thermoelectric elements of the invention are made;

Figures 13, 13A and 13B are graphic illustrations of the resistivity characteristics of certain of the lead-selenium semi-metallic alloys or compositions of which the thermoelectric elements of the invention are made within certain ranges of additions of negative promoters therein;

Figures 14, 14A and 14B are graphic illustrations of the thermoelectric power characteristics of the lead-selenium semi-metallic alloys or compositions depicted in Figures 13, 13A and 13B, respectively;

Figure 15 is a graphic illustration of the resistivity characteristics of certain lead-selenium semi-metallic alloys or compositions of which the thermoelectric elements of the invention are made within certain ranges of additions of positive promoters to such alloys or compositions;

Figure 16 is a graphic illustration of the thermoelectric power characteristics of the lead-selenium semi-metallic alloys or compositions depicted in Figure 15;

Figures 17 and 17A are graphic illustrations of the Seebeck E. M. F.'s for a temperature difference of 555° C. obtainable with thermoelectric conductor elements made of lead-selenium semi-metallic alloys or compositions depicted in Figures 13, 13A and 13B;

Figure 18 is a graphic illustration of the Seebeck E. M. F.'s for a temperature difference of 555° C. obtainable with thermoelectric elements made within certain ranges of third element additions of the lead-selenium semi-metallic alloys or compositions depicted in Figure 15.

Figures 1, 2:
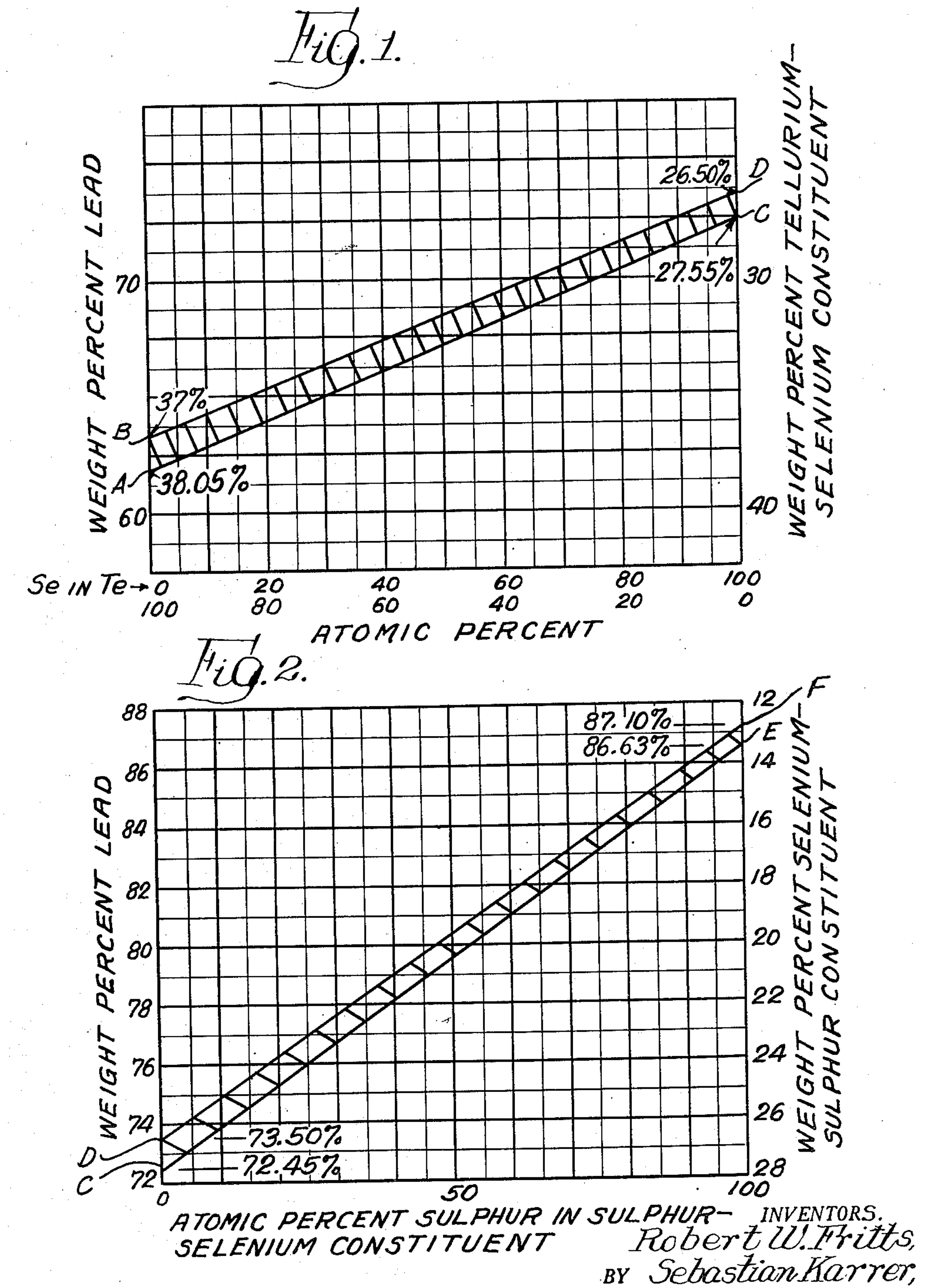
Figure 1 is a graphic illustration of the lead and tellurium-selenium base compositions or alloys of the invention and electrical conductors comprising such compositions or alloys.
Figure 2 is a graphic illustration of the lead and selenium-sulphur base compositions or alloys of the invention and electrical conductors comprising such compositions or alloys.
Figure 19:
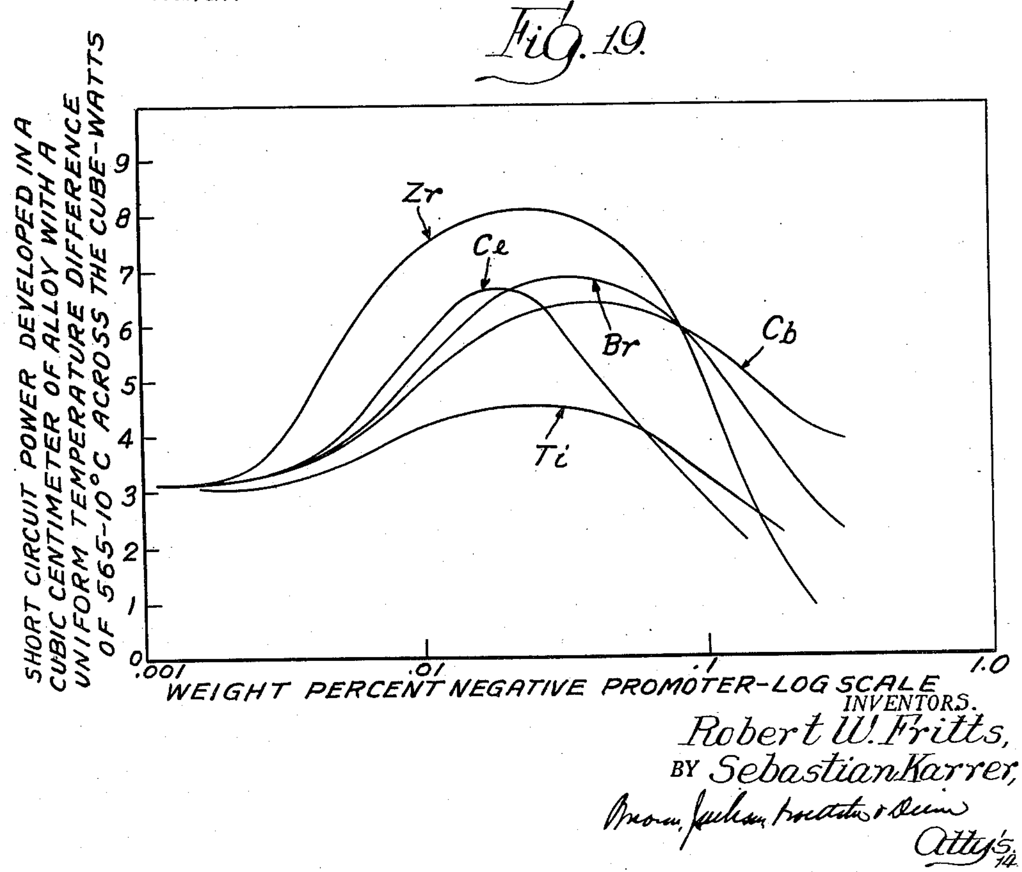
Figure 19A:
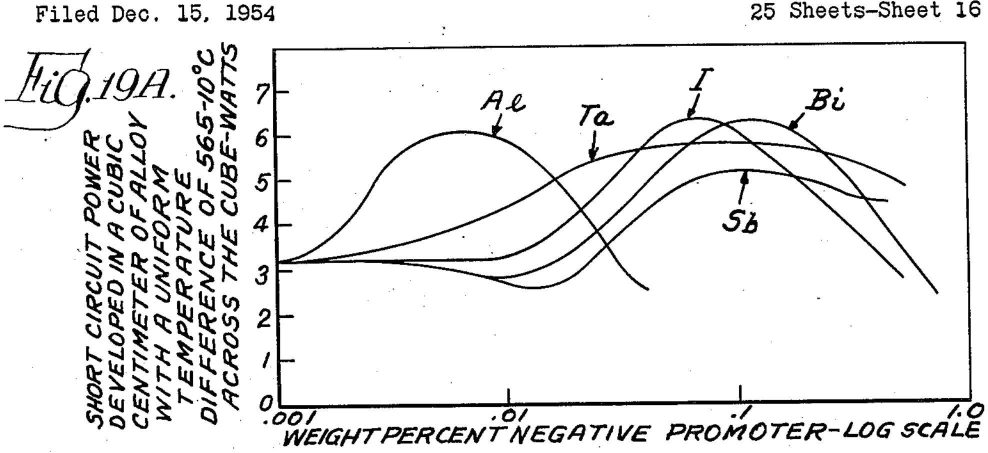
Figure 19B:
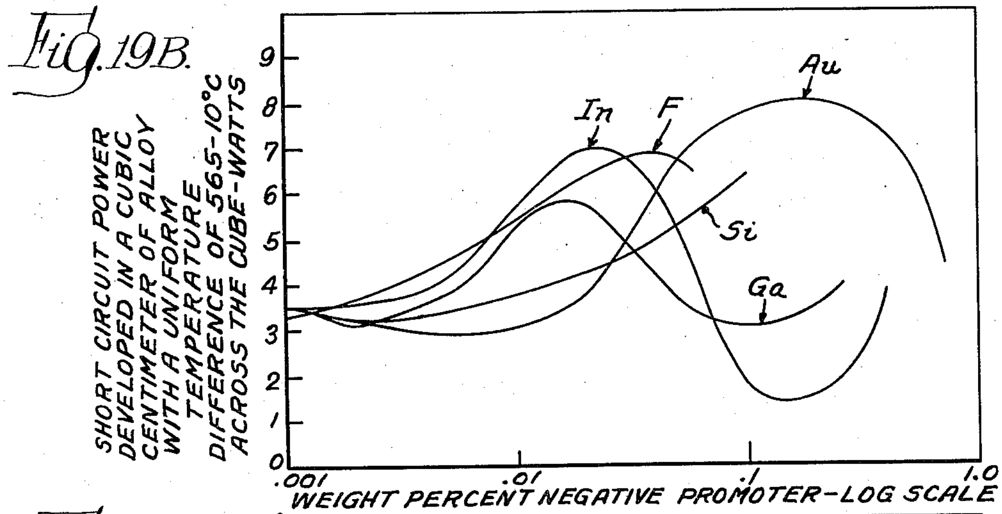
Figure 20:
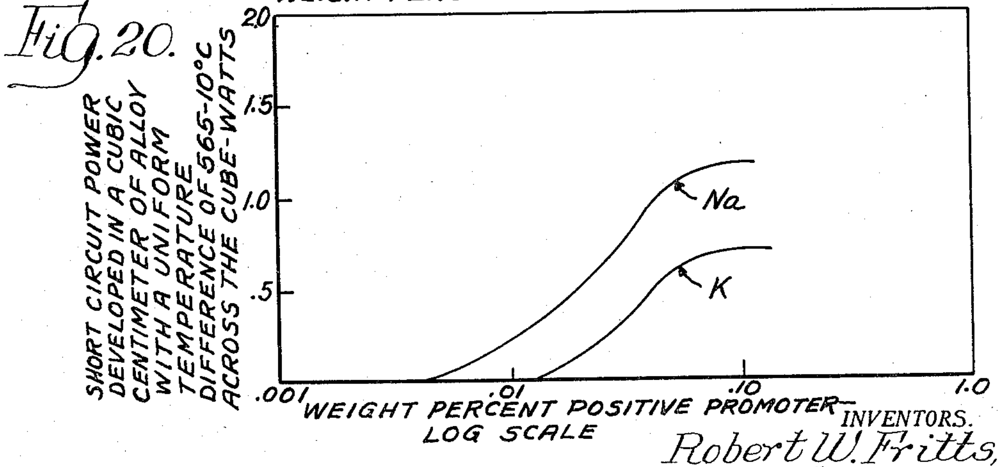
Figures 21, 21A:
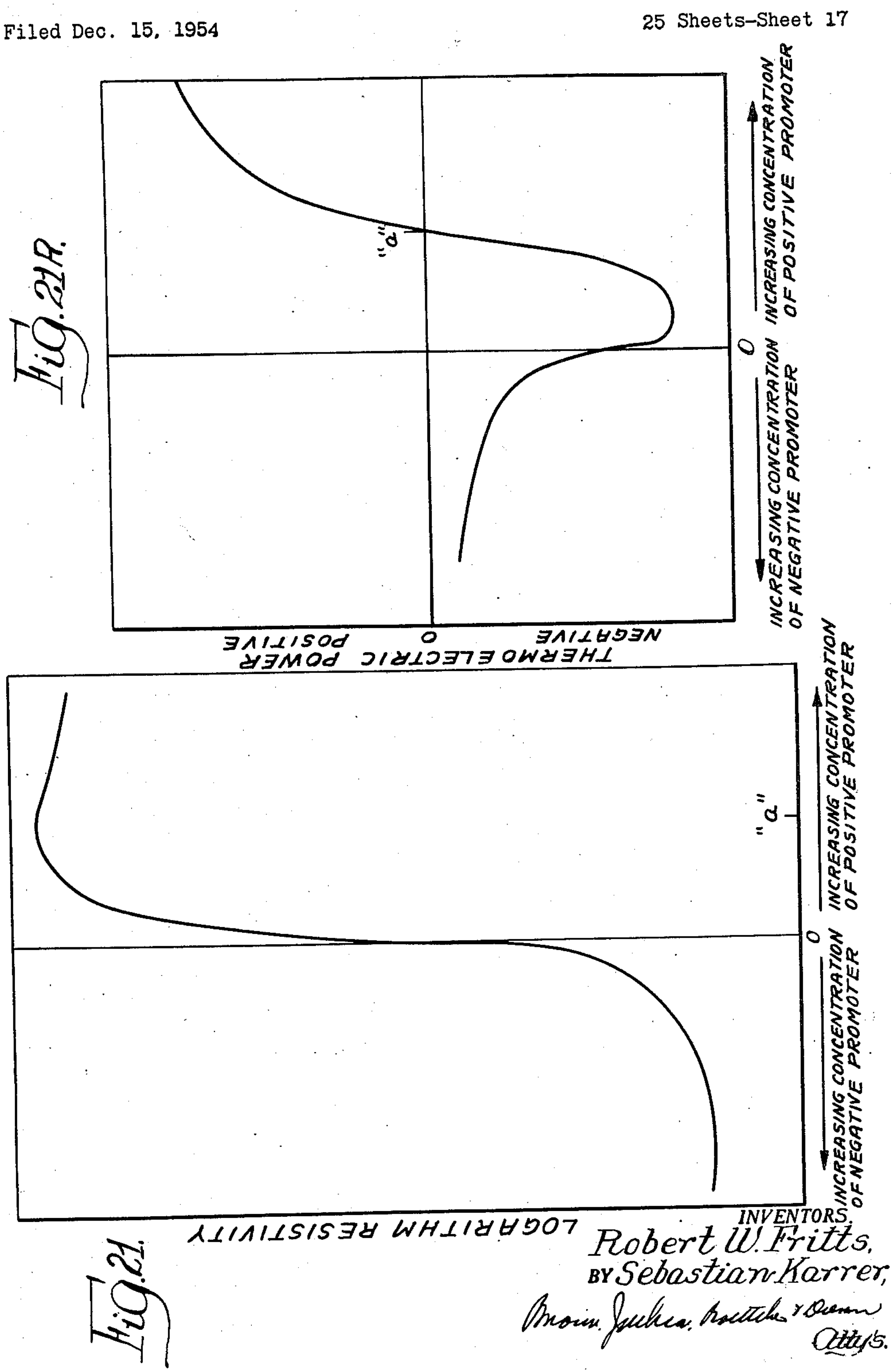
Figure 22:
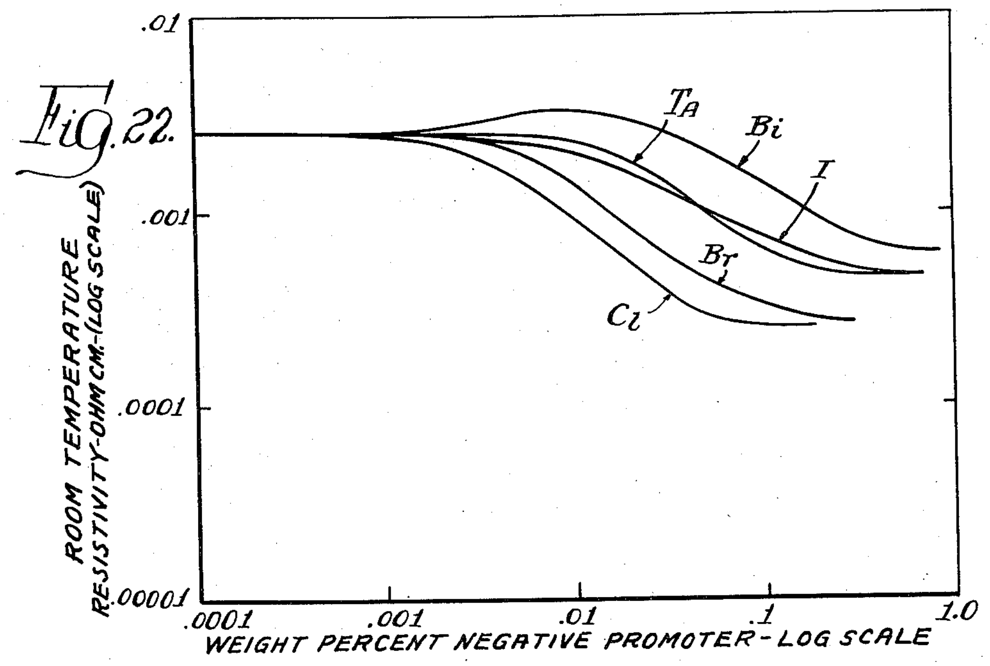
Figure 22A:
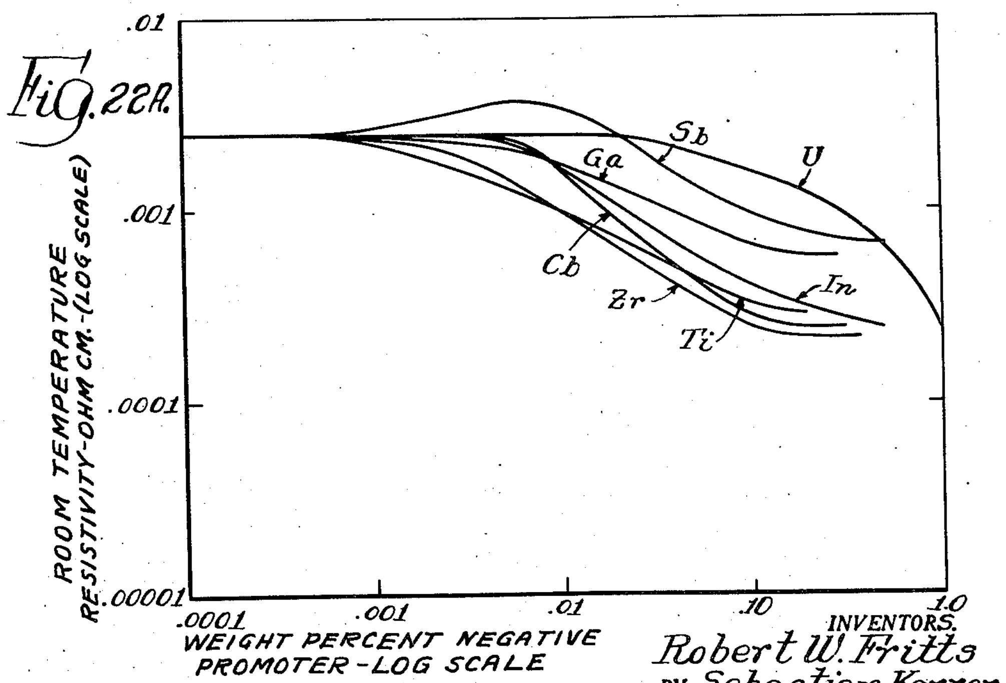
Figure 23:
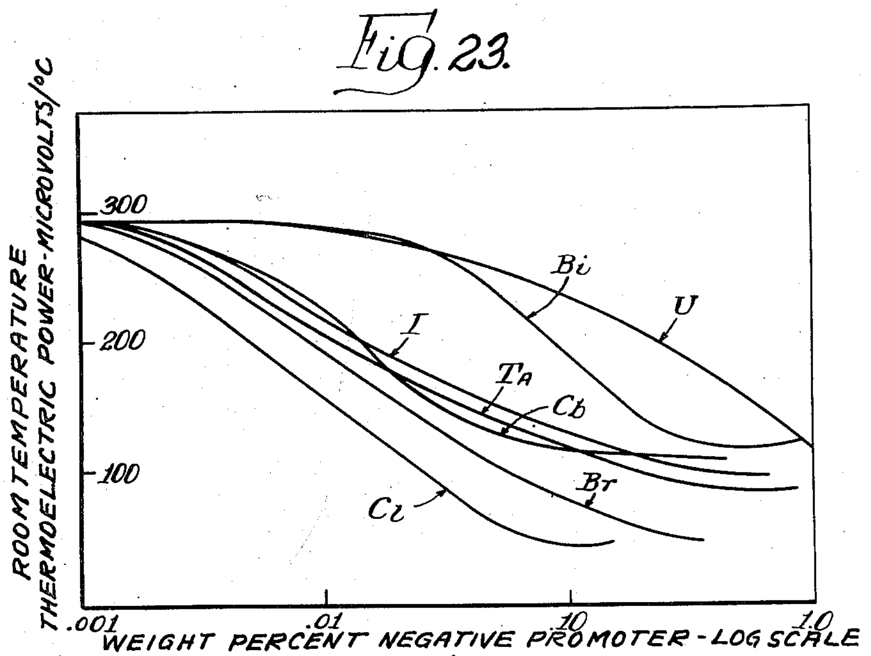
Figure 23A:
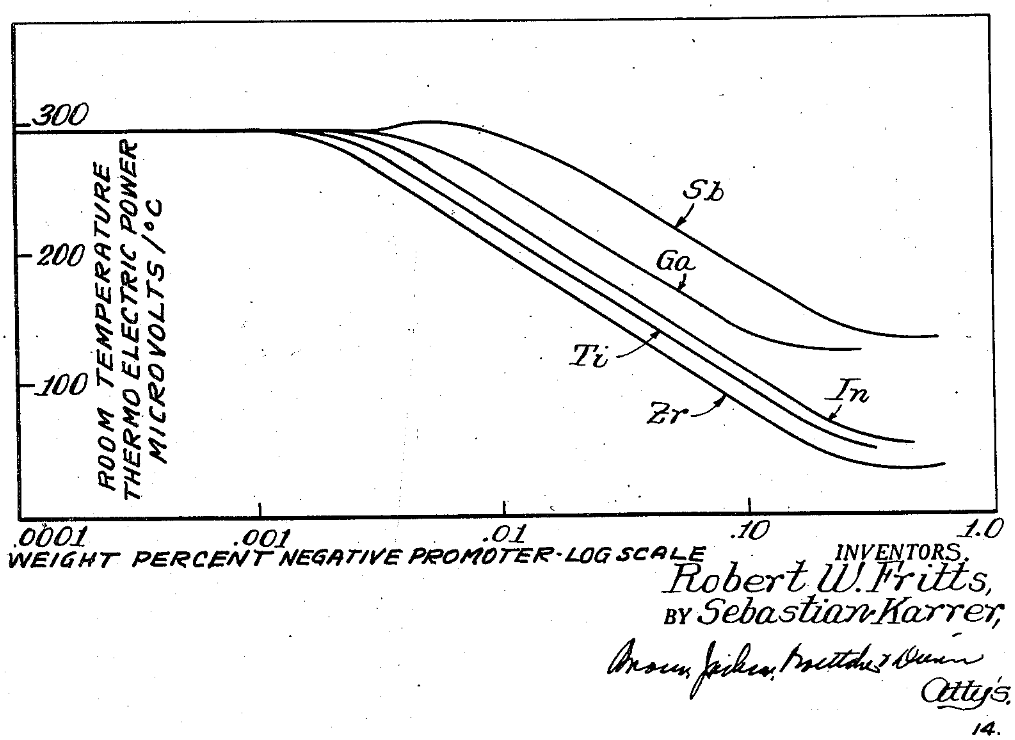
Figure 24:
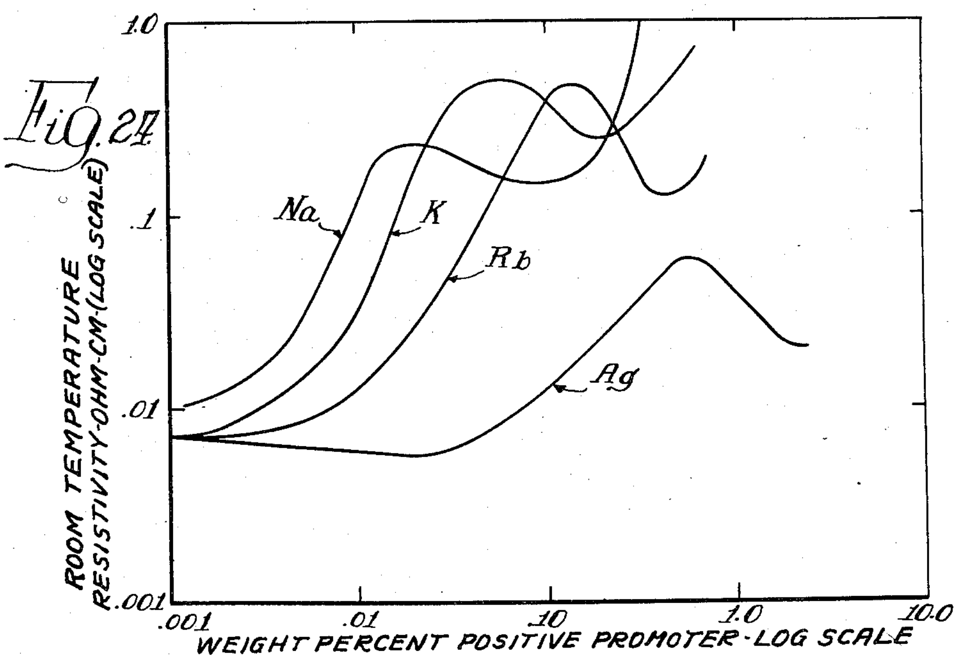
Figure 25:
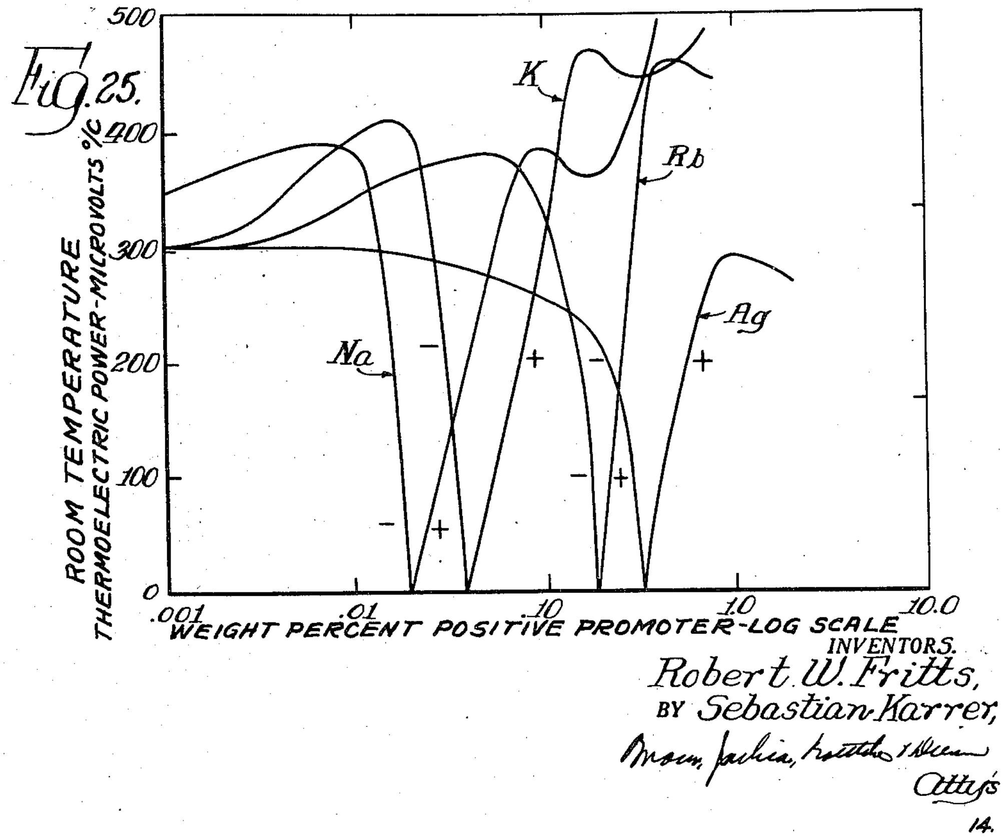
Figure 26:
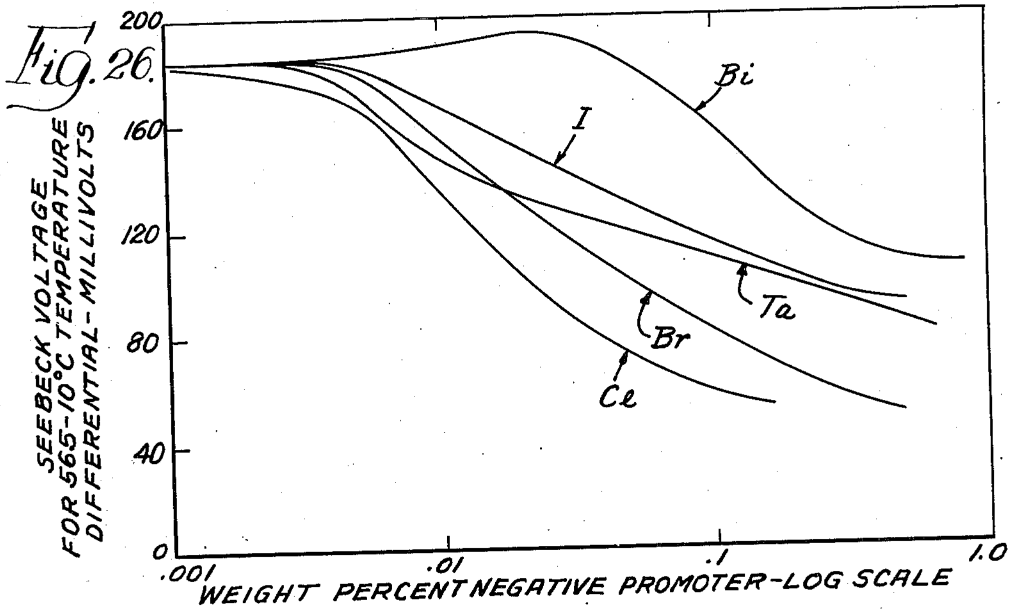
Figure 26A:
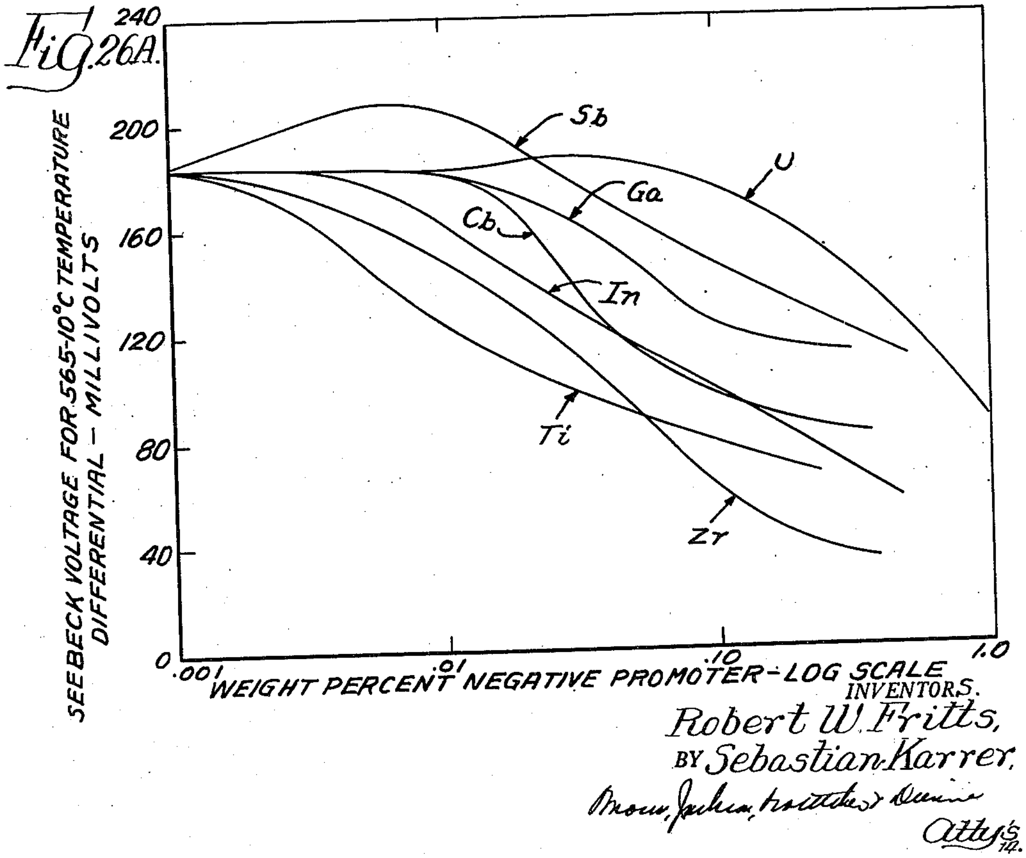
Figure 27:
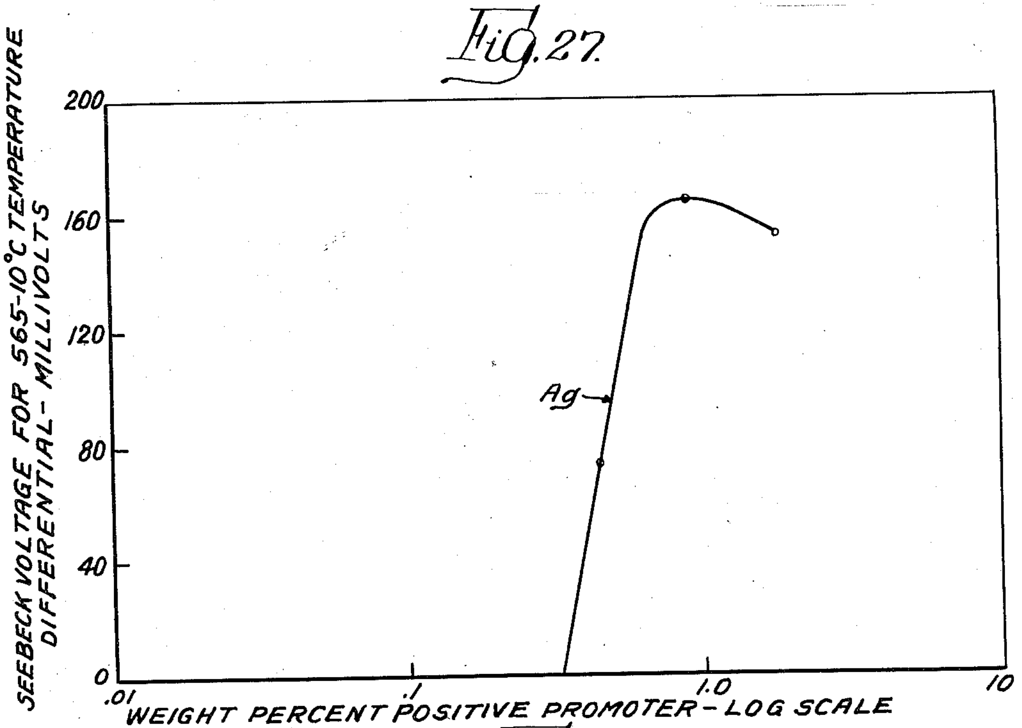
Figure 28:
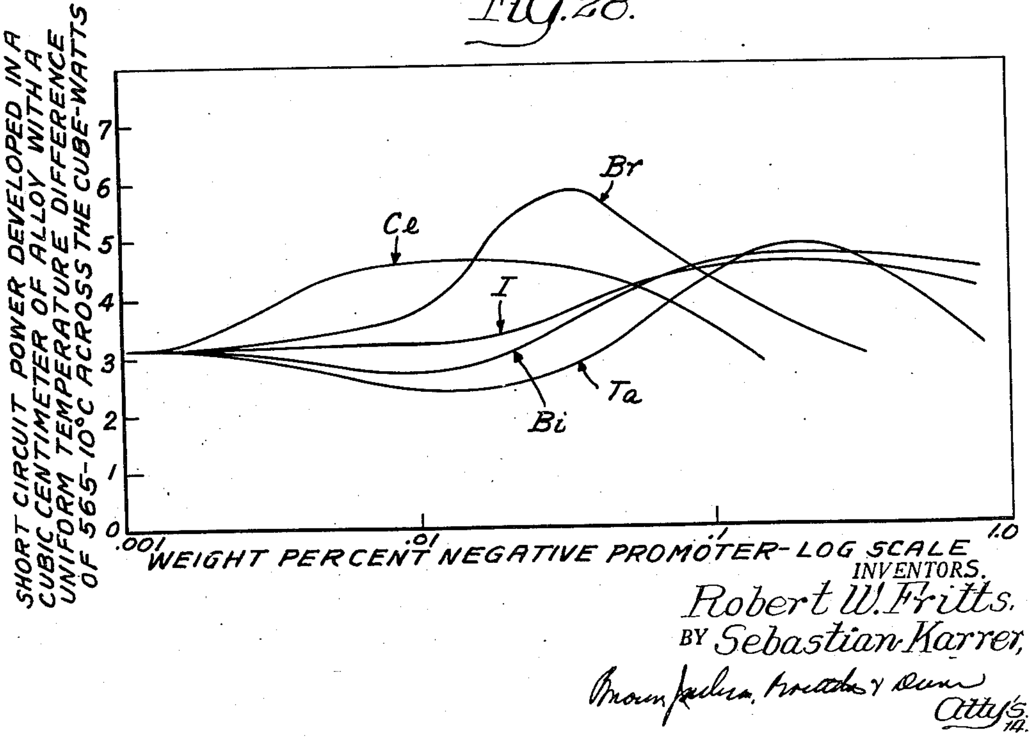
Figure 28A:
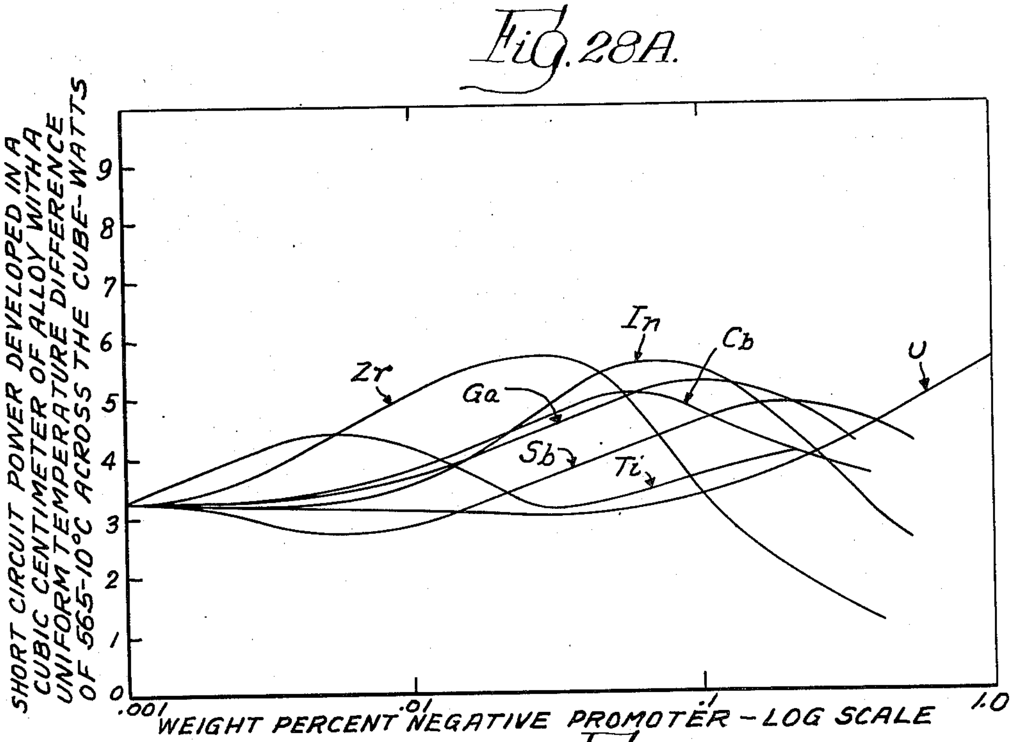
Figure 29:
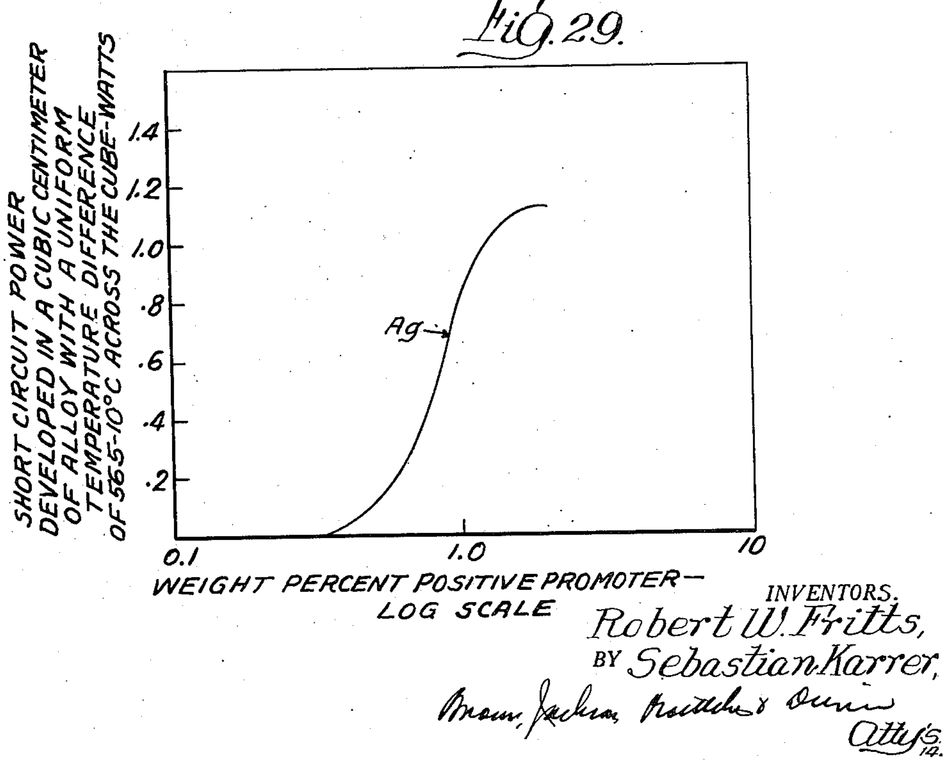
Figure 30:
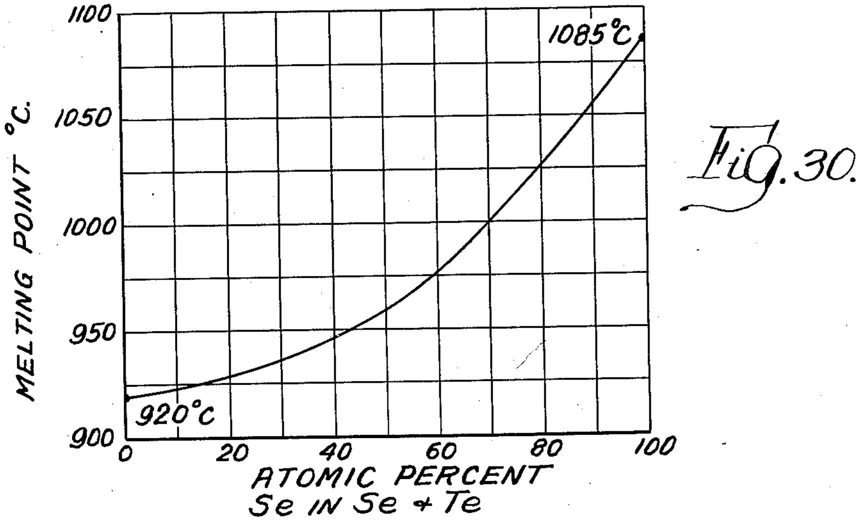
Figure 30A:
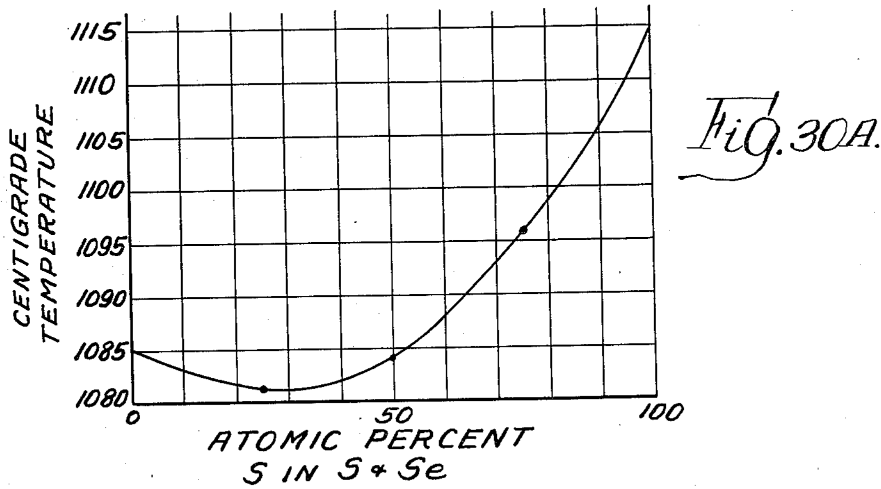
Figure 31:
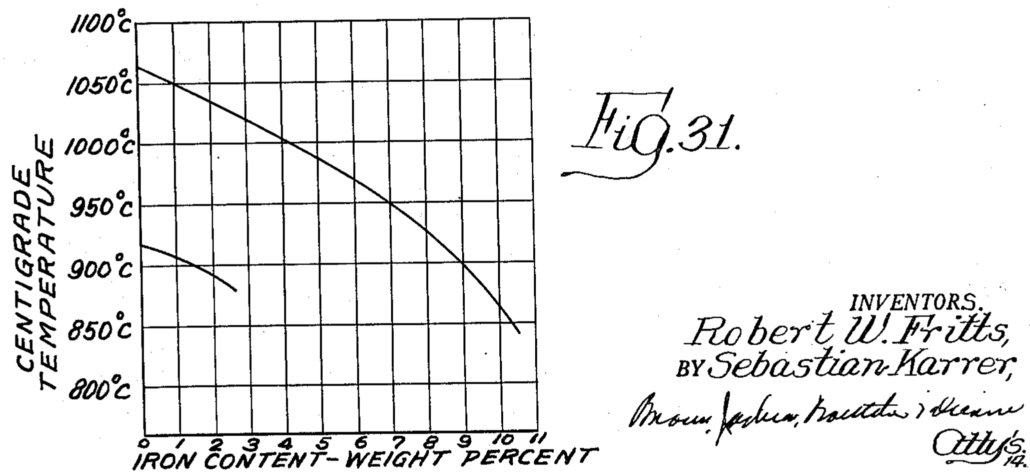
Figure 32:
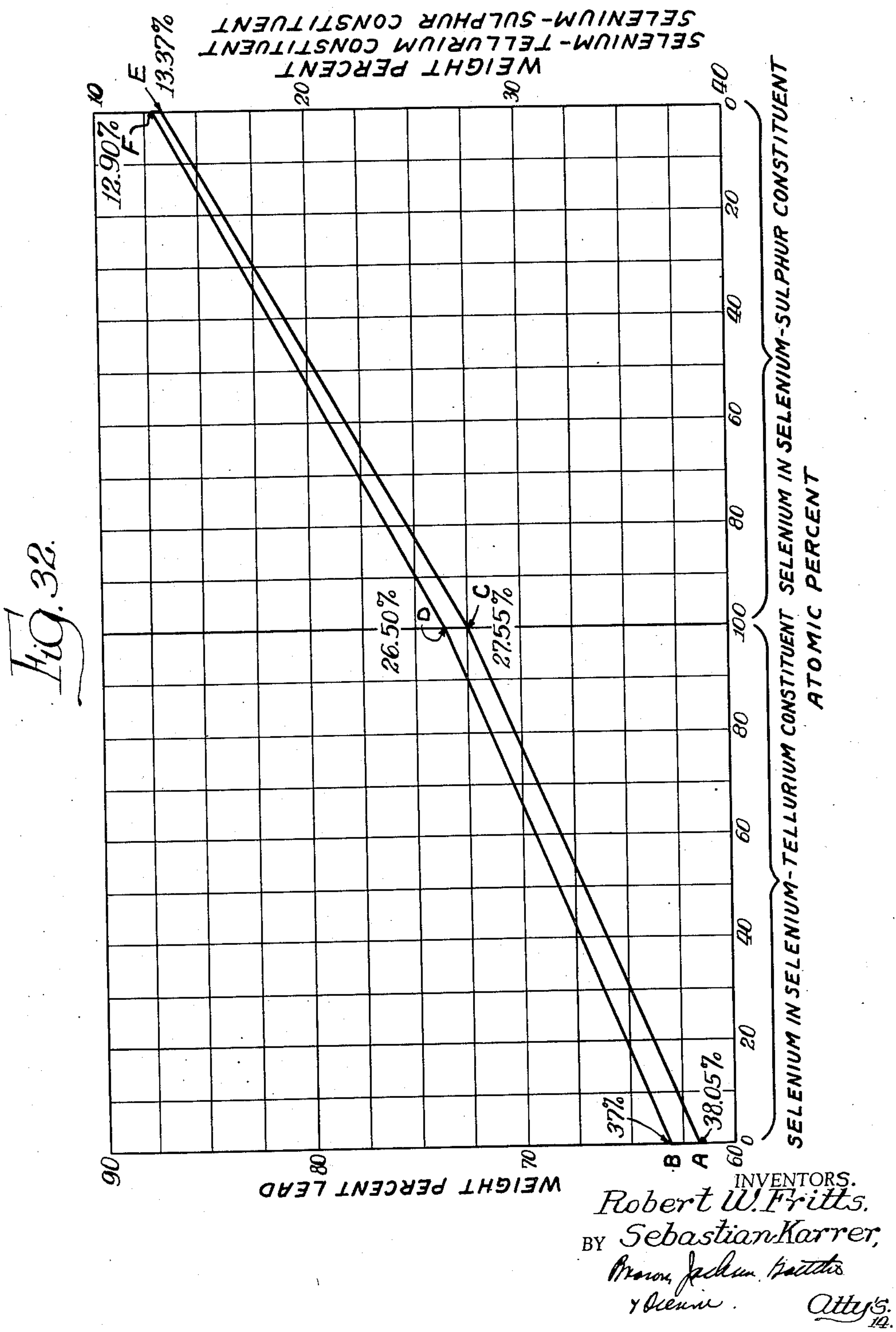

Figures 19, 19A and 19B are graphic illustrations of the short circuit power developed in a cubic centimeter of the lead-selenium semi-metallic alloys or compositions depicted in Figures 13, 13A and 13B, with a uniform temperature difference of 555° C. across the cube;

Figure 20 is a graphic illustration of the short circuit power developed in a cubic centimeter of the lead-selenium semi-metallic alloys or compositions depicted in Figure 15 with a uniform temperature difference of 555° C. across the cube;

Figure 21 is a graphic illustration generally indicating the effect of various concentrations of negative and positive promoters with respect to the resistivity characteristics of certain lead-sulphur semi-metallic alloys or compositions with which the thermoelectric elements of the invention are concerned;

Figure 21A is a graphic illustration generally indicating the effect of various concentrations of negative and positive promoters with respect to the thermoelectric power characteristics of the lead-sulphur semi-metallic alloys or compositions of which the thermoelectric elements of the invention are made;

Figures 22 and 22A are graphic illustrations of the resistivity characteristics of certain of the lead-sulphur semi-metallic alloys or compositions of which the thermoelectric elements of the invention are made within certain ranges of additions of negative promoters therein;

Figures 23 and 23A are graphic illustrations of the thermoelectric power characteristics of the lead-sulphur semi-metallic alloys or compositions depicted in Figures 22 and 22A, respectively;

Figure 24 is a graphic illustration of the resistivity characteristics of certain lead-sulphur semi-metallic alloys or compositions of which the thermoelectric elements of the invention are made within certain ranges of additions of positive promoters to such alloys or compositions;

Figure 25 is a graphic illustration of the thermoelectric power characteristics of the lead-sulphur semi-metallic alloys or compositions depicted in Figure 24;

Figures 26 and 26A are graphic illustrations of the Seebeck E. M. F.'s for a temperature difference of 555° C. obtainable with thermoelectric conductor elements made of lead-sulphur semi-metallic alloys or compositions depicted in Figures 22 and 22A, respectively;

Figure 27 is a graphic illustration of the Seebeck E. M. F.'s for a temperature difference of 555° C. obtainable with thermoelectric elements made within certain ranges of third element additions of the lead-sulphur semi-metallic alloys or compositions depicted in Figure 24;

Figures 28 and 28A are graphic illustrations of the short circuit power developed in a cubic centimeter of the lead-sulphur semi-metallic alloys or compositions depicted in Figures 22 and 22A, respectively, with a uniform temperature difference of 555° C. across the cube;

Figure 29 is a graphic illustration of the short circuit power developed in a cubic centimeter of the lead-sulphur semi-metallic alloys or compositions depicted in Figure 24 with a uniform temperature difference of 555° C. across the cube;

Figure 30 is a liquidus curve for the semi-metallic compositions graphically illustrated in Figure 1;

Figure 30A is a liquidus curve for the semi-metallic compositions depicted in Figure 2;

Figure 31 is a graphic illustration of the manner in which iron reduces the melting point of the compositions of Figure 1 of which the electrical conductors of the invention are made; and Figure 32 is a bi-axial diagram combining the diagrams of Figures 1 and 2.

Thermoelectric generator elements which will afford higher thermal conversion efficiency must exhibit, if possible, at one and the same time high values of thermoelectric power or Seebeck E. M. F., low resistivity and low thermal conductivity. We have found that certain alloys or intermetallic compounds exhibit very favorable relationships between Seebeck E. M. F. and resistivity and simultaneously favorable values of thermal conductivity. Further, we have found that the values of Seebeck E. M. F. and resistivity may be arbitrarily and advantageously altered to afford a wide range of relationships between resistivity and Seebeck E. M. F. without significant changes in thermal conductivity. Metals and metallic alloys exhibit low values of Seebeck E. M. F. and resistivity and simultaneously high values of thermal conductivity. On the other hand, semi-conductors exhibit low values of thermal conductivity and high values of Seebeck E. M. F. and resistivity. Thermal conversion efficiency of metals is low because of the high values of thermal conductivity and low values of Seebeck E. M. F. Thermal conversion efficiency of semi-conductors is low because of their high resistivities. Our invention is based on the fact that we have found a way to alter the electrical properties of certain intermetallic compounds (which in a pure state exhibit high Seebeck E. M. F. and resistivity and low values of thermal conductivity) to reduce their resistivity without a proportionate reduction in Seebeck E. M. F. or a significant increase in thermal conductivity. These intermetallic compounds which, in a pure state, are semi-conductors, are altered by adding small concentrations of beneficial impurities which render the semi-conductor somewhat more metallic in nature, thereby vastly improving the thermal conversion efficiencies. The resulting compositions exhibit high values of Seebeck E. M. F. and low values of resistivity and thermal conductivity in a relationship which cannot be achieved in either pure metals or pure semi-conductors. Such resulting compositions we have denominated "semi-metallic" compositions or alloys (to distinguish them from metallic alloys on the one hand and semi-conductor alloys on the other hand). Such semi-metallic alloys or compositions afford thermoelectric generator elements affording markedly higher thermal conversion efficiencies and markedly higher voltage output than conventional thermoelectric generator elements.

The semi-metallic alloys or compositions aforementioned may, we have found, be characterized as binary metallic compounds of slightly imperfect composition, i. e. containing beneficial impurities constituting departures from perfect stoichiometry by reason of an excess of one of the metals over the other, and containing added beneficial impurity substances denominated hereinafter "promoters." Such semi-metallic compositions have semiconductor-like conductance (both electrical and thermal, as aforementioned). Semi-metallic alloys or compositions also include mixtures of such binary metallic compounds, which may be denominated ternary metallic alloys or compositions.

More specifically, we have found especially useful for thermoelectric generators electrical conductors comprising lead and at least one member of the group tellurium, selenium and sulphur, in proportions hereinafter described, and to which are added beneficial impurities in the form of promoters, as will also hereinafter be describe. As will appear, certain of these alloys or compositions exhibit negative and certain exhibit positive electrical characteristics, thereby affording if desired a compound or double thermoelectric generator unit.

Referring now to Figure 1, there are graphically illustrated therein a multiplicity of examples of semi-metallic compositions or alloys for thermoelectric generator elements comprising lead and tellurium or selenium. It will be observed that the horizontal coordinate of this graph represents the various proportions of tellurium and selenium given in atomic percent and ranging linearly from tellurium containing but a "trace" (as hereinafter defined) of selenium on the left to selenium containing but a "trace" of tellurium on the right. The lefthand vertical scale (in terms of percent by weight) gives the amount of lead which can be alloyed with the tellurium, selenium or tellurium-selenium costituent for any proportions of the latter while the righthand vertical scale conversely gives the percent by weight of the tellurium, selenium or selenium-tellurium constituent for any proportions of the latter in the final composition, the remainder, of course, being lead.

Figure 1 graphically illustrates compositions or alloys comprising lead and either tellurium or selenium or both since, we have discovered, selenium and tellurium when alloyed with lead within the proportions indicated are mutually soluble throughout the range of compositions illustrated and that tellurium and selenium are interchangeable for purposes of providing suitable thermoelectric generator elements falling within the class of binary metallic compounds aforementioned, and due to such mutual solubility, such binary compounds of the constituents indicated may be mixed, as is also graphically illustrated, to provide the ternary alloys or compositions also hereinbefore mentioned. The discovery of such interchangeability of selenium and tellurium is important in the economic manufacture of thermoelectric elements of the character aforeindicated in that it eliminates the necessity for separating selenium from tellurium and vice versa (these two constituents being invariably found together as contaminants one to the other), a difficult and expensive procedure, and indeed impossible of complete achievement. Accordingly, even the end extremes of the compositions illustrated in Figure 1, i. e. that of the lefthand end of the scale (37.0% to 38.05% by weight tellurium, remainder substantially all lead), as indicated by solid line AB on the diagram of Figure 1, may be considered as containing at least a "trace" of selenium, while the composition at the other end of the scale (26.50% to 27.55% by weight selenium, remainder substantially all lead), as indicated by solid line CD on the diagram of Figure 1, may be considered as containing at least a "trace" of tellurium. Accordingly, where the term "trace" is used hereinafter in the specification and claims, it is to be understood as meaning amounts of the specified constituents and/or contaminants so small as to defy detection but which must be assumed to be present due to the impossibility of achieving absolute purity.

Again referring to Figure 1, by way of example, it will be observed that a thermoelectric element of lead, selenium and tellurium affording the desired characteristics could consist, as aforedescribed, of a selenium-tellurium constituent in which the selenium is but a trace. In this case such constituent should constitute from 37.0% to 38.05% by weight of the composition, the balance (63.0% to 61.95% by weight) being lead. On the other extreme, where the selenium-tellurium constituent consists almost entirely of selenium, with but a trace of tellurium, such constituent should comprise from 26.50% to 27.55% by weight of the final composition, the remainder (from 73.5% to 72.45% by weight) being lead. These extreme compositions, aforedescribed, may for purposes of this specification and claims be denominated "terminal" compositions and may be considered binary metallic compounds of slightly imperfect composition as will hereinafter appear.

As a further example, where the selenium and tellurium are equal (in atomic percent) in the selenium-tellurium constituent, the latter should constitute from 31.75% to 32.8% by weight of the composition, the remainder (68.25% to 67.2% by weight) being lead. Such a composition, as well as all other compositions illustrated in Figure 1, intermediate the terminal compositions aforedescribed, are mixtures (in various proportions) of the terminal compositions and since they contain both selenium and tellurium as well as lead, are ternary alloys or compositions.

Thus, the utilizable compositions of lead and tellurium-selenium constituents for purposes of practicing our present invention are represented on the diagram of Figure 1 by the area defined by the solid lines AB, BD, DC and CA.

Referring now to Figure 2, there are graphically illustrated therein a further multiplicity of examples of semi-metallic compositions or alloys for thermoelectric generator elements comprising lead and selenium or sulphur. As is the case in Figure 1, the horizontal coordinate of the graph of Figure 2 represents the various proportions of selenium and sulphur given in atomic percent and ranging linearly from selenium containing but a trace, as above defined, of sulphur on the left to sulphur containing but a trace of selenium on the right. The lefthand vertical scale (in terms of percent by weight) gives the amount of lead which can be alloyed with the selenium, sulphur or selenium-sulphur constituent for any proportions of the latter, while the righthand vertical scale conversely gives the percent by weight of the sulphur, selenium, or selenium-sulphur constituent for any proportions of the latter in the final composition, the remainder, of course, being lead.

Figure 2 further graphically illustrates compositions or alloys comprising lead and either selenium or sulphur or both since, we have discovered, selenium and sulphur when alloyed with lead within the proportions indicated are mutually soluble throughout the range of compositions illustrated and that selenium and sulphur are interchangeable for purposes of providing suitable thermoelectric generator elements falling within the class of binary metallic compounds aforementioned, and due to such mutual solubility such binary compounds of the constituents indicated may be mixed as is also illustrated to provide the ternary alloys or compositions also hereinbefore mentioned. The discovery of such interchangeability of selenium and sulphur is important in the economic manufacture of thermoelectric elements of the character aforeindicated in that it eliminates the necessity for separating selenium from sulphur and vice versa (these two constituents being invariably found together as contaminants one to the other), a difficult and expensive procedure and indeed impossible of achievement. Accordingly, even the end extremes of the compositions illustrated in Figure 2, i. e. that of the lefthand end of the scale (26.5% to 27.55% by weight selenium, remainder lead), as indicated by solid line CD on the diagram of Figure 2, may be considered as containing at least a trace of sulphur, while the composition at the other end of the scale (12.90% to 13.37% by weight sulphur, remainder substantially all lead), as indicated by solid line EF on the diagram of Figure 2, may be considered as containing at least a trace of selenium.

Again referring to Figure 2, by way of example, it will be observed that a thermoelectric element of lead, selenium and sulphur affording the desired characteristics could consist, as aforedescribed, of a selenium-sulphur constituent in which the sulphur is but trace. In this case, such constituent should constitute from 26.5% to 27.55% by weight of the composition, the balance (73.5% to 72.45% by weight) being lead. On the other extreme, where the selenium-sulphur constituent consists almost entirely of sulphur with but a trace of selenium, such constituent should comprise from 12.90% to 13.37% by weight of the final composition, the remainder (87.10% to 86.63% by weight) being lead. These extreme compositions aforedescribed may also, for purposes of the specification and claims, be denominated "terminal" compositions and may be considered binary metallic compounds of slightly imperfect composition as will hereinafter appear.

As a further example, where the selenium and sulphur are equal (in atomic percent) in the selenium-sulphur constituent, the latter should constitute from 19.7% to 20.46% by weight of the composition, the remainder (80.3% to 79.54% by weight) being lead. Such a composition, as well as other compositions illustrated in Figure 2 intermediate the terminal compositions aforedescribed, are mixtures (in various proportions) of the terminal compositions and since they contain both selenium and sulphur as well as lead, are ternary alloys or compositions.

We have also discovered that the terminal compositions aforedescribed consisting substantially entirely of lead and tellurium may to a limited extent contain some sulphur (i. e. to the extent that sulphur is found as a contaminant in commercially available tellurium) as well as selenium. Similarly, the terminal compositions aforedescribed consisting substantially of lead and selenium may contain to a limited extent tellurium and sulphur, as the case may be, and the terminal compositions aforedescribed consisting substantially of lead and sulphur may contain tellurium to a limited extent as aforeindicated as well as selenium. Likewise any of the intermediate or ternary alloys or compositions consisting of lead and at least two members of the group tellurium, selenium, sulphur, may contain such limited amounts of the other element of the group.

It should thus be observed that the utilizable compositions of lead and selenium-sulphur constituents for purposes of practicing our present invention are represented on the diagram of Figure 2 by the area defined by the solid lines CD, DF, FE and EC.

The proportions and ranges of the various constituents aforementioned as illustrated in the graphic representation constituting Figures 1 and 2 of the drawings must be considered critical if the compositions illustrated are to have the electrical properties desired in thermoelectric generators as aforementioned. The minimum limits of the lead constituent in the compositions of the invention (represented by solid lines AC and CE on the diagram of Figures 1 and 2) must be regarded as critical since if the lead content is significantly less than this amount for any particular proportions of the constituents, desired values of Seebeck E. M. F. and resistivity will not be afforded and the significant electrical and mechanical properties will not be reproducible. On the other hand, if the lead content of any composition appreciably exceeds the maximum limit (represented by the solid lines BD and DF on the diagrams of Figures 1 and 2) the resulting composition, we have found, is too metallic in nature to afford electrical characteristics satisfying the objects of this invention.

It is to be observed that Figure 32 combines in a bi-axial diagram the diagrams of Figures 1 and 2 and from which it will be seen that compositions of lead and tellurium-selenium and lead and selenium-sulphur, having utility for purposes of our present invention, are represented on Figure 32 by the area defined by the solid lines AB, BDF, FE and ECA. It will be further noted that solid lines CD of Figures 1 and 2 coincide in the diagram of Figure 7.

Not only are the proportions and ranges aforedescribed considered to be critical, but so also is the purity. More specifically, the limit of tolerable metallic impurity in the final composition has been found to be on an order of magnitude of 0.001% and a composition must be substantially oxygen free if the mechanical and electrical properties desired are to be obtained and be reproducible. Such purity may be achieved by utilization of lead, tellurium, selenium and sulphur which do not contain metallic impurities exceeding an order of magnitude of 0.001%. Alternatively, starting consitituents of lesser purity may be utilized where the formed composition is put through a recrystallization step, to be hereinafter described, to provide the final or end composition of the order of purity aforeindicated. Accordingly, the starting ingredients or, in any event, the final composition where mentioned in this specification and appended claims are to be understood to be of the order of purity aforeindicated. Several impurities commonly found in commercial stocks of all four of the constituents will reduce the Seebeck E. M. F. exhibited by compositions of the present invention and hence must be substantially removed by purification. For example, copper is one example of such an impurity having a deleterious effect.

The aforementioned alloys of lead and at least one of the group tellurium, selenium, sulphur, may be best described metallographically as two-phase alloys. It has been observed that these two-phase alloys, when sectioned and examined microscopically, comprise a major phase comprising crystal grains varying usually from 1 to 10 millimeters in size and between such grains there exist thin, relatively darker regions of a second phase. The grains of the primary phase are crystals of the intermetallic compounds lead-telluride, lead-selenide and lead-sulphide (or mixed crystals thereof), which contain approximately 61.89%, 72.41% and 86.60% lead by weight, respectively. The darker second phase, clearly discernible at the grain boundaries, is lead containing a minor concentration of selenium, tellurium or sulphur. The function of the second phase in such alloys is thought to be threefold. First, the thermal equilibrium between the two phases, which is established by the heat treatment hereinafter described, induces negative Seebeck E. M. F. and conductivity in the primary lead-telluride, lead-selenide or lead-sulphide phase which, because of its high concentration in the alloy, controls the electrical properties of the two-phase alloy. Secondly, the thin layers act as a cementing agent for the grains of the primary phase, thereby improving the mechanical strength of the alloy when compared with that of the pure intermetallic compound. Thirdly, this cementing action of the second phase affords good electrical conductivity in the polycrystalline alloy by rendering the intergranular component of electrical resistivity negligible. We have found that the actual concentration of second phase is not critical so long as the composition is maintained within the aforementioned specified ranges.

With regard to such aforementioned specified ranges for the various compositions aforedescribed, it will be observed that in each case there is an excess of lead over and above the amount thereof necessary for satisfying the stoichiometric proportions of the compound formed with the second constituent or constituents, i. e. the tellurium, selenium or sulphur. Taking by way of example the aforementioned terminal compositions, it will be noted that the first terminal composition consisting substantially of lead and tellurium contains from 61.95% to 63.0% by weight lead, or from .16% to 3.2% lead by weight of the total composition over and above the 61.89% lead stoichiometrically necessary to combine with the tellurium. Similarly, the terminal composition consisting substantially of lead and selenium contains from .15% to 4.1% lead by weight of the total composition over and above the 72.41% by weight lead stoichiometrically necessary for combination with the selenium. The same is, of course, true with respect to the terminal composition consisting substantially of lead and sulphur wherein the amount of lead specified for compositions of the present invention is from .23% to 3.9% lead by weight of the total composition more than that necessary to stoichiometrically combine with the sulphur present, i. e. 86.60% by weight lead. Similarly, for any of the compositions intermediate the aforementioned terminal compositions there exists within the composition ranges specified in Figures 1 and 2 an excess of lead over and above that stoichiometrically necessary to combine with the tellurium-selenium or selenium-sulphur constituent in percent by weight varying according to the relationship of such intermediate composition to the terminal compositions.

The excess of lead aforementioned inherent in all of the compositions aforedescribed within the ranges thereof graphically illustrated in Figures 1, 2 and 32 may be denominated an impurity with respect to the primary lead-telluride, lead-selenide and lead-sulphide phases, as the case may be. Such impurities, however, must be distinguished from the undesired impurities discussed hereinbefore in connection with the required purity requirements of the compositions or alloys. Accordingly, for purposes of this specification and the appended claims such excess lead amounts purposely present in the compositions will be denominated "beneficial impurities." As aforeindicated, it is the presence of such beneficial impurities that affords the compositions of this invention their desired electrical characteristics and distinguishes the semi-metallic alloys or compositions of this invention from the primary phase intermetallic compounds lead-telluride, lead-selenide and lead-sulphide. More specifically, such beneficial impurities afford such intermetallic compounds, whether the binary compounds of the terminal compositions or the ternary alloys of the intermediate compositions, a lower resistivity without proportional sacrifice of Seebeck E. M. F. or low thermal conductivity and which results in a composition having what may be termed semiconductor-like electrical conductance or conductivity. It should be noted that such excess lead induces in each of the compositions aforedescribed a Seebeck E. M. F. of negative polarity and negative conductivity, thereby affording a thermoelectric generator element having utility in, for example, a single element thermoelectric generator or in combination with a thermoelectric generator element of opposite polarity, a double or compound thermoelectric generator.

For convenience, the aforedescribed lead-tellurium, lead-selenium, lead-tellurium-selenium, lead-sulphur and lead-selenium-sulphur compositions of the aforementioned range and purity will be hereinafter denominated "base compositions." Also for convenience, the following description of thermoelectric elements comprising such compositions will be discussed in terms of the terminal compositions aforedescribed, it being understood that compositions intermediate such terminal compositions exhibit similar characteristics.

In the lead-tellurium alloys of the aforementioned range and purity the magnitudes of the thermoelectric power and electrical resistivity of the aforementioned base lead-tellurium alloys are, we have found, strongly dependent upon the heat treatment afforded the alloy during fabrication, thereby affording control over such properties by the heat treatment. For example, a lead-tellurium alloy within the above-stated range of composition, which has been annealed for several hours at from 540° C. to 815° C. and then quenched, exhibits lower thermoelectric power and electrical resistivity than do the same alloys which have been similarly annealed and then cooled slowly to lower temperatures. The following table, identified as Table I, sets forth representative electrical properties, at room temperatures, of the lead-tellurium alloys aforedescribed as a function of the quenching temperature. The data of Table I represents lead-tellurium alloys which have been annealed at from 540° C. to 815° C. and slowly cooled (e. g. 50° C. per hour) to the indicated temperatures in column 1, and from which temperatures they were quenched.

*Table I*

| Equilibrium Temperature Prior to Quenching | Thermoelectric Power, Micro-volts/° C. | Resistivity, Ohm-Cm. |
|---|---|---|
| 815° C | −316 | 0.0023 |
| 704° C | −352 | 0.0034 |
| 538° C | −396 | 0.0074 |
| 427° C | −414 | 0.0150 |
| 316° C | −414 | 0.0173 |
| 204° C | −414 | 0.0175 |

Similarly, in the case of the lead and selenium-sulphur alloys of the aforementioned range and purity the magnitudes of the thermoelectric power and electrical resistivity are, we have found, also strongly dependent upon the heat treatment afforded the alloy during fabrication as aforedescribed, thereby affording control over such properties by the heat treatment. For example, a lead and selenium-sulphur alloy within the above-stated range of composition which has been annealed as aforeindicated for several hours at from 540° C. to 815° C. and then quenched exhibits lower thermoelectric power and electrical resistivity than do the same alloys which have been similarly annealed and then cooled slowly to lower temperatures. The following tables, identified as Tables II and III, set forth representative electrical properties at room temperature of the lead-selenium and lead-sulphur alloys, respectively, aforedescribed as a function of the quenching temperature. These tables are indicative merely of the variation in properties which can be afforded by quenching of the composition from various temperatures, and by way of example. Compositions intermediate the two extremes aforementioned show similar variations in electrical properties. The data of the tables represent lead-selenium and lead-sulphur alloys which have been annealed at from 540° C. to 815° C. and slowly cooled (e. g. 50° C. per hour) to the temperatures indicated in column 1, and from which temperatures they were quenched.

*Table II*

| Equilibrium Temperature Prior to Quenching | Thermoelectric Power, Micro-volts/° C. | Resistivity, Ohm-Cm. |
|---|---|---|
| 815° C | −155 | 0.00068 |
| 704° C | −166 | 0.00071 |
| 538° C | −220 | 0.0013 |
| 427° C | −267 | 0.0023 |
| 316° C | −288 | 0.0030 |
| 204° C | −288 | 0.0030 |

Table III

| Equilibrium Temperature Prior to Quenching | Thermoelectric Power, Microvolts/° C. | Resistivity, Ohm-Cm. |
|---|---|---|
| 815° C. | −144 | 0.00094 |
| 704° C. | −162 | 0.0011 |
| 538° C. | −198 | 0.0017 |
| 427° C. | −225 | 0.0029 |
| 316° C. | −280 | 0.0048 |
| 204° C. | −280 | 0.0048 |

It will be observed that since the electrical properties of the aforementioned alloys or compositions are dependent upon the equilibrium temperature from which they have been quenched, use of such alloys or compositions is limited to such temperatures as will not affect the electrical characteristics established by the quenching treatment. Accordingly, for high temperature applications requiring fixed values of electrical characteristics arbitrary changes in these characteristics must be derived from the adjustment of factors other than temperature and annealing history.

We have further discovered that the electrical characteristics desirable in thermoelectric elements for thermoelectric generator applications of the aforedescribed lead-tellurium, lead-selenium, lead-tellurium-selenium, lead-sulphur and lead-selenium-sulphur compositions of the aforementioned range and purity can be markedly and advantageously altered in a reproducible manner by the addition thereto of controlled amounts of matter other than the constituents of the base composition. Such additions may also be denominated "beneficial impurities" as distinguished from undesired impurities as aforementioned. For convenience these additions are herein designated "promoters" since, as will hereinafter appear, they tend to enhance the electrical characteristics desired in thermoelectric generator elements of the base composition.

As has previously been observed, all of the aforedescribed base compositions exhibit negative thermoelectric power and negative conductivity. By the addition of the promoters to be hereinafter described such negative properties may be enhanced by the addition of certain promoters while the polarity of the electrical properties of the base composition may be reversed by the addition of certain other promoters. Accordingly, certain promoters will be denominated "positive promoters" and certain others will be denominated "negative promoters," as hereinafter defined, and the resultant alloy or composition may be "positive" or "negative" alloy or composition, as also hereinafter defined.

"Negative" compositions or alloys are to be understood throughout this specification and appended claims as meaning an alloy or composition which exhibits negative conductivity as evidenced by Hall effect measurements or thermoelectric effect measurements, both taken at room temperature. Similarly, "positive" compositions or alloys are to be understood as meaning an alloy or composition which exhibits positive conductivity as evidenced by Hall effect measurements or thermoelectric effect measurements, both taken at room temperature.

"Negative promoters" are those which when added to the base alloys aforedescribed alter the electrical conductivity thereof without changing the polarity of the conductivity or thermoelectric power of the base alloys (it being negative according to the preceding definition). "Positive promoters" are those which when added to the base alloys aforedescribed cause at first with very small additions reduction in the conductivity of the alloy to a minimum value beyond which further increase in the concentration of the "positive promoters" causes an increase in the conducivity of the alloy accompanied by a reversal in the polarity of the conductivity and thermoelectric power, i. e. from negative to positive.

In all instances, as will hereinafter more specifically appear, the promoters, both negative and positive, are elements from the periodic table.

The functions of such negative and positive promoters should be contrasted for the sake of clarity as follows:

(1) Increasing concentrations of the negative promoters cause increases in the conductivity and decrease of the thermoelectric power of the resulting alloy as compared to that of the base alloy while preserving the negative polarity of the conductivity and thermoelectric power.

(2) Increasing concentrations of the positive promoters cause initially reductions in the conductivity and increase in the Seebeck E. M. F. of the base alloy until a minimum conductivity is reached whereupon the thermoelectric power and conductivity reverse polarity to the positive sense and further increase in the concentrations of the positive promoters causes increase in the conductivity and decrease in the thermoelectric power in the resulting alloy.

The promoters which we have found effective for the purposes of the present invention when added in minor amounts to the base compositions aforementioned will for convenience be discussed in terms of the terminal compositions of the purity and composition as aforedescribed, it being understood that such promoters may also be added to any of the intermediate compositions with beneficial results. In this case the promoters added should be proportioned both in kind and in amount according to the relative concentrations of the terminal compositions in the intermediate composition comprising a mixture of such terminal compositions.

Figure 3:
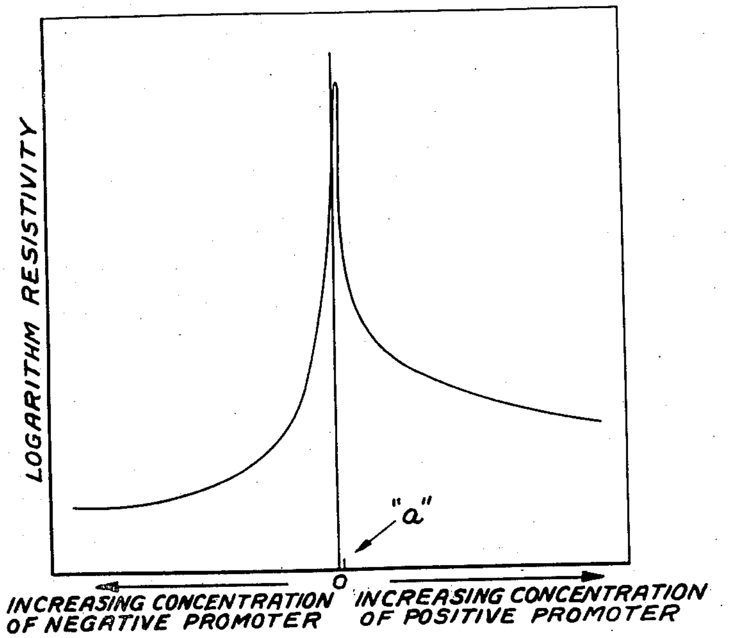
Figure 3 is a graphic illustration generally indicating the effect of various concentrations of negative and positive promoters with respect to the resistivity characteristics of certain lead-tellurium semi-metallic alloys or compositions with which the thermoelectric elements of the invention are concerned.
Figure 3A:
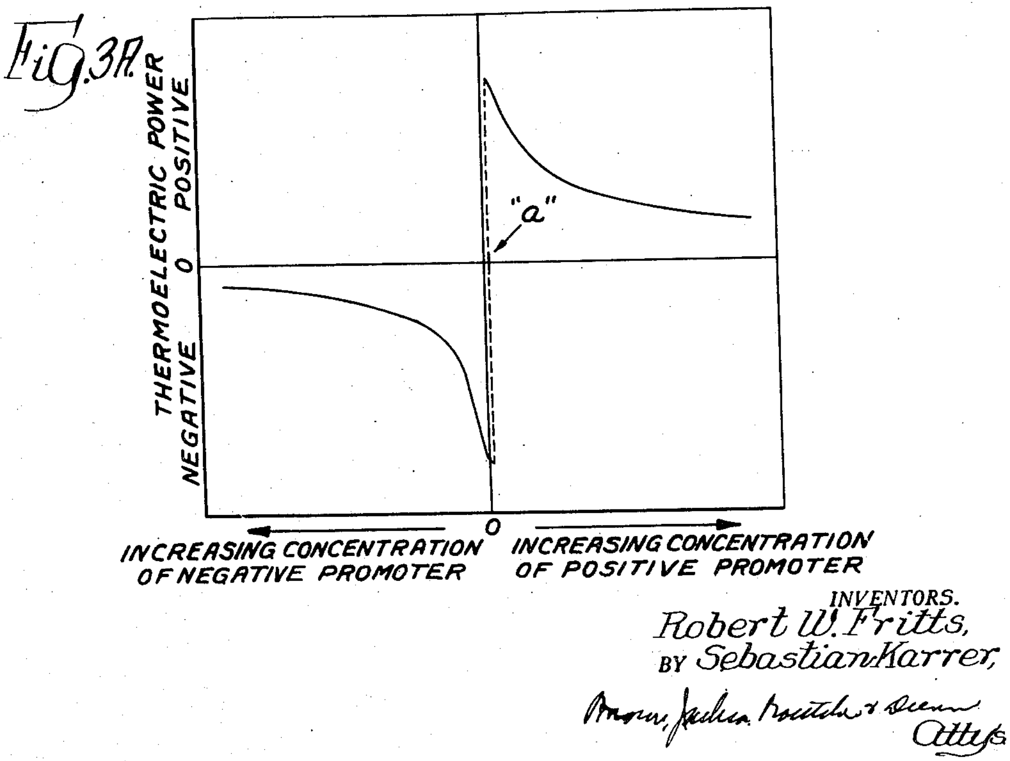
Figure 3A is a graphic illustration generally indicating the effect of various concentrations of negative and positive promoters with respect to the thermoelectric power characteristics of certain lead-tellurium semi-metallic alloys or compositions of which the thermoelectric elements of the invention are made.

By way of example, for the terminal composition consisting essentially of lead and tellurium, as indicated by solid line AB of Figures 1 and 32, the aforeindicated effects are graphically illustrated in Figures 3 and 3A, wherein the effect of varying the concentrations of the aforementioned negative and positive promoters are plotted. In both Figures 3 and 3A, the central vertical axes give the properties of the aforedescribed base lead-tellurium alloy or composition. The left halves of each of the figures characterize the change, at room temperature, of the electrical properties of the lead-tellurium base alloys or compositions with the addition of the aforementioned negative promoters. It will be observed that the two drawings, Figures 3 and 3A, have no scales applied thereto since the concentration ranges differ for each of the third element additions to be hereinafter described due to variations in atomic weights and concentration limits. The right halves of each of Figures 3 and 3A show the changes in the electrical properties as positive promoters are added to the base alloy or composition. It should be noted that for a given promoter element the maximum resistivity and the polarity reversal of the thermoelectric power occur at the same concentration. This concentration is indicated by "*a*" in Figures 3 and 3A.

Table IV below, first column thereof, lists certain elements from the periodic table which are effective as negative promoters when added to the aforementioned lead-tellurium base alloys or compositions. Second column of Table IV lists the order of the maximum concentration limits by weight percent of such promoters to the base alloy effective for achieving the objects of the invention. It is to be understood that these concentration limits are the maximum which effectively alter the elctrical properties of the base alloy. Concentrations in excess of the stated amounts of such additives have no appreciable effect in beneficially altering the electrical properties with which this invention is concerned, and in this sense the limits indicated in the specification and claims are to be considered critical. The third and fourth columns of Table IV set forth the electrical properties at room temperature of lead-tellurium alloys promoted with the maximum useful concentrations of the negative promoters, after high temperature annealing as hereinafter disclosed.

*Table IV*

| Negative Promoters | Order of Maximum Effective Concentration Limits By Weight Percent | Thermoelectric Power, Microvolts/°C. | Resistivity, Ohm-Cm. |
|---|---|---|---|
| Bismuth | [1]0.60–1.20 | −72 | 0.00031 |
| Tantalum | 0.50 | −121 | 0.00032 |
| Manganese | 0.25 | −113 | 0.00036 |
| Zirconium | 0.25 | −23 | 0.00012 |
| Titanium | 0.15 | −45 | 0.00020 |
| Aluminum | 0.10 | −59 | 0.00016 |
| Gallium | 0.25 | −36 | 0.00015 |
| Chlorine | 0.10 | −45 | 0.00019 |
| Bromine | 0.20 | −47 | 0.00015 |
| Iodine | 0.25 | −45 | 0.00015 |
| Uranium | 0.80 | −72 | 0.00020 |

[1] The range set forth is discussed below.

Figures 4, 4A, 5 and 5A of the drawings may be here referred to for a graphic illustration of the effect of the additions of the negative promoters of Table IV with respect to the resistivity and thermoelectric power characteristics (measured at room temperature) afforded by addition to the lead-tellurium base alloys or compositions of each of the negative promoters set forth in Table IV, and with the variations indicated in the amount thereof added in each case.

As previously mentioned, certain positive promoters, all elements from the periodic table, may also be alloyed with the aforementioned lead-tellurium alloys, and such promoters are listed in column 1 of Table V below. The second column of Table V, like the corresponding column of Table IV, sets forth the order of the maximum concentration limits by weight percent of such promoters to the base alloy effective for achieving the results contained in columns 4 and 5. Again, it will be observed that concentrations of the positive promoters to the lead-tellurium base alloy in amounts in excess of that contained in column 2 of Table V have no appreciable effect in beneficially altering the electrical properties with which this invention is concerned and in this sense the limits indicated are to be considered critical.

Column 3 of Table V sets forth the concentration by weight percent of the positive promoters listed at which the polarity of conductivity and thermoelectric power of the promoted alloy reverses. These are the concentration values for the promoters respectively, indicated generally by point "*a*" in Figures 3 and 3A.

Columns 4 and 5 set forth the thermoelectric power and resistivity characteristics at room temperature of the alloy or composition resulting from the addition of the aforedescribed positive promoters in the amount shown in column 2 after high temperature annealing and subsequent slow cooling as hereinafter disclosed.

*Table V*

| Positive Promoters | Order of Maximum Effective Concentration Limit By Weight Percent | Concentration, Weight Percent at which Polarity Reverses (Point "*a*" Figs. 3 and 3A) | Thermoelectric Power, Microvolts/°C. | Resistivity, Ohm-Cm. |
|---|---|---|---|---|
| Sodium | 0.06 | .0002 | +173 | 0.00074 |
| Potassium | 0.10 | .0004 | +198 | 0.00076 |
| Thallium | [1] 0.25–1.00 | [1] .005 to 0.02 | +256 | 0.00290 |
| Arsenic | [1] 0.07–0.25 | [1] .0008 to .002 | +270 | 0.00450 |

[1] The range set forth is discussed below.

As aforementioned, the lead-tellurium base alloy previously described, is a two-phase alloy. When the aforedescribed third element additions are incorporated in the base alloy, such third element additions become distributed between the two phases. We have discovered that the nature of such distribution has negligible effect upon the electrical properties of the composition in all cases except that of bismuth, thallium and arsenic. Accordingly, in the case of bismuth, thallium and arsenic, the maximum effective concentration is dependent upon the lead content of the lead-tellurium base alloy within the ranges stated therefor in Tables IV and V. We have found 1.20% by weight bismuth to be the maximum effective concentration for lead-tellurium base alloys containing 63.0% lead; for base alloys containing less lead the maximum effective bismuth concentration is somewhat less, that is ranges down to 0.60% by weight when the lead content ranges down to 61.95%. Similarly, in the case of thallium, the maximum effective concentration is dependent upon the lead content of the lead-tellurium base alloy within the range stated therefor. We have found 1.00% by weight thallium to be the maximum effective concentration for lead-tellurium base alloys containing 63.0% lead; for base alloys containing less lead, the maximum effective thallium concentration is somewhat less, that is ranges down to .25% by weight when the lead content ranges down to 61.95%. Similarly, in the case of arsenic, the maximum effective concentration is dependent upon the lead content of the lead-tellurium base alloy within the range stated therefor, and ranges from 0.25% for base alloys containing 63.0% lead down to 0.07% for base alloys containing 61.95% lead. As indicated in Table V, the concentration weight percent at which the polarity reverses in the case of thallium promoted base alloy ranges from .005 to .02 as the lead constituent of the lead-tellurium base composition varies from 61.95% to 63.0%. Similarly, in the case of the arsenic promoted base alloy the concentration weight percent at which polarity reverses ranges from .0008 to .002 as the lead content of the base alloy varies from 61.95% to 63.0%. This behavior of bismuth, thallium and arsenic is thought to be due to the formation of a bismuth-lead-tellurium, a thallium-lead-tellurium or an arsenic-lead-tellurium complex within the intergranular phase aforementioned which accounts for a portion of the addition. All other third element additions aforementioned, both positive and negative, form complexes with the second or intergranular phase aforementioned to a much lesser extent than do bismuth, thallium and arsenic and for purposes of this invention, in the cases of such other additions these effects are inconsequential. Accordingly, no change in the concentration limits thereof are necessary as the proportions of lead and tellurium in the base alloy vary within the range stated therefor.

In Tables IV and V above, the thermoelectric power and resistivity data given is in both cases for the 61.95% lead, balance substantially all tellurium composition containing the third element addition in question in the amount indicated in the table (in the case of bismuth, thallium, and arsenic, the lower maximum effective amount indicated).

Figure 7:
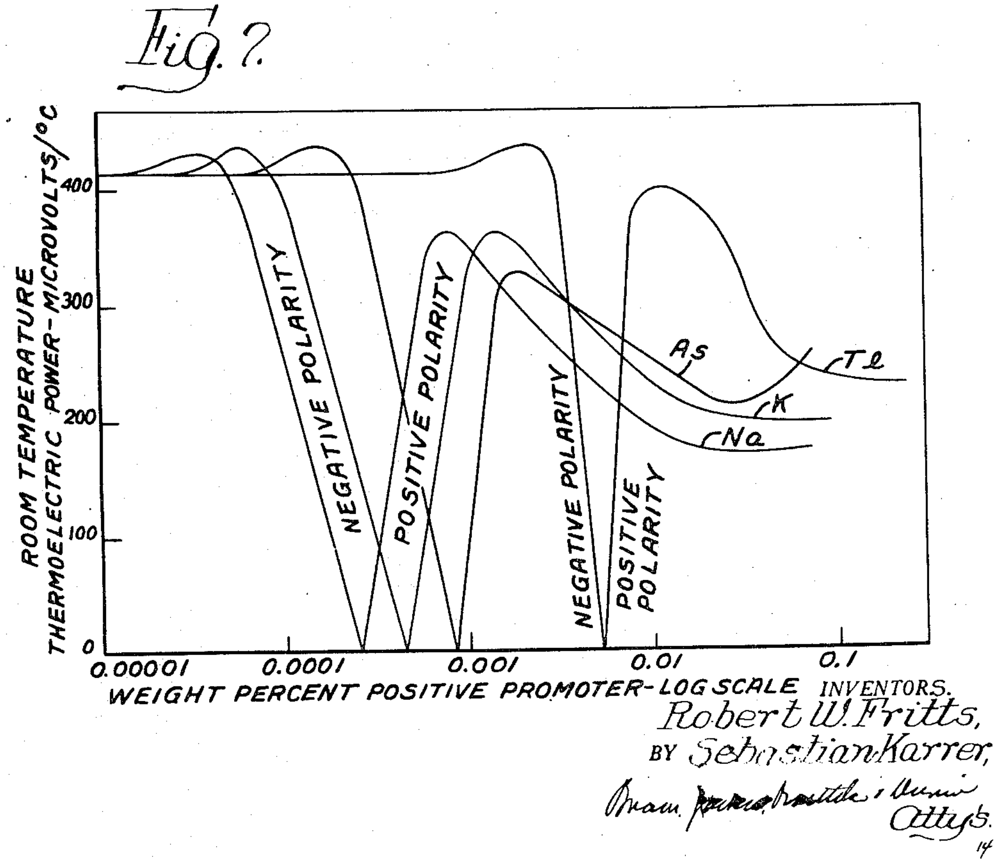
Figure 7 is a graphic illustration of the thermoelectric power characteristics of the lead-tellurium semi-metallic alloys or compositions depicted in Figure 6.

Figures 6 and 7 of the drawings may be here referred to for a graphic illustration of the effect of the additions of the positive promoters of Table V with respect to the resistivity and thermoelectric power characteristics (measured at room temperature) afforded by addition to the lead-tellurium base alloys or compositions of each of the positive promoters set forth in Table V, and with the variations indicated in the amount thereof added in each case.

In connection with the aforementioned Figures 4 to 7, the logarithm of the percent by weight concentration, and the logarithm of the resistivity have been plotted for convenience, as will be understood by those skilled in the art, while thermoelectric power has been plotted linearly.

It will be observed upon examination of the data recorded in Figures 3 through 7, that a wide range of electrical properties can be induced in lead-tellurium base alloys by third element additions, either positive or negative as desired. Zirconium additions, for example, can reduce the resistivity of the lead-tellurium base alloy by more than a factor of approximately 100, while reducing the thermoelectric power by a factor of 20.

The aforedescribed alloys or compositions and electrical conductors may be fabricated by melting together the alloy constituents aforementioned, within the concentration limits aforeindicated. It is to be understood, however, that, as has been previously indicated, the lead-tellurium alloys for purposes of the present invention must be of a high order of purity, i. e., containing not in excess of an order of magnitude of 0.001% by weight impurity. Such purity has been found to be necessary in practicing the present invention if the electrical properties of thermoelectric generators of the alloys are to be reproducible. It is to be understood, however, that selenium, because of its chemical similarity to and natural occurrence with tellurium, is frequently a contaminant in commercial tellurium, and is difficult and expensive to remove to the extent of purity as specified above. However, selenium concentrations of the order usually found in commercially pure tellurium, usually of the order of 1%, cause no significant changes in the electrical properties of the alloys.

The third element promoted alloy or compositions is a two-phase alloy having improved electrical properties as compared to the corresponding properties of the lead-tellurium base alloy. For example, the electrical properties of the third element addition promoted alloys or compositions are governed to a lesser extent by the heat treatment given the alloy, with variations in electrical properties considerably less than the variations exhibited by the lead-tellurium base alloy to which no third element has been added. Thus, the third element additions, in effect, reduce the dependency of the electrical properties upon prior heat treatment and in this sense tend to stabilize these properties to a higher degree than that achieved in the lead-tellurium base alloy. It may be stated as a general observation that the degree of stabilization increases with the concentration of the aforementioned third element additions up to the maximum effective amount thereof as above set forth. This lesser dependency of third element addition promoted alloys or compositions aforedescribed and of electrical conductors comprising the same, markedly increases the utility thereof for high temperature applications such as thermoelectric generation of electrical power. In this connection, however, where alloys including positive promoters are concerned and where the application temperature approaches 570° C. concentrations of the positive promoter approaching the maximum effective limit aforementioned should be used to insure maintenance of positive polarity of the composition. Moreover, where a positive electrical conductor is desired, the positive promoters must be present in the lead-tellurium base alloy in amount not less than that indicated in column 3 of Table V, i. e., the concentration weight percent at which the polarity of the thermoelectric power becomes positive (point "*a*" of Figures 3 and 3A). In fact, as graphically indicated in Figures 9 and 11, practical amounts of Seebeck voltage and power output from the aforementioned positively promoted alloys occur only when the positive promoter is present in minimal amounts as follows: Sodium 0.002% by weight of the lead-tellurium base alloy; potassium 0.003% by weight of the lead-tellurium base alloy; thallium a minimal amount ranging from 0.01% to 0.04% by weight as the lead content of the lead-tellurium base alloy ranges from 61.95% to 63.0%; and for arsenic a minimal amount ranging from 0.005% to 0.015 by weight as the lead content of the lead-tellurium base alloy ranges from 61.95% to 63.0% (this range of minimum concentrations for thallium and arsenic being occasioned by the same reasons previously discussed in connection with their polarity reversal and maximum effective concentration points).

As previously mentioned, the Seebeck E. M. F. and electrical conductivity of the aforementioned electrical conductors of the lead and tellurium alloys or compositions can be controlled in polarity and magnitude so that combinations of thermocouple elements of such alloys or compositions can be produced which will afford thermocouple voltages many times those of conventional thermocouples and simultaneously much higher thermal efficiency. As also previously mentioned, electrical conductors of each of the lead and tellurium alloys including the third element addition promoted alloys may be utilized with a second electrical conductor of known material, such as a metallic conductor, for example stainless steel. Additionally, any of the aforedescribed negative electrical conductors may be utilized with any of the aforedescribed positive electrical conductors to form a thermocouple whose output will be the sum of the Seebeck E. M. F.'s and power output of the conductors individually.

In Figures 8, 8A and 9 there are plotted the Seebeck E. M. F.'s for a temperature difference of 555° C. (10° C.–565° C.) obtainable in lead and tellurium alloys or compositions which have been promoted with varying amounts of third element additions within the ranges portrayed in these figures. In Figures 10, 10A and 11, there are plotted by weight percent promoters against the values of short circuit power in watts developed in a cubic centimeter of promoted lead and tellurium alloys or compositions with a uniform temperature gradient established between the faces held at 10° C. and 565° C., respectively, and upon which electrodes, to be hereinafter referred to in detail, are placed. To compute the maximum power output to a matched load the power values from Figures 10, 10A and 11 must be divided by four, as the load resistance is then one-half of the total circuit resistance.

In accordance with the invention, it will be observed, for example, that a lead-tellurium alloy or composition containing up to 0.25 weight percent zirconium exhibits negative Seebeck voltages of from 200 millivolts to 28 millivolts against stainless steel for a temperature difference of 555° C. (10° C. at cold junction—565° C. at hot junction), depending upon the concentration of zirconium. Thermoelectric elements of the same base alloy containing from 0.01 to 0.10 weight percent potassium exhibit positive Seebeck voltages ranging from 100 millivolts to 153 millivolts under similar conditions of measurement. These two promoted conductors when incorporated in a series circuit as elements of a thermocouple develop voltages ranging from 128 millivolts to 353 millivolts for a temperature difference of only 555° C. Such Seebeck voltages derivable from thermocouples with elements of controlled composition are several times greater than known metallic thermoelectric elements even with temperature differences of only half of that referred to earlier.

Referring again to Figures 8 through 11, inclusive, it should be noted that low concentrations of negative promoters afford high negative Seebeck E. M. F.'s but, however, do not afford the maximum power output due to the resistivity of the composition at such concentration level. On the other hand, high concentrations of negative promoters afford maximum power output at lower Seebeck E. M. F.'s. The concentration of negative promoters is accordingly varied to meet the needs of the actual application of the negative element, e. g. the resistance of the load circuit.

The Seebeck E. M. F. and short circuit power of the alloys or compositions containing positive promoters and measured under conditions stated above, also depend upon the concentrations of the respective third element additions. It should be noted that, contrary to the trend in negative alloys or compositions, increasing the concentration of positive promoter in the lead and tellurium alloys or compositions caused an increase in the Seebeck E. M. F. as well as in the short circuit power. This is illustrated in Figures 8 through 11 wherein the data recorded refers to the unit cube of lead and tellurium alloys or compositions under the conditions stated and the Seebeck E. M. F. given is that measured when stainless steel is used as a second thermocouple element for the generator.

The values of Seebeck E. M. F.'s and short circuit power for alloys or compositions containing low concentrations of positive promoters (Figures 9 and 11) are indicated only as dashed lines near the concentrations at which the Seebeck E. M. F. reverses polarity. The actual performance data in this region depends critically upon the nature of the residual impurity in the lead and tellurium alloy or composition (of the order of 0.001 weight percent or less) and, to a lesser extent, upon the thermal history of the alloys or compositions.

In the following Table VI the power output and thermal efficiency of a typical metallic thermocouple are compared with those of an exemplary thermocouple comprising a negative and positive electrical conductor of the promoted lead and tellurium alloys or compositions aforedescribed. The data pertains to thermocouples formed from two elements, each element having a dimension of a cubic centimeter and having a uniform temperature gradient when the faces are at 565° C. and 10° C., respectively. The figures given for thermal efficiency are calculated on the basis of total heat flow across the cube and thermoelectric current developed, and are intended only as an illustration for comparison.

*Table VI*

| Couple | E. M. F., mv. | Power to Matched Load watts | Thermal Efficiency, percent |
|---|---|---|---|
| Iron-Constantan | 30.8 | 2.7 | 0.5-0.6 |
| Pb-Te Alloy +0.03% Zr } Pb-Te Alloy +0.06% K } | 250.0 | 1.6 | 5 |

The data of Table VI shows that the thermocouples comprising electrical conductors of these promoted lead and tellurium alloys or compositions produce practical amounts of electrical power, higher voltage and higher thermal efficiency than metallic thermocouples. In fact, it will be observed, the voltage output and the efficiency of the thermocouples of our invention are almost an order of magnitude higher than the same characteristics of the metallic thermocouple. Zirconium and potassium have been discussed in detail for the data of Table VI merely as examples. Similarly, an alloy promoted with any of the other negative or positive promoters will provide improved thermoelectric properties, the actual values of which depend upon the promoter concentration as illustrated in Figures 8 to 11, inclusive. It should further be observed that thermoelectric generators comprising electrical conductors of the aforedescribed lead-tellurium alloys due to their much greater thermal efficiency permit the use of much smaller flames or heat sources for the same power output and thereby increase the utility and widen the area of application of such thermoelectric generators over those comprising known metallic thermoelectric elements.

We have found that thermocouple elements of the aforementioned promoted lead and tellurium alloys or compositions can be operated with hot junction temperatures of 565° C. when enclosed in non-oxidizing atmospheres. Such elements are mechanically stable even at temperatures as high as 815° C., however, above approximately 570° C. the lead-tellurium alloy or composition has been observed to sublime to a slight extent, resulting in the loss of material. Elements of the aforedescribed alloys or compositions are stable when placed in temperature gradients and recrystallization and diffusion in temperature gradients have not produced any detrimental effects.

By way of a further example, for the treminal composition consisting essentially of lead and selenium, as represented by solid line CD of Figures 1, 2 and 32, the effects previously discussed are graphically illustrated in Figures 12 and 12A, wherein the effect of varying the concentrations of the aforementioned negative and positive promoters are plotted. In both Figures 12 and 12A, the central vertical axes give the properties of the aforedescribed base lead-selenium alloy or composition. The left halves of each of the figures characterize the change, at room temperature, of the electrical properties of the lead-selenium base alloys or compositions with the addition of the aforementioned negative promoters. It will be observed that the two drawings, Figures 12 and 12A, have no scales applied thereto since the concentration ranges differ for each of the third element additions to be hereinafter described due to variations in atomic weights and concentration limits. The right halves of each of Figures 12 and 12A show the changes in the electrical properties as positive promoters are added to the base alloy or composition. It should be noted that for a given promoter element the maximum resistivity and the polarity reversal of the thermoelectric power occur at the same concentration. This concentration is indicated by "*a*" in Figures 12 and 12A.

Table VII below, first column thereof, lists certain elements from the periodic table which are effective as negative promoters when added to the aforementioned lead-selenium base alloys or compositions. Second column of Table VII lists the order of the maximum concentration limits by weight percent of such promoters to the base alloy effective for achieving the objects of the invention. It is to be understood that these concentration limits are the maximum which effectively alter the electrical properties of the base alloy. Concentrations in excess of the stated amounts of such additives have no appreciable effect in beneficially altering the electrical properties with which this invention is concerned, and in this sense the limits indicated are to be considered critical. The third and fourth columns of Table VII set forth the electrical properties at room temperature of lead-selenium alloys promoted with the maximum useful concentrations of the negative promoters, after high temperature annealing as hereinafter disclosed.

*Table VII*

| Negative Promoters | Order of Maximum Effective Concentration Limits By Weight Percent | Thermoelectric Power, Microvolts/° C. | Resistivity, Ohm-Cm. |
|---|---|---|---|
| Iodine | 0.50 | −40 | 0.00016 |
| Chlorine | 0.20 | −38 | 0.00018 |
| Bromine | 0.60 | −34 | 0.00014 |
| Zirconium | 0.60 | −27 | 0.00016 |
| Silicon | 0.10 | −54 | 0.00024 |
| Titanium | 0.10 | −40 | 0.00026 |
| Indium | 0.20 | −54 | 0.00024 |
| Tantalum | 0.60 | −45 | 0.00022 |
| Gallium | 0.15 | −58 | 0.00027 |
| Aluminum | 0.03 | −101 | 0.00037 |
| Copper | 0.30 | −104 | 0.00038 |
| Gold | 0.35 | −104 | 0.00039 |
| Bismuth | [1] 0.40-2.5 | −75 | 0.00040 |
| Antimony | [1] 0.20-1.5 | −103 | 0.00050 |
| Fluorine | 0.02 | −133 | 0.00047 |
| Columbium | 0.35 | −65 | 0.00023 |

[1] The range set forth is discussed below.

Figures 13, 13A, 13B, 14, 14A, and 14B of the drawings may be here referred to for a graphic illustration of the effect of the additions of the negative promoters of Table VII with respect to the resistivity and thermoelectric power characteristics (measured at room temperature) afforded by addition to the lead-selenium base alloys or compositions of each of the negative promoters set forth in Table VII, and with the variations indicated in the amount thereof added in each case.

As previously mentioned, certain positive promoters, all elements from the periodic table, may also be alloyed with the aforementioned lead-selenium alloys, and such promoters are listed in column 1 of Table VIII below. The second column of Table VIII, like the corresponding column of Table VII, sets forth the order of the maximum concentration limits by weight percent of such promoters to the base alloy effective for achieving the results contained in columns 4 and 5. Again, it will be observed that concentrations of the positive promoters to the lead-selenium base alloy in amounts in excess of that contained in column 2 of Table VIII have no appreciable effect in beneficially altering the electrical properties with which this invention is concerned and in this sense the limits indicated are to be considered critical.

Column 3 of Table VIII sets forth the concentration by weight percent of the positive promoters listed at which the polarity of conductivity and thermoelectric power of the promoted alloy reverses. These are the concentration values for the promoters respectively, indicated generally by point "*a*" in Figures 12 and 12A.

Columns 4 and 5 set forth the thermoelectric power and resistivity characteristics at room temperature of the alloy or composition resulting from the addition of the aforedescribed positive promoters in the amount shown in column 2 after high temperature annealing and subsequent slow cooling as hereinafter disclosed.

*Table VIII*

| Positive Promoters | Order of Maximum Effective Concentration Limit By Weight Percent | Concentration, Weight Percent at Which Polarity Reverses (Point "*a*" Figures 12 and 12A) | Thermoelectric Power, Microvolts/° C. | Resistivity, Ohm-Cm. |
|---|---|---|---|---|
| Sodium | 0.08 | .002 | +180 | 0.0019 |
| Thallium | [1] 0.72–1.5 | [1] .04–.08 | +263 | 0.0108 |
| Potassium | 0.15 | .003 | +250 | 0.0076 |
| Lithium | 0.03 | .002 | +288 | 0.0108 |
| Arsenic | [1] 0.10–0.30 | [1] .02–.06 | +331 | 0.0110 |

[1] The range set forth is discussed below.

As aforementioned, the lead-selenium base alloy previously described, is a two-phase alloy. When the aforedescribed third element additions are incorporated in the base alloy, such third element additions become distributed between the two phases. We have discovered that the nature of such distribution has negligible effect upon the electrical properties of the composition in all cases except that of bismuth, antimony, thallium and arsenic. Accordingly, in the case of bismuth, antimony, thallium and arsenic, the maximum effective concentration is dependent upon the lead content of the lead-selenium base alloy within the ranges stated therefor in Tables VII and VIII. We have found 2.50% by weight bismuth to be the maximum effective concentration for lead-selenium base alloys containing 73.50% lead; for base alloys containing less lead the maximum effective bismuth concentration is somewhat less, that is ranges down to 0.40% by weight when the lead content ranges down to 72.45%. Similarly, in the case of antimony, the maximum effective concentration is dependent upon the lead content of the lead-selenium base alloy within the range stated therefor. We have found 1.5% by weight antimony to be the maximum effective concentration for lead-selenium base alloys containing 73.50% lead; for base alloys containing less lead the maximum effective antimony concentration is somewhat less, that is ranges down to 0.20% by weight when the lead content ranges down to 72.45%. Similarly, in the case of thallium, the maximum effective concentration is dependent upon the lead content of the lead-selenium base alloy within the range stated therefor. We have found 1.5% by weight thallium to be the maximum effective concentration for lead-selenium base alloys containing 73.50% lead; for base alloys containing less lead, the maximum effective thallium concentration is somewhat less, that is ranges down to .72% by weight when the lead content ranges down to 72.45%. Similarly, in the case of arsenic, the maximum effective concentration is dependent upon the lead content of the lead-selenium base alloy within the range stated therefor, and ranges from 0.30% for base alloys containing 73.50% lead down to 0.10% for base alloys containing 72.45% lead. As indicated in Table VIII, the concentration weight percent at which the polarity reverses in the case of the thallium promoted base alloy ranges from 0.04% to 0.08% as the lead constituent of the lead-selenium base composition varies from 72.45% to 73.50%. Similarly, in the case of the arsenic promoted base alloy the concentration weight percent at which polarity reverses ranges from 0.02% to 0.06% as the lead content of the base alloy varies from 72.45% to 73.50%. This behavior of bismuth, antimony, thallium and arsenic is thought to be due to the formation of a bismuth-lead-selenium, an antimony-lead-selenium, a thallium-lead-selenium or an arsenic-lead-selenium complex within the intergranular phase aforementioned which accounts for a protion of the addition. All other third element additions aforementioned, both positive and negative, form complexes with the second or intergranular phase aforementioned to a much lesser extent than do bismuth, antimony, thallium and arsenic and for purposes of this invention, in the cases of such other additions these effects are inconsequential. Accordingly, no changes in the concentration limits thereof are necessary as the proportions of lead and selenium in the base alloy vary within the range stated therefor.

In Tables VII and VIII above, the thermoelectric power and resistivity data given is in both cases for the 72.45% lead, balance substantially all selenium composition containing the third element addition in question in the amount indicated in the table (in the case of bismuth, antimony, thallium and arsenic, the lower maximum effective amount indicated).

Figures 15 and 16 of the drawings may be here referred to for a graphic illustration of the effect of the additions of the positive promoters of Table VIII with respect to the resistivity and thermoelectric power characteristics (measured at room temperature) afforded by addition to the lead-selenium base alloys or compositions of each of the positive promoters set forth in Table VIII, and with the variations indicated in the amount thereof added in each case.

In connection with the aforementioned Figures 13 to 16 the logarithm of the percent by weight concentration, and the logarithm of the resistivity have been plotted for convenience, as will be understood by those skilled in the art, while thermoelectric power has been plotted linearly.

It will be observed upon examination of the data recorded in Figures 12 through 16, that a wide range of electrical properties can be induced in lead-selenium base alloys by third element additions, either positive or negative as desired. Bromine additions, for example, can reduce the resistivity of the lead-selenium base alloy by more than a factor of approximately 20, while reducing the thermoelectric power by a factor of 10.

The aforedescribed alloys or compositions and electrical conductors may be fabricated by melting together the alloy constituents aforementioned, within the concentration limits aforeindicated. It is to be understood, however, that, as has been previously indicated, the lead-selenium alloys for purposes of the present invention must be of a high order of purity, i. e., containing not in excess of an order of magnitude of 0.001% by weight impurity. Such purity has been found to be necessary in practicing the present invention if the electrical properties of thermoelectric generators of the alloys are to be reproducible. It is to be understood, however, that tellurium and sulphur, because of their chemical similarity to and natural occurrence with selenium, are frequently contaminants in commercial selenium and are difficult and expensive to remove to the extent of purity as specified above. We have found, however, that tellurium and sulphur concentrations of the order usually found in commercially pure selenium, usually of the order of 1%, cause no significant changes in the electrical properties of the alloys of this invention.

The third element promoted alloys or compositions are two-phase alloys having improved electrical properties as compared to the corresponding properties of the lead-selenium base alloy. For example, the electrical properties of the third element addition promoted alloys or compositions are governed to a lesser extent by the heat treatment given the alloy, with variations in electrical properties considerably less than the variations exhibited by the lead-selenium base alloy to which no third element has been added. Thus, the third element additions, in effect reduce the dependency of the electrical properties upon prior heat treatment and in this sense tend to stabilize these properties to a higher degree than that achieved in the lead-selenium base alloy. It may be stated as a general observation that the degree of stabilization increases with the concentration of the aforementioned third element additions up to the maximum effective amount thereof as above set forth. This lesser dependency of third element addition promoted alloys or compositions aforedescribed and of electrical conductors comprising the same, markedly increases the utility thereof for high temperature applications such as thermoelectric generation of electrical power. In this connection, however, where alloys including positive promoters are concerned and where the application temperature approaches 570° C. concentrations of the positive promoter approaching the maximum effective limit aforementioned should be used to insure maintenance of positive polarity of the composition. Moreover, where a positive electrical conductor is desired, the positive promoters must be present in the lead-selenium base alloy in amount not less than that indicated in column 3 of Table VIII, i. e., the concentration weight percent at which the polarity of the thermoelectric power becomes positive (point *a* of Figures 12 and 12A). In fact, as graphically indicated in Figures 18 and 20 practical amounts of Seebeck voltage and power output from the aforementioned positively promoted alloys occur only when the positive promoter is present in minimal amounts as follows: Sodium 0.006% by weight of the lead-selenium base alloy; potassium 0.014% by weight of the lead-selenium base alloy. It should be noted at this point that no minium concentrations are given above for base compositions to which thallium, lithium and arsenic have been added, nor is any data with respect thereto given in the following discussion of the characteristics of the elements under consideration when utilized as thermoelectric generator elements. This is for the reason that, as will be readily apparent from reference to Table VIII, lead-selenium compositions containing thallium, lithium or arsenic exhibit such high resistivities that their thermal conversion efficiency is little better than that of metals.

As previously mentioned, the Seebeck E. M. F. and electrical conductivity of the aforementioned electrical conductors of the lead and selenium alloys or compositions can be controlled in polarity and magnitude so that combinations of thermocouple elements of such alloys or compositions can be produced which will afford thermocouple voltages many times those of conventional thermocouples and simultaneously much higher thermal efficiency. As also previously mentioned, electrical conductors of each of the lead and selenium alloys including the third element addition promoted alloys may be utilized with a second electrical conductor of known material, such as a metallic conductor, for example stainless steel. Additionally, any of the aforedescribed negative electrical conductors may be utilized with any of the aforedescribed positive electrical conductors to form a thermocouple whose output will be the sum of the Seebeck E. M. F.'s and power output of the conductors individually.

In Figures 17, 17A and 18, there are plotted the Seebeck E. M. F.'s for a temperature difference of 555° C. (10° C.–565° C.) obtainable in lead and selenium alloys or compositions which have been promoted with varying amounts of third element additions within the ranges portrayed in these figures. In Figures 19, 19A, 19B and 20, there are plotted by weight percent promoters against the values of short circuit power in watts developed in a cubic centimeter of promoted lead and selenium alloys or compositions with a uniform temperature gradient established between the faces held at 10° C. and 565° C., respectively, and upon which electrodes, to be hereinafter referred to in detail, are placed. To compute the maximum power output to a matched load the power values from Figures 19, 19A, 19B and 20 must be divided by four, as the load resistance is then one-half of the total circuit resistance.

In accordance with the invention, it will be observed, for example, that a lead-selenium alloy or composition containing up to 0.60 weight percent bromine exhibits negative Seebeck voltages of from 162 millivolts to 35 millivolts against stainless steel for a temperature difference of 555° C. (10° C. at cold junction—565° C. at hot junction), depending upon the concentration of bromine. Thermoelectric elements of the same base alloy containing from 0.006 to 0.08 weight percent sodium exhibit positive Seebeck voltages ranging from 50 millivolts to 140 millivolts under similar conditions of measurement. These two promoted conductors when incorporated in a series circuit as elements of a thermocouple develop voltages ranging from 85 to 302 millivolts for a temperature difference of only 555° C. Such Seebeck voltages derivable from thermocouples with elements of controlled composition are several times greater than known metallic thermoelectric elements even with temperature differences of only half of that referred to earlier.

Referring again to Figures 17 through 20, inclusive, it should be noted that low concentrations of negative promoters afford high negative Seebeck E. M. F.'s but, however, do not afford the maximum power output due to the resistivity of the composition at such concentration level. On the other hand, high concentrations of negative promoters afford maximum power output at lower Seebeck E. M. F.'s. The concentration of negative promoters is accordingly varied to meet the needs of the actual application of the negative element, e. g. the resistance of the load circuit.

The Seebeck E. M. F. and short circuit power of the alloys or compositions containing positive promoters and measured under conditions stated above, also depend upon the concentrations of the respective third element additions. It should be noted that, contrary to the trend in negative alloys or compositions, increasing the concentration of positive promoter in the lead and selenium alloys or compositions causes an increase in the Seebeck E. M. F. as well as in the short circuit power. This is illustrated in Figures 17 through 20 wherein the data recorded refers to the unit cube of lead and selenium alloys or compositions under the conditions stated and the Seebeck E. M. F. given is that measured when stainless steel is used as a second thermocouple element for the generator.

The values of Seebeck E. M. F.'s and short circuit power for alloys or compositions containing low concentrations of positive promoters (Figures 18 and 20) are indicated only as dashed lines near the concentrations at which the Seebeck E. M. F. reverses polarity. The actual performance data in this region depends critically upon the nature of the residual impurity in the lead and selenium alloy or composition (of the order of 0.001 weight percent or less) and, to a lesser extent, upon the thermal history of the alloys or compositions.

In the following Table IX the power output and thermal efficiency of a typical metallic thermocouple are compared with those of an exemplary thermocouple comprising a negative and positive electrical conductor of the promoted lead and selenium alloys or compositions afore-described. The data pertains to thermocouples formed from two elements, each element having a dimension of a cubic centimeter and having a uniform temperature gradient when the faces are at 565° C. and 10° C. respectively. The figures given for thermal efficiency are calculated on the basis of total heat flow across the cube and thermoelectric current developed, and are intended only as an illustration for comparison.

*Table IX*

| Couple | E. M. F., mv. | Power to Matched Load, watts | Thermal Efficiency, percent |
|---|---|---|---|
| Iron-Constantan | 30.8 | 2.7 | 0.5–0.6 |
| Pb-Se Alloy+0.03% Br<br>Pb-Se Alloy+0.1% Na | 252.0 | 0.87 | 2.2 |

The data of Table IX shows that the thermocouples comprising electrical conductors of these promoted lead and selenium alloys or compositions produce practical amounts of electrical power, higher voltage and higher thermal efficiency than metallic thermocouples. In fact, it will be observed, the voltage output and the efficiency of the thermocouples of our invention are several times higher than the same characteristics of the metallic thermocouple. Bromine and sodium have been discussed in detail for the data of Table IX merely as examples. Similarly, an alloy promoted with any of the other negative or positive promoters will provide improved thermoelectric properties, the actual values of which depend upon the promoter concentration as illustrated in Figures 17 to 20, inclusive. It should further be observed that thermoelectric generators comprising electrical conductors of the aforedescribed lead-selenium alloys due to their much greater thermal efficiency permit the use of much smaller flames or heat sources for the same power output and thereby increase the utility and widen the area of application of such thermoelectric generators over those comprising known metallic thermoelectric elements.

We have found that thermocouple elements of the aforementioned promoted lead and selenium alloys or compositions can be operated with hot junction temperatures of 565° C. when enclosed in non-oxidizing atmospheres. Such elements are mechanically stable even at temperatures as high as 815° C., however, above approximately 570° C. the lead-selenium alloy or composition has been observed to sublime to a slight extent, resulting in the loss of material. Elements of the aforedescribed alloys or compositions are stable when placed in temperature gradients and recrystallization and diffusion in temperature gradients have not produced any detrimental effects.

By way of a still further example, for the terminal composition consisting essentially of lead and sulphur, as represented by solid line EF of Figures 2 and 32, the effects previously discussed are graphically illustrated in Figures 21 and 21A, wherein the effect of varying the concentrations of the aforementioned negative and positive promoters are plotted. In both Figures 21 and 21A, the central vertical axes give the properties of the aforedescribed base lead-sulphur alloy or composition. The left halves of each of the figures characterize the change, at room temperature, of the electrical properties of the lead-sulphur base alloys or compositions with the addition of the aforementioned negative promoters. It will be observed that the two drawings, Figures 21 and 21A, have no scales applied thereto since the concentration ranges differ for each of the third element additions to be hereinafter described due to variations in atomic weights and concentration limits. The right halves of each of Figures 21 and 21A show the changes in the electrical properties as positive promoters are added to the base alloy or composition. It should be noted that for a given promoter element the maximum resistivity and the polarity reversal of the thermoelectric power occur at the same concentration. This concentration is indicated by "*a*" in Figures 21 and 21A.

Table X below, first column thereof, lists certain elements from the periodic table which are effective as negative promoters when added to the aforementioned lead-sulphur base alloys or compositions. Second column of Table X lists the order of the maximum concentration limits by weight per cent of such promoters to the base alloy effective for achieving the objects of the invention. It is to be understood that these concentration limits are the maximum which effectively alter the electrical properties of the base alloy. Concentrations in excess of the stated amounts of such additives have no appreciable effect in beneficially altering the electrical properties with which this invention is concerned, and in this sense the limits indicated are to be considered critical. The third and fourth columns of Table X set forth the electrical properties at room temperature of lead-sulphur alloys promoted with the maximum useful concentrations of the negative promoters, after high temperature annealing as hereinafter disclosed.

*Table X*

| Negative Promoters | Order of Maximum Effective Concentration Limits By Weight Percent | Thermoelectric Power, Microvolts/°C. | Resistivity, Ohm-Cm. |
|---|---|---|---|
| Zirconium | 0.40 | −36 | 0.00022 |
| Indium | 0.50 | −54 | 0.00024 |
| Bromine | 0.35 | −54 | 0.00024 |
| Chlorine | 0.15 | −54 | 0.00025 |
| Titanium | 0.20 | −68 | 0.00029 |
| Iodine | 0.55 | −99 | 0.00042 |
| Tantalum | 0.70 | −99 | 0.00042 |
| Bismuth | [1] 1.0–3.0 | −118 | 0.00061 |
| Antimony | [1] 0.50–3.0 | −126 | 0.00064 |
| Gallium | 0.30 | −117 | 0.00058 |
| Columbium | 0.40 | −108 | 0.00023 |
| Uranium | 1.0 | −99 | 0.00024 |

[1] The range set forth is discussed below.

Figures 22, 22A, 23 and 23A of the drawings may be here referred to for a graphic illustration of the effect of the additions of the negative promoters of Table X with respect to the resistivity and thermoelectric power characteristics (measured at room temperature) afforded by addition to the lead-sulphur base alloys or compositions of each of the negative promoters set forth in Table X, and with the variations indicated in the amount thereof added in each case.

As previously mentioned, certain positive promoters, all elements from the periodic table, may also be alloyed with the aforementioned lead-sulphur alloys, and such promoters are listed in column 1 of Table XI below. The second column of Table XI, like the corresponding column of Table X, sets forth the order of the maximum concentration limits by weight percent of such promoters to the base alloy effective for achieving the results contained in columns 4 and 5. Again, it will be observed that concentrations of the positive promoters to the lead-sulphur base alloy in amounts in excess of that contained in column 2 of Table XI have no appreciable effect in beneficially altering the electrical properties with which this invention is concerned and in this sense the limits indicated are to be considered critical.

Column 3 of Table XI sets forth the concentration by weight percent of the positive promoters listed at which the polarity of conductivity and thermoelectric power of the promoted alloy reverses. These are the concentration values for the promoters respectively, indicated generally by point "*a*" in Figures 21 and 21A.

Columns 4 and 5 set forth the thermoelectric power and resistivity characteristics at room temperature of the alloy or composition resulting from the addition of the aforedescribed positive promoters in the amount shown in column 2 after high temperature annealing and subsequent slow cooling as hereinafter disclosed.

*Table XI*

| Positive Promoters | Order of Maximum Effective Concentration Limit By Weight Percent | Concentration, Weight Percent at Which Polarity Reverses (Point "a" Figures 21 and 21A) | Thermoelectric Power, Microvolts/°C. | Resistivity, Ohm-Cm. |
|---|---|---|---|---|
| Sodium | 0.20 | 0.02 | +364 | 0.24 |
| Potassium | 0.30 | 0.04 | +446 | 0.32 |
| Rubidium | 0.70 | 0.20 | +450 | 0.20 |
| Silver | 2.0 | 0.30 | +270 | 0.02 |

As aforementioned, the lead-sulphur base alloy previously described is a two-phase alloy. When the aforedescribed third element additions are incorporated in the base alloy, such third element additions become distributed between the two phases. We have discovered that the nature of such distribution has negligible effect upon the electrical properties of the composition in all cases except that of bismuth and antimony. Accordingly, in the case of bismuth and antimony, the maximum effective concentration is dependent upon the lead content of the lead-sulphur base alloy within the ranges stated therefor in Tables X and XI. We have found 3.0% by weight bismuth to be the maximum effective concentration for lead-sulphur base alloys containing 87.10% lead; for base alloys containing less lead the maximum effective bismuth concentration is somewhat less, that is ranges down to 1.0% by weight when the lead content ranges down to 86.63%. Similarly, in the case of antimony, the maximum effective concentration is dependent upon the lead content of the lead-sulphur base alloy within the range stated therefor. We have found 3.0% by weight antimony to be the maximum effective concentration for lead-sulphur base alloys containing 87.10% lead; for base alloys containing less lead the maximum effective antimony concentration is somewhat less, that is ranges down to 0.50% by weight when the lead content ranges down to 86.63%. This behavior of bismuth and antimony is thought to be due to the formation of a bismuth-lead-sulphur or an antimony-lead-sulphur complex within the intergranular phase aforementioned which accounts for a portion of the addition. All other third element additions aforementioned, both positive and negative, form complexes with the second or intergranular phase aforementioned to a much lesser extent than do bismuth and antimony, and for purposes of this invention, in the cases of such other additions these effects are inconsequential. Accordingly, no changes in the concentration limits thereof are necessary as the proportions of lead and sulphur in the base alloy vary within the range stated therefor.

In Tables X and XI above, the thermoelectric power and resistivity data given are in both cases for the 86.63% lead, balance substantially all sulphur composition containing the third element addition in question in the amount indicated in the table (in the case of bismuth and antimony, the lower maximum effective amount indicated).

Figures 24 and 25 of the drawings may be here referred to for a graphic illustration of the effect of the additions of the positive promoters of Table XI with respect to the resistivity and thermoelectric power characteristics (measured at room temperature) afforded by addition to the lead-sulphur base alloys or compositions of each of the positive promoters set forth in Table XI, and with the variations indicated in the amount thereof added in each case.

In connection with the aforementioned Figures 22 to 25, the logarithm of the percent by weight concentration, and the logarithm of the resistivity have been plotted for convenience, as will be understood by those skilled in the art, while thermoelectric power has been plotted linearly.

It will be observed upon examination of the data recorded in Figures 21 through 25, that a wide range of electrical properties can be induced in lead-sulphur base alloys by third element additions, either positive or negative as desired. Indium additions, for example, can reduce the resistivity of the lead-sulphur base alloy by more than a factor of approximately 20 while reducing the thermoelectric power by a factor of 5.

The aforedescribed alloys or compositions and electrical conductors may be fabricated by melting together the alloy constituents aforementioned, within the concentration limits aforeindicated. It is to be understood, however, that, as has been previously indicated, the lead-sulphur alloys for purposes of the present invention must be of a high order of purity, i. e., containing not in excess of an order of magnitude of 0.001% by weight impurity. Such purity has been found to be necessary in practicing the present invention if the electrical properties of thermoelectric generators of the alloys are to be reproducible. It is to be understood, however, that tellurium and selenium, because of their chemical similarity to and natural occurrence with sulphur, are frequently contaminants in commercial sulphur and are difficult and expensive to remove to the extent of purity as specified above. We have found, however, that tellurium and selenium concentrations of the order usually found in commercially pure sulphur, usually of the order of 1%, cause no significant changes in the electrical properties of the alloys of this invention.

The third element promoted alloy or composition is a two-phase alloy having improved electrical properties as compared to the corresponding properties of the lead-sulphur base alloy. For example, the electrical properties of the third element addition promoted alloys or compositions are governed to a lesser extent by the heat treatment given the alloy, with variations in electrical properties considerably less than the variations exhibited by the lead-sulphur base alloy to which no third element has been added. Thus, the third element additions, in effect, reduce the dependency of the electrical properties upon prior heat treatment and in this sense tend to stabilize these properties to a higher degree than that achieved in the lead-sulphur base alloy. It may be stated as a general observation that the degree of stabilization increases with the concentration of the aforementioned third element additions up to the maximum effective amount thereof as above set forth. This lesser dependency of third element addition promoted alloys or compositions aforedescribed and of electrical conductors comprising the same, markedly increases the utility thereof for high temperature applications such as thermoelectric generation of electrical power. In this connection, however, where alloys including positive promoters are concerned and where the application temperature approaches 570° C. concentrations of the positive promoter approaching the maximum effective limit aforementioned should be used to insure maintenance of positive polarity of the composition. Moreover, where a positive electrical conductor is deisred, the positive promoters must be present in the lead-sulphur base alloy in amount not less than that indicated in column 3 of Table XI, i. e., the concentration weight percent at which the polarity of the thermoelectric power becomes positive (point "*a*" of Figures 21 and 21A). In fact, as graphically indicated in Figures 27 and 29, practical amounts of Seebeck voltage and power output from the aforementioned positively promoted alloys occur only when the positive promoter is present in minimal amounts as follows: Silver 0.40% by weight of the lead-sulphur base alloy. It should be noted at this point that no minimum concentrations are given above for base compositions to which sodium, potassium and rubidium have been added, nor is any data with respect thereto given in the following discussion of the characteristics of the elements under consideration when utilized as thermoelectric generator elements. This is for the reason that, as will be readily apparent from reference to Table XI, lead-sulphur compositions containing sodium, potassium or rubidium exhibit such high resistivities that their thermal conversion efficiency is little better than that of metals.

As previously mentioned, the Seebeck E. M. F. and electrical conductivity of the aforementioned electrical conductors of the lead and sulphur alloys or compositions can be controlled in polarity and magnitude so that combinations of thermocouple elements of such alloys or compositions can be produced which will afford thermocouple voltages many times those of conventional thermocouples and simultaneously much higher thermal efficiency. As also previously mentioned, electrical conductors of each of the lead and sulphur alloys including the third element addition promoted alloys may be utilized with a second electrical conductor of known material, such as a metallic conductor, for example stainless steel. Additionally, any of the aforedescribed negative electrical conductors may be utilized with any of the aforedescribed positive electrical conductors to form a thermocouple whose output will be the sum of the Seebeck E. M. F.'s and power output of the conductors individually.

In Figures 26, 26A and 27 there are plotted the Seebeck E. M. F.'s for a temperature difference of 555° C. (10° C.–565° C.) obtainable in lead and sulphur alloys or compositions which have been promoted with varying amounts of third element additions within the ranges portrayed in these figures. In Figures 28, 28A and 29, there are plotted by weight percent promoters against the values of short circuit power in watts developed in a cubic centimeter of promoted lead and sulphur alloys or compositions with a uniform temperature gradient established between the faces held at 10° C. and 565° C., respectively, and upon which electrodes, to be hereinafter referred to in detail, are placed. To compute the maximum power output to a matched load the power values from Figures 28, 28A and 29 must be divided by four, as the load resistance is then one-half of the total circuit resistance.

In accordance with the invention, it will be observed, for example, that a lead-sulphur alloy or composition containing up to 0.50 weight percent indium exhibits negative Seebeck voltages of from 184 millivolts to 58 millivolts against stainless steel for a temperature difference of 555° C. (10° C. at cold junction—565° C. at hot junction), depending upon the concentration of indium. Thermoelectric elements of the same base alloy containing from 0.40 to 2.0 weight percent silver exhibit positive Seebeck voltages ranging from 50 millivolts to 152 millivolts under similar conditions of measurement. These two promoted conductors when incorporated in a series circuit as elements of a thermocouple develop voltages ranging from 108 millivolts to 336 millivolts for a temperature difference of only 555° C. Such Seebeck voltages derivable from thermocouples with elements of controlled composition are several times greater than known metallic thermoelectric elements even with temperature differences of only half of that referred to earlier.

Referring again to Figures 26 through 29, inclusive, it should be noted that low concentrations of negative promoters afford high negative Seebeck E. M. F.'s but, however, do not afford the maximum power output due to the resistivity of the composition at such concentration level. On the other hand, high concentrations of negative promoters afford maximum power output at lower Seebeck E. M. F.'s. The concentration of negative promoters is accordingly varied to meet the needs of the actual application of the negative element, e. g. the resistance of the load circuit.

The Seebeck E. M. F. and short circuit power of the alloys or compositions containing positive promoters and measured under conditions stated above, also depend upon the concentrations of the respective third element additions. It should be noted that, contrary to the trend in negative alloys or compositions, increasing the concentration of positive promoter in the lead and sulphur alloys or compositions causes an increase in the Seebeck E. M. F. as well as in the short circuit power. This is illustrated in Figures 26 through 29 wherein the data recorded refers to the unit cube of lead and sulphur alloys or compositions under the conditions stated and the Seebeck E. M. F. given is that measured when stainless steel is used as a second thermocouple element for the generator.

The values of Seebeck E. M. F.'s and short circuit power for alloys or compositions containing low concentrations of positive promoters (Figures 27 and 29) are indicated only as dashed lines near the concentrations at which the Seebeck E. M. F. reverses polarity. The actual performance data in this region depends critically upon the nature of the residual impurity in the lead and sulphur alloy or composition (of the order of 0.001 weight percent or less) and, to a lesser extent, upon the thermal history of the alloys or compositions.

In the following Table XII the power output and thermal efficiency of a typical metallic thermocouple are compared with those of an exemplary thermocouple comprising a negative and positive electrical conductor of the promoted lead and sulphur alloys or compositions aforedescribed. The data pertains to thermocouples formed from two elements, each element having a dimension of a cubic centimeter and having a uniform temperature gradient when the faces are at 565° C. and 10° C., respectively. The figures given for thermal efficiency are calculated on the basis of total heat flow across the cube and thermoelectric current developed, and are intended only as an illustration for comparison.

*Table XII*

| Couple | E. M. F., microvolts | Power to Matched Load, watts | Thermal Efficiency, percent |
|---|---|---|---|
| Iron-Constantan | 30.8 | 2.7 | 0.5-0.6 |
| Pb-S Alloy+0.05% In<br>Pb-S Alloy+1.0% Ag } | 280.0 | 0.54 | 1.4 |

The data of Table XII show that the thermocouples comprising electrical conductors of these promoted lead and sulphur alloys or compositions produce practical amounts of electrical power, higher voltage and higher thermal efficiency than metallic thermocouples. In fact, it will be observed, the voltage output and the efficiency of the thermocouples of our invention are several times higher than the same characteristics of the metallic thermocouples. Indium and silver have been discussed in detail for the data of Table XII merely as examples. Similarly, an alloy promoted with any of the other negative or positive promoters will provide improved thermoelectric properties, the actual values of which depend upon the promoter concentration as illustrated in Figures 26 to 29, inclusive. It should further be observed that thermoelectric generators comprising electrical conductors of the aforedescribed lead-sulphur alloys due to their much greater thermal efficiency permit the use of much smaller flames or heat sources for the same power output and thereby increase the utility and widen the area of application of such thermoelectric generators over those comprising known metallic thermoelectric elements.

We have found that thermocouple elements of the aforementioned promoted lead and sulphur alloys or compositions can be operated with hot junction temperatures of 565° C. when enclosed in non-oxidizing atmospheres. Such elements are mechanically stable even at temperatures as high as 815° C., however, above approximately 570° C. the lead sulphur alloy or composition has been observed to sublime to a slight extent, resulting in the loss of material. Elements of the aforedescribed alloys or compositions are stable when placed in temperature gradients and recrystallization and diffusion in temperature gradients have not produced any detrimental effects.

From the foregoing description, it will be noted that the maximum concentrations of beneficial impurity for promoted terminal compositions vary from 4.22% by weight (i. e. 3.02% excess lead plus 1.20% maximum for any promoter) in the case of the terminal lead-tellurium composition, to 6.6% by weight (i. e. 4.1% excess lead plus 2.5% maximum for any promoter) in the case of the terminal lead-selenium composition, to 6.9% by weight (i. e. 3.9% excess lead plus 3.0% maximum for any promoter) in the case of the terminal lead-sulphur composition. Thus the maximum amount of beneficial impurity for any promoted composition is 6.9% by weight.

Compositions of lead and at least one of the group tellurium, selenium, sulphur, aforedescribed, affording the desired electrical properties aforementioned may be produced by the following method. The starting constituents, free of metallic contaminants as aforeindicated, and preferably in a reduced state, are mixed together in the proportions indicated hereinbefore and sealed in a tube or container preferably of quartz or Vycor, the container first being evacuated. The tube and its contents are then heated to the melting point of the latter which occurs at a temperature ranging from about 920° C. for the terminal compositions graphically illustrated by line AB at the lefthand extremes of Figures 1 and 32 to 1085° C. for the terminal compositions illustrated by line CD at the righthand extreme of Figure 1 and the lefthand extreme of Figure 2, respectively, and centrally of Figure 32, to 1115° C. for the terminal compositions illustrated by line EF at the righthand extremes of Figures 2 and 32. The particular temperature for any given composition illustrated in Figures 1 and 2 depends upon the melting point of that composition, as shown in Figures 30 and 30A. During such heating the molten mass is preferably agitated to insure good mixing and then cooled.

After the composition has been formed as aforementioned, the solidified ingot can be removed from the tube and cast in molds of graphite or the like under an atmosphere of inert gas. More specifically, during casting we have found it preferable to cover the mold with an inert gas such as, for example, argon or carbon dioxide under positive pressure. This gas suppresses the vaporization rate of the molten composition, thereby reducing porosity of the casting.

The aforedescribed alloying and casting steps should be carried out in crucibles which do not react with or contaminate the composition since, as aforeindicated, minor amounts of undesired impurities may very deleteriously affect the electrical and/or physical properties of the element. Suitable crucibles are, we have found, those made of carbon, Alundum, pre-fired lavite and Vycor or quartz.

After casting the ingots may be machined if necessary. The shaped ingots are then preferably annealed in a reducing atmosphere at from 540° C. to 815° C. for from ten to twenty hours. This annealing treatment insures homogeneity of the ingot and enhances its electrical and physical properties.

An alternate method of forming the composition comprises melting the constituents aforementioned in an open crucible under an atmosphere of argon or any inert and/or reducing gas. Since the vapor pressures of selenium and sulphur are relatively high, some loss of selenium and sulphur may be encountered and adjustments in the initial amount of this constituent, where used, must be made to account for this loss. In all other respects this method is similar to that previously described.

Thermoelectric generator elements comprising alloys or compositions of the invention can be achieved as aforementioned through utilization of starting constituents of such purity that the compositions and resultant alloy contains no more impurity than that aforeindicated. Alternatively, an alloy of such purity may be afforded by forming the composition as to be hereinafter described from less pure starting constituents and reducing the impurity content by recrystallization from the melt. As will be understood by those skilled in the art, this comprises melting the impure composition and causing slow solidification thereof progressively from one end of the melt to the other. This results in concentration of the impurities of the starting constituents in the region of the last point of the melt to solidify, which region may then be discarded and after which the process may, if further purification is necessary, be repeated. Where this method of purification is employed a small amount of additional lead, that is from approximately 0.1% to 2.5% by weight, must then be added to the resultant composition to adjust the same to bring it within the limits aforeindicated.

For purposes of utilizing thermoelectric elements of the aforementioned base alloys or third element addition promoted compositions as elements for thermoelectric generators, they must necessarily be electrically contacted. A major obstacle in this regard has been the difficulty of making electrical contact with such elements without encountering an alloying or solution of the electrode therewith. Such alloying or solution between the thermoelectric element and the electrode will cause a change in the composition of the thermoelectric element which generally results in a reduction of thermoelectric power, hence, such alloying or solution must be controllably restricted if uniformity of the electrical properties and long lasting of the thermoelectric element are desired.

Thus, for an electrode material which is usable with thermoelectric elements of the alloys or compositions aforementioned, it is necessary that there be no tendency for the electrode and thermoelectric element to alloy with or dissolve one another at any temperature within the range of operating temperatures of the thermoelectric element. This is a very stringent requirement as the tellurium-selenium constituents of such elements can readily alloy with or dissolve most of the metals commonly considered to be electrode materials. Moreover, the upper limit of operating temperature up to approximately 570° C. for the aforementioned alloys or compositions is in a range where extensive alloying or solution is common. Moreover, in order to make use of the power available from the thermoelectric elements of the lead-tellurium-selenium-sulphur alloys aforedescribed, it is necessary to contact them in such manner that the resistance of the contact interface is negligible compared with the resistance of the thermoelectric elements themselves. The contact electrodes about to be described provide such low resistance contacts while at the same time meet the aforementioned requirements with respect to alloying with or dissolving in the lead-tellurium-selenium thermoelectric element.

It has been discovered, as disclosed and claimed in the co-pending application of Russell E. Fredrick, Robert W. Fritts and William V. Huck, Serial No. 475,539, filed December 15, 1954, that for thermoelectric elements of the character under consideration, a contact electrode comprising iron or certain iron alloys affords contacts of low thermal and electrical resistance and is chemically stable. The contacts may, as will be explained hereinafter, be applied by mere pressure or may be bonded to the elements. The bonded form of iron contacts hereinafter referred to provide mechanically strong bonds.

Iron is acceptable as an electrode for thermoelectric elements of the aforedescribed lead-tellurium-selenium compositions in that it does not alloy or dissolve in such elements at temperatures below 700° C., which is well above the ordinary upper limit of operating temperatures therefor. We have further discovered that an alloying or solution between the thermoelectric element and iron or iron alloy contact electrode takes place at above 730° C., thereby permitting bonded contacts to be formed very simply, as will hereinafter appear. Moreover, a reversal of the alloying or solution below approximately 700° C., we have found, purges the alloy of the thermoelectric element of any atomically dispersed iron which might otherwise seriously alter the electrical properties of the element. Such minor amounts of iron as remain dispersed in the thermoelectric element in the form of small precipitated particles after formation of the bonded contact not only have a negligible effect upon the electrical properties of the thermoelectric element, provided the amount of such dispersed iron is controlled, as will hereinafter be described, but also the presence of such minor iron concentration, we have found, increases the strength of the thermoelectric element markedly since small particles of precipitated iron at the grain boundaries of the composition appear to lock the grains together. It is, however, important that the iron be so controlled in amount and dispersed so that there will be no serious effect upon the thermoelectric properties of the thermoelectric element. We have found that if the iron concentration is held to less than 0.5% by weight of the thermoelectric element, the thermoelectric power and electrical resistivity thereof will be reduced by only about 10%. The iron concentration can be held to within the aforementioned limit by forming the bonded contact in accordance with methods which will now be described.

A method of forming bonded contact electrodes of iron with thermoelectric elements of the aforedescribed lead-tellurium-selenium compositions stems from our discovery that iron dissolves slowly in such compositions within the range 715° C. to 730° C. (the former temperature representing that end of the previously described composition range of the composition wherein tellurium is but a trace, and the latter temperature being that end of the previously described composition range of the conductor wherein selenium is but a trace in the composition), that the thermoelectric elements of the various compositions aforedescribed exhibit reduced melting points when laden with a few percent iron, and that, in fact, such melting points may lie below the phase transformation temperature of iron (905° C.). Where the thermoelectric element is of compositions lying at the end of the range where selenium is but a trace, as little as 2.0% by weight iron affords an alloy having a melting point below the aforementioned transformation temperature of pure iron. Similarly, where the composition of the thermoelectric element is at the other end of the range, that is contains but a trace of tellurium, as little as 9.0% by weight iron has a similar effect. This is graphically illustrated in Figure 31 wherein curve B illustrates the lowering of the melting point of a thermoelectric element of the aforedescribed composition containing but a trace of selenium with iron additions, and curve C similarly illustrates the lowering of melting point of a thermoelectric element of the aforedescribed composition containing but a trace of tellurium with additions of iron. As will be apparent, this discovery provides a simple technique by which bonded electrodes may be formed with iron or iron alloys since contact formation can take place at a temperature below that at which the phase transformation of iron occurs. Moreover, the method utilizing this discovery, about to be described, results in considerably less contamination of the thermoelectric element with iron after contacting than the .5% limit aforementioned. In fact, we have found the contamination resulting from this method generally to be less than a few hundredths of one percent.

The method utilizing iron to lower the melting temperature of the thermoelectric element may conveniently be denominated a fusion method. In this method a thermoelectric element of any of the aforementioned lead-tellurium-selenium compositions, preformed as aforedescribed, is pressed against the surface of an iron or iron alloy electrode, and the electrode is then heated, preferably inductively, until a very thin layer of the thermoelectric element becomes molten and fuses with the surface of the electrode. During such heating the iron migrates slowly into the adjacent surface of the thermoelectric element reducing the melting point of a thin layer of the latter. Due to its thin section the molten layer rapidly approaches the compositions which solidify at temperatures below the phase transformation temperatures of the iron, as indicated in Figure 31, to form the bond. Accordingly, the time of heating is only a matter of a few seconds, after which the assembly is allowed to cool.

In certain instances it is not feasible or convenient to preform the thermoelectric element as aforedescribed, in which case it is possible to cast the thermoelectric element and form the contact electrode simultaneously in accordance with the following method, for convenience denominated the "direct casting" method. Iron is placed in a mold, preferably of graphite, and the alloy of the thermoelectric element in chunk or granular form is also placed therein in contiguous engagement with the iron. The mold is then heated, preferably in a reducing atmosphere, to the melting point of the composition, that is, within the temperature range of 920° C. to 1100° C., for a short interval of time to produce limited alloying between the iron and the composition of the thermoelectric element. The mold is then cooled causing the composition melt to solidify as an ingot firmly bonded to the iron electrode. The optimum temperature for contact formation in a hydrogen atmosphere has been found to lie in the aforementioned range, since above 1100° C. the alloying advances too rapidly to be accurately controlled, and below 920° C. it may be retarded by solid particles of the composition which have not had time to absorb heat and melt.

The time of exposure at from at least 920° C. to at least 1100° C. must likewise be carefully controlled to prevent excessive alloying or solution of the iron of the electrode in the thermoelectric element and consequent impairment of the electrical properties thereof. The amount of iron which migrates into the melt depends upon the area of contact between the iron and the thermoelectric element composition and the volume of the latter, as well as the time of exposure. More specifically, the time of exposure at a given temperature within the aforeindicated range is proportional to the volume, and inversely proportional to the area of contact. Accordingly, we have found the maximum time of exposure in seconds at, for example 1100° C. (which will result in the migration of no more than 0.5% of iron into the composition melt) can best be expressed as ranging from 12 to 45 times the ratio of the volume of the thermoelectric element composition to the area of engagement thereof with the electrode expressed in centimeters, depending upon whether the composition of the thermoelectric element contains but a trace of tellurium or conversely is at the other end of the composition range aforedescribed wherein it contains but a trace of selenium.

For example, the time of exposure for a thermoelectric element of the aforedescribed lead-tellurium compositions of length 1.27 centimeters and diameter 0.635 centimeter, placed in a mold as aforeindicated with its end in contiguous engagement with an iron electrode as aforedescribed is less than 60 seconds. Under such conditions, the thermoelectric element can be cast on an alpha-stabilized iron electrode at 1100° C. for from 5 to 60 seconds without contaminating the thermoelectric element with more than 0.5% iron by precipitation thereof throughout the thermoelectric element as the mold is cooled.

In the formation of bonded contact electrodes by the direct casting method aforedescribed, it is necessary that the iron utilized be a phase-stabilized alloy of iron since the bond in this case is accomplished at a temperature 10° C. or more, depending upon the composition of the thermoelectric element, above the transformation temperature of iron (this temperature being about 905° C. at which alpha-phase iron (ferrite) transforms into gamma-phase (austenite)). Such phase stabilization is necessary to avoid shearing the solid bond between the thermoelectric element and the electrode during cooling.

It is, however, preferable that the iron forming the bonded electrode in the aforedescribed method be stabilized in the alpha phase because the iron migration rate is substantially lower in this case than in the case of gamma-phase-stabilized iron, and hence the control of the exposure time is less critical. For example, when the exposure time at 1100° C. is limited to 30 seconds for a sample of nominal size as aforeindicated, the iron content of the contacted thermoelectric element can be held below the limit of 0.5% by weight when the electrode is alpha-phase stabilized.

Conventional alpha or gamma phase stabilizers well known to those skilled in the art may be utilized for the aforeindicated purposes. However, a preferred alpha stabilizer for high temperature contact is molybdenum, since the junction between the thermoelectric element and molybdenum-iron contact electrode appears to be more intimate and freer of small blow-holes than most other alloys.

Thus, the preferred contact electrode for thermoelectric elements of the aforedescribed lead-tellurium-selenium compositions formed in accordance with the aforedescribed method is, we have discovered, alpha-stabilized iron and more particularly, iron stabilized in the alpha phase by the addition of from 2.7% to 7.0% molybdenum.

When a bonded electrode is formed by either the direct casting or fusion method aforedescribed, it is preferable to anneal the contacted thermoelectric element subsequent to contact formation at from 540° C. to 680° C. for from 20 to 10 hours to render the composition more homogeneous. It should also be understood that in the aforedescribed methods the iron should be substantially free of surface oxides and all contact formations accomplished under a reducing atmosphere since the composition of the thermoelectric element alloys poorly with iron if an oxide layer is present.

While the direct casting method aforedescribed is somewhat simpler in that it permits casting of the thermoelectric element simultaneously with formation of the bonded iron contact electrode, the fusion method aforedescribed is advantageous in that it may be employed for alpha or gamma stabilized alloys as well as pure iron and unstabilized alloys. However, high carbon steel is not a desirable electrode in either method since high carbon concentration in iron lowers the iron transformation temperature below the melting points of the thermoelectric element plus iron composition shown in Figure 31. The fusion method has an added advantage in that the average iron concentration within the contacted thermoelectric element itself resulting from the bonding procedure is much less than in the direct casting method, and in fact, is, we have found, less than .01% by weight as an average proposition. Thus, even iron alloys containing relatively large concentrations of chromium, nickel, manganese, etc. (which are ordinarily detrimental to the electrical properties of the aforedescribed compositions of the thermoelectric element) can be used as contact electrodes without detrimental effect upon the electrical properties of the thermoelectric element due to their extremely small resulting concentration therein.

For the compositions aforedescribed including those consisting substantially of lead and sulphur, a suitable contact electrode is a pressure contact made of carbon.

Thermoelectric energy afforded by the aforedescribed thermoelectric elements when a temparature gradient is imposed thereupon may be withdrawn therefrom by circut wires attached to the aforedescribed contact electrodes. Such thermoelectric elements should also be shielded from ambient atmosphere and for this reason those parts of the thermoelectric generator should be hermetically sealed. Also, since such thermoelectric elements are normally quite fragile, care should be exercised in the mounting thereof to protect them from undue tensile strains and shock. While any suitable structure may be utilized for the purposes noted, reference may be had to our co-pending applications, Serial No. 394,008, Serial No. 394,073 and Serial No. 394,074, all filed November 24, 1953, which disclose certain preferred generator constructions including disposition of the aforedescribed contact electrodes with respect to the thermoelectric elements aforedescribed.

From the foregoing it will be observed that this invention concerns the discovery that certain lead and tellurium-selenium-sulphur alloys or compositions provide thermoelectric elements fulfilling the aforementioned objects in providing high Seebeck E. M. F.'s and low thermal conductivities compared to metallic alloys and meet the requirement for high efficiency of conversion of heat to electrical energy. It is further to be noted that the Seebeck E. M. F. and electrical conductivity of such lead and tellurium-selenium-sulphur alloys or compositions can be controlled in polarity and magnitude so that combinations of thermoelectric elements of such alloys or compositions can be produced which will afford thermocouple voltages many times those of conventional couples and simultaneously much higher thermal efficiency. Further, in that the electrical properties can be controlled over wide ranges, thermoelectric generators may be provided to suit the requirements of a variety of practical applications.

We claim:

1. A thermoelectric generator comprising a first electrical conductor consisting essentially of lead and tellurium, the percent by weight of lead being 61.95% to 63.0%, balance substantially all tellurium, containing no more than about 0.001% by weight deleterious impurity, and containing a third element-promoter from the periodic table not exceeding about 1.2% by weight of the conductor and sufficient to afford the conductor reproducible variation of and control over the electrical properties thereof, and a second electrical conductor.

2. A thermoelectric generator comprising a first electrical conductor consisting essentially of lead and selenium, the percent by weight of lead being 72.45% to 73.50%, balance substantially all selenium, containing no more than about 0.001% by weight deleterious impurity, and containing a third element-promoter from the periodic table in an amount not exceeding about 2.5% by weight of the conductor and sufficient to afford the conductor reproducible variation of and control over the electrical properties thereof, and a second electrical conductor.

3. A thermoelectric generator comprising a first electrical conductor consisting essentially of lead and sulphur, the percent by weight of lead being 86.63% to 87.10%, balance substantially of sulphur, containing no more than about 0.001% by weight deleterious impurity, and containing a third element-promoter from the periodic table in an amount not exceeding about 3.0% by weight of the conductor and sufficient to afford the conductor reproducible variation of and control over the electrical properties thereof, and a second electrical conductor.

4. A thermoelectric generator according to claim 1 in which the third element-promoter is selected from the following group of elements from the periodic table: Bismuth, tantalum, manganese, zirconium, titanium, aluminum, gallium, chlorine, bromine, iodine, uranium, sodium, potassium, thallium and arsenic.

5. A thermoelectric generator comprising a first electrical conductor consisting essentially of lead and tellurium, the percent by weight of lead being 61.95% to 63.0%, balance substantially all tellurium, and at least one member selected from the group of elements from the periodic table consisting of, bismuth, tantalum, manganese, zirconium, titanium, aluminum, gallium, chlorine, bromine, iodine, uranium, sodium, potassium, thallium and arsenic, in an amount not in excess by weight percent of the lead and tellurium of said members as follows: 0.50 tantalum; 0.25 manganese; 0.25 zirconium; 0.15 titanium; 0.10 aluminum; 0.25 gallium; 0.10 chlorine; 0.20 bromine; 0.25 iodine; 0.80 uranium; 0.06 sodium; 0.10 potassium; and bismuth, thallium and arsenic not in excess of from 0.60 to 1.20, 0.25 to 1.00, and from 0.07 to 0.25, respectively, over the aforementioned range of lead, and a second electrical conductor.

6. The thermoelectric generator of claim 5 in which said second electrical conductor is stainless steel.

7. A thermoelectric generator comprising a first electrical conductor consisting essentially of lead and tellurium containing 61.95% to 63.0% lead by weight, balance tellurium, and containing at least one member selected from the group of elements from the periodic table consisting of sodium, potassium, thallium and arsenic, in an amount by weight percent of the lead and tellurium in the range of: 0.002% to 0.06% for sodium; the range of 0.003% to 0.10% for potassium; and in ranges of from a minimum of 0.01% and a maximum of 0.25% to a minimum of 0.04% and a maximum of 1.0% for thallium, and from a minimum of 0.005% and a maximum of 0.07% to a minimum of 0.015% and a maximum of 0.25% for arsenic, when the lead content of said conductor ranges from 61.95% to 63.0%, and a second electrical conductor.

8. The thermoelectric generator of claim 7 in which said second conductor is stainless steel.

9. A thermoelectric generator comprising a first electrical conductor consisting essentially of lead and tellurium containing 61.95% to 63.0% lead by weight, balance tellurium, and containing at least one member selected from the group of elements from the periodic table consisting of bismuth, tantalum, manganese, zirconium, titanium, aluminum, gallium, chlorine, bromine, iodine and uranium, in an amount not in excess by weight percent of the lead and tellurium of said members as follows: 0.50 tantalum; 0.25 manganese; 0.25 zirconium; 0.15 titanium; 0.10 aluminum; 0.25 gallium; 0.10 chlorine; 0.20 bromine; 0.25 iodine; 0.80 uranium; and bismuth not in excess of from 0.60 to 1.20 over the aforementioned range of lead, and a second electrical conductor.

10. The thermoelectric generator of claim 9 in which said second conductor is stainless steel.

11. A thermoelectric generator comprising a first electrical conductor consisting essentially of lead and tellurium containing 61.95% to 63.0% lead by weight, balance tellurium, and containing at least one member selected from the group of elements from the periodic table consisting of bismuth, tantalum, manganese, zirconium, titanium, aluminum, gallium, chlorine, bromine, iodine and uranium, in an amount not in excess by weight percent of the lead and tellurium of said members as follows: 0.50 tantalum; 0.25 manganese; 0.25 zirconium; 0.15 titanium; 0.10 aluminum; 0.25 gallium; 0.10 chlorine; 0.20 bromine; 0.25 iodine; 0.80 uranium; and bismuth not in excess of from 0.60 to 1.20 over the aforementioned range of lead, and a second electrical conductor consisting essentially of lead and tellurium containing 61.95% to 63.0% lead by weight, balance tellurium, and containing at least one member selected from the group of elements from the periodic table consisting of sodium, potassium, thallium and arsenic in an amount by weight percent of the lead and tellurium in the range of 0.002% to 0.06% for sodium; the range of 0.003% to 0.10% for potassium; and in ranges of from a minimum of 0.01% and a maximum of 0.25% to a minimum of 0.04% and a maximum of 1.0% for thallium, and from a minimum of 0.005% and a maximum of 0.07% to a minimum of 0.015% and a maximum of 0.25% for arsenic, when the lead content of said conductor ranges from 61.95% to 63.0%.

12. A thermoelectric generator comprising a first electrical conductor consisting essentially of from 61.95% to 63.0% by weight lead, the balance substantially all tellurium, and bismuth in an amount not in excess of from 0.60% to 1.20% by weight of the lead and tellurium over the aforementioned range of lead, and a second electrical conductor.

13. A thermoelectric generator comprising a first electrical conductor consisting essentially of from 61.95% to 63.0% by weight lead, the balance substantially all tellurium, and tantalum in an amount not in excess of 0.50% by weight of the lead and tellurium, and a second electrical conductor.

14. A thermoelectric generator comprising a first electrical conductor consisting essentially of from 61.95% to 63.0% by weight lead, the balance substantially all tellurium, and manganese in an amount not in excess of 0.25% by weight of the lead and tellurium, and a second electrical conductor.

15. A thermoelectric generator comprising a first electrical conductor consisting essentially of from 61.95% to 63.0% by weight lead, the balance substantially all tellurium, and zirconium in an amount not in excess of 0.25% by weight of the lead and tellurium, and a second electrical conductor.

16. A thermoelectric generator comprising a first electrical conductor consisting essentially of from 61.95% to 63.0% by weight lead, the balance substantially all tellurium, and titanium in an amount not in excess of 0.15% by weight of the lead and tellurium, and a second electrical conductor.

17. A thermoelectric generator comprising a first electrical conductor consisting essentially of from 61.95% to 63.0% by weight lead, the balance substantially all tellurium, and aluminum in an amount not in excess of 0.10% by weight of the lead and tellurium, and a second electrical conductor.

18. A thermoelectric generator comprising a first electrical conductor consisting essentially of from 61.95% to 63.0% by weight lead, the balance substantially all tellurium, and gallium in an amount not in excess of 0.25% by weight of the lead and tellurium, and a second electrical conductor.

19. A thermoelectric generator comprising a first electrical conductor consisting essentially of from 61.95% to 63.0% by weight lead, the balance substantially all tellurium, and chlorine in an amount not in excess of 0.10% by weight of the lead and tellurium, and a second electrical conductor.

20. A thermoelectric generator comprising a first electrical conductor consisting essentially of from 61.95% to 63.0% by weight lead, the balance substantially all tellurium, and bromine in an amount not in excess of 0.20% by weight of the lead and tellurium, and a second electrical conductor.

21. A thermoelectric generator comprising a first electrical conductor consisting essentially of from 61.95% to 63.0% by weight lead, the balance substantially all tellurium, and iodine in an amount not in excess of 0.25% by weight of the lead and tellurium, and a second electrical conductor.

22. A thermoelectric generator comprising a first electrical conductor consisting essentially of from 61.95% to 63.0% by weight lead, the balance substantially all tellurium, and uranium in an amount not in excess of 0.80% by weight of the lead and tellurium, and a second electrical conductor.

23. A thermoelectric generator comprising a first electrical conductor consisting essentially of from 61.95% to 63.0% by weight lead, the balance substantially all tellurium, and sodium in the range of 0.002 to 0.06% by weight of the lead and tellurium, and a second electrical conductor.

24. A thermoelectric generator comprising a first electrical conductor consisting essentially of from 61.95% to 63.0% by weight lead, the balance substantially all tellurium, and potassium in the range of 0.003 to 0.10% by weight of the lead and tellurium, and a second electrical conductor.

25. A thermoelectric generator comprising a first electrical conductor consisting essentially of from 61.95% to 63.0% by weight lead, the balance substantially all tellurium, and thallium in the range of from a minimum of 0.01 and a maximum of 0.25 to a minimum of 0.04 and a maximum of 1.0% when lead is present with respect to tellurium in the range of from 61.95% to 63.0%, and a second electrical conductor.

26. A thermoelectric generator comprising a first electrical conductor consisting essentially of from 61.95% to 63.0% by weight lead, the balance substantially all tellurium, and arsenic in the range of from a minimum of 0.005% and a maximum of 0.07% to a minimum of 0.015% and a maximum of 0.25% when lead is present with respect ot tellurium in the range of from 61.95% to 63.0%, and a second electrical conductor.

27. A thermoelectric generator according to claim 2 in which the third element-promoter is selected from the following group of elements from the periodic table: iodine, chlorine, bromine, zirconium, silicon, titanium, indium, tantalum, gallium, aluminum, copper, gold, bismuth, antimony, fluorine, columbium, sodium and potassium.

28. A thermoelectric generator comprising a first electrical conductor consisting essentially of lead and selenium, the percent by weight of lead being 72.45% to 73.50%, balance substantially all selenium, and at least one member selected from the group of elements from the periodic table consisting of iodine, chlorine, bromine, zirconium, silicon, titanium, indium, tantalum, gallium, aluminum, copper, gold, bismuth, antimony, fluorine, columbium, sodium and potassium, in an amount not in excess by weight percent of the lead and selenium of said members as follows: 0.50 iodine; 0.20 chlorine; 0.60 bromine; 0.60 zirconium; 0.10 silicon; 0.10 titanium; 0.20 indium; 0.60 tantalum; 0.15 gallium; 0.03 aluminum; 0.30 copper; 0.35 gold; 0.02 fluorine; 0.35 columbium; 0.08 sodium; 0.15 potassium; and bismuth and antimony not in excess of from 0.40 to 2.5 and from 0.20 to 1.5, respectively, over the aforementioned range of lead, and a second electrical conductor element.

29. The thermoelectric generator of claim 28 in which said second element is stainless steel.

30. A thermoelectric generator comprising a first electrical conductor consisting essentially of lead and selenium containing 72.45% to 73.50% lead by weight, balance selenium, and containing at least one member selected from the group of elements from the periodic table consisting of sodium and potassium, in an amount by weight percent of the lead and selenium in the range of: 0.006% to 0.08% for sodium; and 0.014% to 0.15% for potassium, and a second electrical conductor.

31. The thermoelectric generator of claim 30 in which said second conductor is stainless steel.

32. A thermoelectric generator comprising a first electrical conductor consisting essentially of lead and selenium containing 72.45% to 73.50% lead by weight, balance selenium, and containing at least one member selected from the group of elements from the periodic table consisting of iodine, chlorine, bromine, zirconium, silicon, titanium, indium, tantalum, gallium, aluminum, copper, gold, bismuth, antimony, fluorine and columbium, in an amount not in excess by weight percent of the lead and selenium of said members as follows: 0.50 iodine; 0.20 chlorine, 0.60 bromine; 0.60 zirconium; 0.10 silicon; 0.10 titanium; 0.20 indium; 0.60 tantalum; 0.15 gallium; 0.03 aluminum; 0.30 copper, 0.35 gold; 0.02 fluorine; 0.35 columbium; and bismuth and antimony not in excess of from 0.40 to 2.5 and from 0.20 to 1.5, respectively, over the aforementioned range of lead, and a second electrical conductor.

33. The thermoelectric generator of claim 32 in which said second conductor is stainless steel.

34. A thermoelectric generator comprising a first electrical conductor consisting essentially of lead and selenium containing 72.45% to 73.50% lead by weight, balance selenium, and containing at least one member selected from the group of elements from the periodic table consisting of iodine, chlorine, bromine, zirconium, silicon, titanium, indium, tantalum, gallium, aluminum, copper, gold, bismuth, antimony, fluorine and columbium, in an amount not in excess by weight percent of the lead and selenium of said members as follows: 0.50 iodine; 0.20 chlorine; 0.60 bromine; 0.60 zirconium; 0.10 silicon; 0.10 titanium; 0.20 indium; 0.60 tantalum; 0.15 gallium; 0.03 aluminum; 0.30 copper; 0.35 gold; 0.02 fluorine; 0.35 columbium; and bismuth and antimony not in excess of from 0.40 to 2.5 and from 0.20 to 1.5, respectively, over the aforementioned range of lead, and a second electrical conductor consisting essentially of lead and selenium containing 72.45% to 73.50% lead by weight, balance selenium, and containing at least one member selected from the group of elements from the periodic table consisting of sodium and potassium in an amount by weight percent of the lead and selenium in the range of 0.006% to 0.08% for sodium; and 0.014% to 0.15% for potassium.

35. A thermoelectric generator comprising a first electrical conductor consisting essentially of from 72.45% to 73.50% by weight lead, the balance substantially all selenium, and iodine in an amount not in excess of 0.50% by weight of the lead and selenium, and a second electrical conductor.

36. A thermoelectric generator comprising a first electrical conductor consisting essentially of from 72.45% to 73.50% by weight lead, the balance substantially all selenium, and chlorine in an amount not in excess of 0.20% by weight of the lead and selenium, and a second electrical conductor.

37. A thermoelectric generator comprising a first electrical conductor consisting essentially of from 72.45% to 73.50% by weight lead, the balance substantially all selenium, and bromine in an amount not in excess of 0.60% by weight of the lead and selenium, and a second electrical conductor.

38. A thermoelectric generator comprising a first electrical conductor consisting essentially of from 72.45% to 73.50% by weight lead, the balance substantially all selenium, and zirconium in an amount not in excess of 0.60% by weight of the lead and selenium, and a second electrical conductor.

39. A thermoelectric generator comprising a first electrical conductor consisting essentially of from 72.45% to 73.50% by weight lead, the balance substantially all selenium, and silicon in an amount not in excess of 0.10% by weight of the lead and selenium, and a second electrical conductor.

40. A thermoelectric generator comprising a first electrical conductor consisting essentially of from 72.45% to 73.50% by weight lead, the balance substantially all selenium, and titanium in an amount not in excess of 0.10% by weight of the lead and selenium, and a second electrical conductor.

41. A thermoelectric generator comprising a first electrical conductor consisting essentially of from 72.45% to 73.50% by weight lead, the balance substantially all selenium, and indium in an amount not in excess of 0.20% by weight of the lead and selenium, and a second electrical conductor.

42. A thermoelectric generator comprising a first electrical conductor consisting essentially of from 72.45% to 73.50% by weight lead, the balance substantially all selenium, and tantalum in an amount not in excess of 0.60% by weight of the lead and selenium, and a second electrical conductor.

43. A thermoelectric generator comprising a first electrical conductor consisting essentially of from 72.45% to 73.50% by weight lead, the balance substantially all selenium, and gallium in an amount not in excess of 0.15% by weight of the lead and selenium, and a second electrical conductor.

44. A thermoelectric generator comprising a first electrical conductor consisting essentially of from 72.45% to 73.50% by weight lead, the balance substantially all selenium, and aluminum in an amount not in excess of 0.03% by weight of the lead and selenium, and a second electrical conductor.

45. A thermoelectric generator comprising a first electrical conductor consisting essentially of from 72.45% to 73.50% by weight lead, the balance substantially all selenium, and copper in an amount not in excess of 0.30% by weight of the lead and selenium, and a second electrical conductor.

46. A thermoelectric generator comprising a first electrical conductor consisting essentially of from 72.45% to 73.50% by weight lead, the balance substantially all selenium, and gold in an amount not in excess of 0.35% by weight of the lead and selenium, and a second electrical conductor.

47. A thermoelectric generator comprising a first electrical conductor consisting essentially of from 72.45% to 73.50% by weight lead, the balance substantially all selenium, and bismuth in an amount not in excess of from 0.40% to 2.5% by weight of the lead and selenium over the aforementioned range of lead, and a second electrical conductor.

48. A thermoelectric generator comprising a first electrical conductor consisting essentially of from 72.45% to 73.50% by weight lead, the balance substantially all selenium, and antimony in an amount not in excess of from 0.20% to 1.5% by weight of the lead and selenium over the aforementioned range of lead, and a second electrical conductor.

49. A thermoelectric generator comprising a first electrical conductor consisting essentially of from 72.45% to 73.50% by weight lead, the balance substantially all selenium, and fluorine in an amount not in excess of 0.02% by weight of the lead and selenium, and a second electrical conductor.

50. A thermoelectric generator comprising a first electrical conductor consisting essentially of from 72.45% to 73.50% by weight lead, the balance substantially all selenium, and columbium in an amount not in excess of 0.35% by weight of the lead and selenium, and a second electrical conductor.

51. A thermoelectric generator comprising a first electrical conductor consisting essentially of from 72.45% to 73.50% by weight lead, the balance substantially all selenium, and sodium in the range of 0.006% to 0.08% by weight of the lead and selenium, and a second electrical conductor.

52. A thermoelectric generator comprising a first electrical conductor consisting essentially of from 72.45% to 73.50% by weight lead, the balance substantially all selenium, and potassium in the range of 0.014% to 0.15% by weight of the lead and selenium, and a second electrical conductor.

53. A thermoelectric generator according to claim 3 in which the third element-promoter is selected from the following group of elements from the periodic table: zirconium, indium, bromine, chlorine, titanium, iodine, tantalum, bismuth, antimony, gallium, columbium, uranium and silver.

54. A thermoelectric generator comprising a first electrical conductor consisting essentially of lead and sulphur, the percent by weight of lead being 86.63% to 87.10%, balance substantially all sulphur, and at least one member selected from the group of elements from the periodic table consisting of zirconium, indium, bromine, chlorine, titanium, iodine, tantalum, bismuth, antimony, gallium, columbium, uranium and silver, in an amount not in excess by weight per cent of the lead and tellurium of said members as follows: 0.40 zirconium; 0.50 indium; 0.35 bromine; 0.15 chlorine; 0.20 titanium; 0.55 iodine; 0.70 tantalum; 0.30 gallium; 0.40 columbium; 1.0 uranium; 2.0 silver; and bismuth and antimony not in excess of from 1.0 to 3.0 and from 0.50 to 3.0, respectively, over the aforementioned range of lead, and a second electrical conductor.

55. The thermoelectric generator of claim 54 in which said second conductor is stainless steel.

56. A thermoelectric generator comprising a first electrical conductor consisting essentially of lead and sulphur containing 86.63% to 87.10% lead by weight, balance sulphur, and containing silver in an amount by weight percent of the lead and sulphur in the range of 0.40% to 2.0%, and a second electrical conductor.

57. The thermoelectric generator of claim 56 in which said second conductor is stainless steel.

58. A thermoelectric generator comprising a first electrical conductor consisting essentially of lead and sulphur containing 86.63% to 87.10% lead by weight, balance sulphur, and containing at least one member selected from the group of elements from the periodic table consisting of zirconium, indium, bromine, chlorine, titanium, iodine, tantalum, bismuth, antimony, gallium, columbium, and uranium, in an amount not in excess by weight percent of the lead and sulphur of said members as follows: 0.40 zirconium; 0.50 indium; 0.35 bromine; 0.15 chlorine; 0.20 titanium; 0.55 iodine; 0.70 tantalum; 0.30 gallium; 0.40 columbium; 1.0 uranium; and bismuth and antimony not in excess of from 1.0 to 3.0 and from 0.50 to 3.0, respectively, over the aforementioned range of lead, and a second electrical conductor.

59. The thermoelectric generator of claim 58 in which said second conductor is stainless steel.

60. A thermoelectric generator comprising a first electrical conductor consisting essentially of lead and sulphur containing 86.63% to 87.10% lead by weight, balance sulphur, and containing at least one member selected from the group of elements from the periodic table consisting of zirconium, indium, bromine, chlorine, titanium, iodine, tantalum, bismuth, antimony, gallium, columbium and uranium, in an amount not in excess by weight percent of the lead and sulphur of said members as follows: 0.40 zirconium; 0.50 indium; 0.35 bromine; 0.15 chlorine; 0.20 titanium; 0.55 iodine; 0.70 tantalum; 0.30 gallium; 0.40 columbium; 1.0 uranium; and bismuth and antimony not in excess of from 1.0 to 3.0 and from 0.50 to 3.0, respectively, over the aforementioned range of lead, and a second electrical conductor consisting essentially of lead and sulphur containing 86.63% to 87.10% lead by weight, balance sulphur, and silver in an amount by weight percent of the lead and sulphur in the range of 0.40% to 2.0%.

61. A thermoelectric generator comprising a first electrical conductor consisting essentially of from 86.63% to 87.10% by weight lead, the balance substantially all sulphur, and zirconium in an amount not in excess of 0.40% by weight of the lead and sulphur, and a second electrical conductor.

62. A thermoelectric generator comprising a first electrical conductor consisting essentially of from 86.63% to 87.10% by weight lead, the balance substantially all sulphur, and indium in an amount not in excess of 0.50% by weight of the lead and sulphur, and a second electrical conductor.

63. A thermoelectric generator comprising a first electrical conductor consisting essentially of from 86.63% to 87.10% by weight lead, the balance substantially all sulphur, and bromine in an amount not in excess of 0.35% by weight of the lead and sulphur, and a second electrical conductor.

64. A thermoelectric generator comprising a first electrical conductor consisting essentially of from 86.63% to 87.10% by weight lead, the balance substantially all sulphur, and chlorine in an amount not in excess of 0.15% by weight of the lead and sulphur, and a second electrical conductor.

65. A thermoelectric generator comprising a first electrical conductor consisting essentially of from 86.63% to 87.10% by weight lead, the balance substantially all sulphur, and titanium in an amount not in excess of 0.20% by weight of the lead and sulphur, and a second electrical conductor.

66. A thermoelectric generator comprising a first electrical conductor consisting essentially of from 86.63% to 87.10% by weight lead, the balance substantially all sulphur, and iodine in an amount not in excess of 0.55% by weight of the lead and sulphur, and a second electrical conductor.

67. A thermoelectric generator comprising a first electrical conductor consisting essentially of from 86.63% to 87.10% by weight lead, the balance substantially all sulphur, and tantalum in an amount not in excess of 0.70% by weight of the lead and sulphur, and a second electrical conductor.

68. A thermoelectric generator comprising a first electrical conductor consisting essentially of from 86.63% to 87.10% by weight lead, the balance substantially all sulphur, and bismuth in an amount not in excess of from 1.0% to 3.0% by weight of the lead and sulphur over the aforementioned range of lead, and a second electrical conductor.

69. A thermoelectric generator comprising a first electrical conductor consisting essentially of from 86.63% to 87.10% by weight lead, the balance substantially all sulphur and antimony in an amount not in excess of from 0.50% to 3.0% by weight of the lead and sulphur over the aforementioned range of lead, and a second electrical conductor.

70. A thermoelectric generator comprising a first electrical conductor consisting essentially of from 86.63% to 87.10% by weight lead, the balance substantially all sulphur, and gallium in an amount not in excess of 0.30% by weight of the lead and sulphur, and a second electrical conductor.

71. A thermoelectric generator comprising a first electrical conductor consisting essentially of from 86.63% to 87.10% by weight lead, the balance substantially all sulphur, and columbium in an amount not in excess of 0.40% by weight of the lead and sulphur, and a second electrical conductor.

72. A thermoelectric generator comprising a first electrical conductor consisting essentially of from 86.63% to 87.10% by weight lead, the balance substantially all sulphur, and uranium in an amount not in excess of 1.0% by weight of the lead and sulphur, and a second electrical conductor.

73. A thermoelectric generator comprising a first electrical conductor consisting essentially of from 86.63% to 87.10% by weight lead, the balance substantially all sulphur, and silver in the range of 0.40% to 2.0% by weight of the lead and sulphur, and a second electrical conductor.

74. A thermoelectric generator element consisting essentially of an alloy of lead and at least one member of the group tellurium, selenium and sulphur in relative proportions with respect to each other in the area defined by solid lines AB, BDF, FE and ECA in the accompanying bi-axial diagram of Figure 32, and a third element-promoter in amount not in excess of about 3.0% by weight of said alloy effective to modify the conductivity of the alloy.

75. A thermoelectric generator element consisting essentially of an alloy of lead and at least one member of the group tellurium, selenium and sulphur in relative proportions with respect to each other in the area defined by solid lines AB, BDF, FE and ECA in the accompanying bi-axial diagram of Figure 32, and said alloy additionally having a third element-promoter in amount effective to modify the conductivity of the alloy, selected from the following group of elements from the periodic table and not in excess of about 1.2% by weight when the composition of said alloy lies nearest solid line AB: bismuth, tantalum, manganese, zirconium, titanium, aluminum, gallium, chlorine, bromine, iodine, uranium, sodium, potassium, thallium and arsenic; and selected from the following group of elements from the periodic table and not in excess of about 2.5% by weight when the composition of said alloy lies nearest solid line CD: iodine, chlorine, bromine, zirconium, silicon, titanium, indium, tantalum, gallium, aluminum, copper, gold, bismuth, antimony, fluorine, columbium, sodium and potassium; and selected from the following group of elements from the periodic table and not in excess of about 3.0% by weight when the composition of said alloy lies nearest solid line EF: zirconium, indium, bromine, chlorine, titanium, iodine, tantalum, bismuth, antimony, gallium, columbium, uranium and silver.

76. A thermoelectric generator element consisting essentially of an alloy of lead and a tellurium-selenium constituent in relative proportions with respect to each other in the area defined by solid lines AB, BD, DF and CA in the accompanying diagram of Figure 1, and a third element-promoter in amount not in excess of from 1.2% to 2.5% by weight effective to modify the conductivity of the alloy.

77. A thermoelectric generator element consisting essentially of an alloy of lead and a tellurium-selenium constituent in relative proportions with respect to each other in the area defined by solid lines AB, BD, DC and CA in the accompanying diagram of Figure 1, and a third element-promoter in amount effective to modify the conductivity of the alloy, selected from the following group of elements from the periodic table and not in excess of about 1.2% by weight when the composition of said alloy lies nearer solid line AB: bismuth, tantalum, manganese, zirconium, titanium, aluminum, gallium, chlorine, bromine, iodine, uranium, sodium, potassium, thallium and arsenic; and selected from the following group of elements from the periodic table and not in excess of about 2.5% by weight when the composition of said alloy lies nearer solid line CD: iodine, chlorine, bromine, zirconium, silicon, titanium, indium, tantalum, gallium, aluminum, copper, gold, bismuth, antimony, fluorine, columbium, sodium and potassium.

78. A thermoelectric generator element consisting essentially of an alloy of lead and a selenium-sulphur constituent in relative proportions with respect to each other in the area defined by solid lines CD, DF, FE and EC in the accompanying diagram of Figure 2, and a third element-promoter in amount not in excess of from 2.5% to 3.0% by weight effective to modify the conductivity of the alloy.

79. A thermoelectric generator element consisting essentially of an alloy of lead and a selenium-sulphur constituent in relative proportions with respect to each other in the area defined by solid lines CD, DF, FE and EC in the accompanying diagram of Figure 2, and a third element-promoter in amount effective to modify the conductivity of the alloy, selected from the following group of elements from the periodic table and not in excess of about 2.5% by weight when the composition of said alloy lies nearer solid line CD: iodine, chlorine, bromine, zirconium, silicon, titanium, indium, tantalum, gallium, aluminum, copper, gold, bismuth, antimony, fluorine, columbium, sodium and potassium; and selected from the following group of elements from the periodic table and not in excess of about 3.0% by weight when the composition of said alloy lies nearer solid line EF: zirconium, indium, bromine, chlorine, titanium, iodine, tantalum, bismuth, antimony, gallium, columbium, uranium and silver.

References Cited in the file of this patent

UNITED STATES PATENTS

| | | |
|---|---|---|
| 704,595 | Thwing | July 15, 1902 |
| 775,188 | Lyons | Nov. 15, 1904 |
| 2,397,756 | Schwartz | Apr. 2, 1946 |
| 2,602,095 | Faus | July 1, 1952 |
| 2,685,608 | Justi | Aug. 3, 1954 |